(12) United States Patent
Takenaka et al.

(10) Patent No.: US 7,337,039 B2
(45) Date of Patent: Feb. 26, 2008

(54) GAIT PRODUCING DEVICE FOR LEG TYPE MOVABLE ROBOT

(75) Inventors: Toru Takenaka, Wako (JP); Takashi Matsumoto, Wako (JP); Takahide Yoshiike, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 827 days.

(21) Appl. No.: 10/499,513

(22) PCT Filed: Dec. 26, 2002

(86) PCT No.: PCT/JP02/13591

§ 371 (c)(1),
(2), (4) Date: Jun. 21, 2004

(87) PCT Pub. No.: WO03/057422

PCT Pub. Date: Jul. 17, 2003

(65) Prior Publication Data

US 2005/0065646 A1    Mar. 24, 2005

(30) Foreign Application Priority Data

Dec. 28, 2001  (JP) .............................. 2001-399496

(51) Int. Cl.
*G06F 19/00*    (2006.01)

(52) U.S. Cl. ...................... 700/245; 700/246; 700/251; 700/253; 700/260; 700/261; 318/568.1; 318/568.12; 318/568.16; 318/568.17; 318/568.2; 901/1; 901/9; 901/46

(58) Field of Classification Search ................ 700/246, 700/251, 253, 260, 261; 318/568.1, 568.12, 318/568.16, 568.17, 568.2; 901/1, 9, 46
See application file for complete search history.

(56) References Cited

U.S. PATENT DOCUMENTS

| | | | | |
|---|---|---|---|---|
| 6,969,965 | B2* | 11/2005 | Takenaka et al. ...... | 318/568.12 |
| 2005/0110448 | A1* | 5/2005 | Takenaka et al. ...... | 318/568.12 |
| 2005/0126833 | A1* | 6/2005 | Takenaka et al. ............ | 180/8.1 |
| 2005/0228539 | A1* | 10/2005 | Takenaka et al. ........... | 700/245 |
| 2005/0240306 | A1* | 10/2005 | Takenaka et al. ........... | 700/245 |
| 2006/0184276 | A1* | 8/2006 | Takenaka et al. ........... | 700/245 |

FOREIGN PATENT DOCUMENTS

JP    02-048283    2/1990

(Continued)

OTHER PUBLICATIONS

Zhang et al., A new method of desired gait synthesis in biped robot, 2000, IEEE, p. 1300-1304.*

*Primary Examiner*—Thomas Black
*Assistant Examiner*—McDieunel Marc
(74) *Attorney, Agent, or Firm*—Rankin, Hill, Porter & Clark LLP

(57) ABSTRACT

There are provided device for determining a desired trajectory of a translation floor reaction force's vertical component of a legged mobile robot 1, a vertical component of the total center-of-gravity acceleration or a body acceleration vertical component of the robot 1, device for determining a desired vertical position of the total center-of-gravity of the robot 1 or a body 24 thereof so as to satisfy the desired trajectory, and means for determining a desired vertical position of the total center-of-gravity of the robot 1 or the body 24 thereof based on a geometrical condition concerning a joint of a leg 2. Depending on the gait mode, such as walking or running, one of the desired vertical positions is selected, or the desired vertical positions are combined by taking the weighted average thereof or the like, thereby determining a final desired vertical position.

7 Claims, 39 Drawing Sheets

FOREIGN PATENT DOCUMENTS

| | | |
|---|---|---|
| JP | 05-305584 | 11/1993 |
| JP | 05-324115 | 12/1993 |
| JP | 10-086080 | 4/1998 |
| JP | 10-086081 | 4/1998 |
| JP | 10-277969 | 10/1998 |
| JP | 2001-138273 | 5/2001 |

* cited by examiner (RUNNING GAIT)

(DESIRED FLOOR REACTION FORCE'S VERTICAL COMPONENT)

(DESIRED ZMP)

(BODY TRANSLATION MODE)

(BODY ROTATION MODE)

(MODEL WITH FLYWHEEL)

(FULL MODEL)

(FLOWCHART OF GAIT GENERATION PROCESS)

(DIVERGENCE STATE OF BODY POSITION)

(PROCESS OF DETERMINING NORMAL GAIT PARAMETER)

(RELATIONSHIP AMONG FOOT LANDING POSITIONS/POSTURES FOR NORMAL GAIT)

(DESIRED FLOOR REACTION FORCE'S VERTICAL COMPONENT)

(FLOOR REACTION FORCE'S HORIZONTAL COMPONENT ALLOWABLE RANGE)

(DESIRED ZMP)

(PROVISIONAL GAIT GENERATION PROCESS FOR NORMAL GAIT)

FLOOR REACTION FORCE'S HORIZONTAL COMPONENT DETERMINED WITHOUT TAKING ALLOWABLE RANGE INTO CONSIDERATION Fxtmp FLOOR REACTION FORCE'S HORIZONTAL COMPONENT DETERMINED TAKING FLOOR REACTION FORCE'S HORIZONTAL COMPONENT ALLOWABLE RANGE INTO CONSIDERATION Fx BODY INCLINATION ANGULAR ACCELERATION $\beta$ BODY INCLINATION RESTORING MOMENT ZMP-CONVERTED VALUE (ZMPrec)

BODY INCLINATION ANGULAR ACCELERATION $\beta$
(FOR RETURNING BODY INCLINATION VELOCITY TO INITIAL VALUE)

FLOOR REACTION FORCE HORIZONTAL COMPONENT Fx
DETERMINED TAKING FLOOR REACTION FORCE HORIZONTAL
COMPONENT ALLOWABLE RANGE INTO CONSIDERATION

FLOOR REACTION FORCE HORIZONTAL COMPONENT Fx

BODY INCLINATION ANGULAR ACCELERATION β

(RELATIONSHIP AMONG BODY POSITIONS AT THE TIME OF LANDING FOR NORMAL GAIT)

(PROCESS OF PROVISIONALLY DETERMINING CURRENT TIME GAIT PARAMETER)

(FLOOR REACTION FORCE'S HORIZONTAL COMPONENT ALLOWABLE RANGE)

(PROCESS OF CORRECTING CURRENT TIME GAIT PARAMETER IN SEARCHING MANNER)

(PROCESS OF GENERATING PROVISIONAL CURRENT TIME GAIT)

(PROCESS OF DETERMINING CURRENT TIME PROVISIONAL GAIT INSTANTANEOUS VALUE)

(PROCESS OF DETERMINING BODY HORIZONTAL ACCELERATION AND BODY POSTURE ANGULAR ACCELERATION FOR CURRENT TIME GAIT)

(EXAMPLE OF BODY HORIZONTAL POSITION TRAJECTORY)

(BODY INCLINATION ABOUT WAIST)

(BODY HORIZONTAL POSITION/VELOCITY AT END OF CURRENT TIME GAIT CONVERGING TO CERTAIN NORMAL GAIT)

(PROCESS OF DETERMINING FLOOR REACTION FORCE VERTICAL COMPONENT TRAJECTORY PARAMETER FOR PERIOD OF SHIFTING BETWEEN WALKING AND RUNNING)

(DESIRE FLOOR REACTION FORCE'S VERTICAL COMPONENT AT WALKING TIME)

(BODY VERTICAL POSITION DETERMINATION PROCESS: METHOD 1)

(BODY VERTICAL POSITION DETERMINATION PROCESS: METHOD 2)

(RUNNING GAIT)

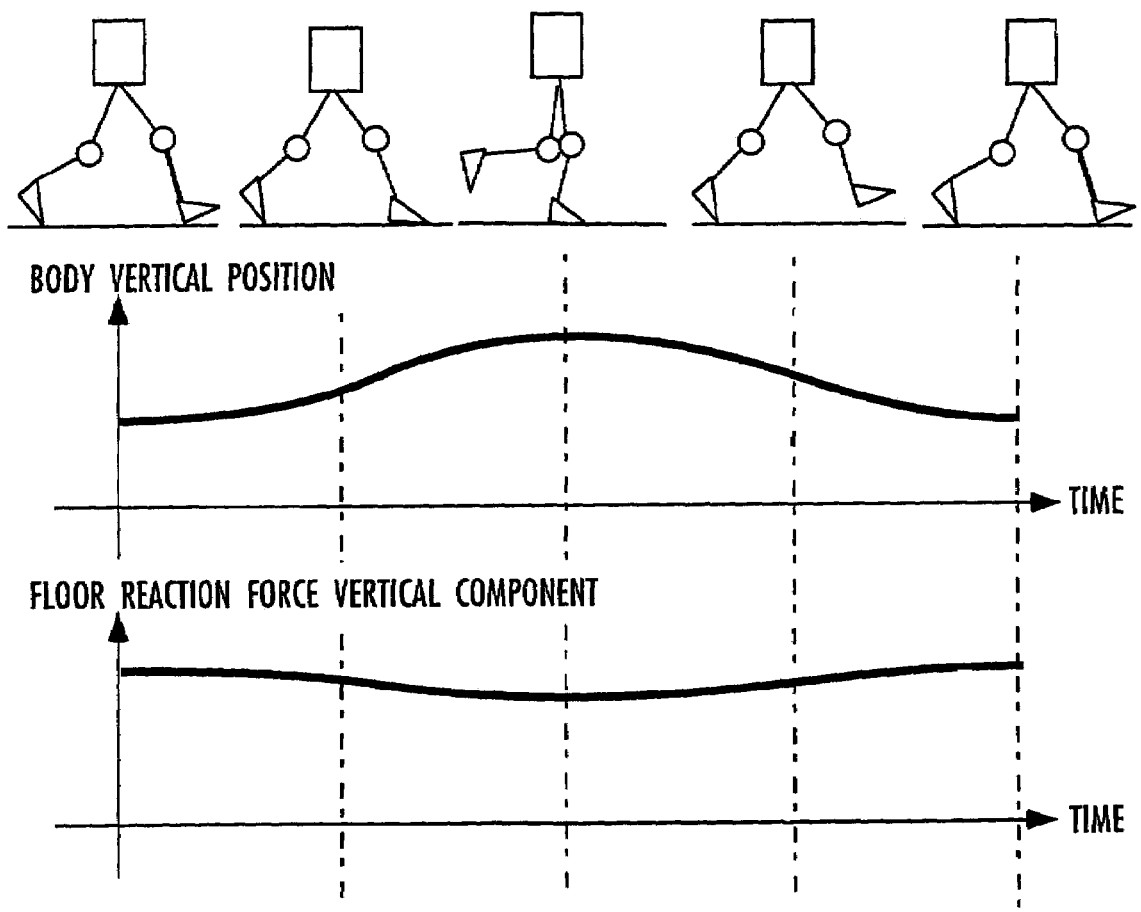

GAIT PRODUCING DEVICE FOR LEG TYPE MOVABLE ROBOT

TECHNICAL FIELD

The present invention relates to a gait generation device for a legged mobile robot which is suitable not only for generating a walking gait but also for generating a running gait.

BACKGROUND ART

Conventionally, generation of a gait (desired gait) for causing a legged mobile robot, for example, a two-legged mobile robot to move has primarily been aimed to generate a gait (walking gait) which causes the robot to perform a smooth walking action. However, in recent years, as the development of the legged mobile robot has been advanced, it is desired to generate a gait that can cause the robot not only to walk but also run.

Note that, since the word "gait" in Chinese characters includes a Chinese character meaning "walk", the word tends to be misunderstood as meaning only walking. However, originally, the word "gait" has a concept that also includes "running" as evidenced by the fact that it is used as a word for "trotting" or a running mode of a horse.

Now, differences in characteristics between walking and running will be described.

Typically, running is defined as a movement mode which includes an instant at which all the legs float in the air. However, this definition cannot always definitely distinguish between walking and running. For example, during fast jogging, most people have all their legs floating in the air at a certain instant. On the other hand, during slow jogging, many people have either of their legs always in contact with the ground. Defining the fast jogging as running and the slow jogging as walking seems to be slightly unreasonable.

FIG. 46 shows patterns of a body vertical position and a floor reaction force's vertical component (i.e., the sum of the floor reaction force's vertical components applied to the right and left legs) during typical running. FIG. 47 shows patterns of the body vertical position and the floor reaction force's vertical component during typical walking.

Here, the term "body vertical position/velocity" means the vertical position and velocity of a representative point of the body. The term "body horizontal position/velocity" means the horizontal position and velocity of the representative point of the body. The body vertical position/velocity and the body horizontal position/velocity are collectively referred to as a body position/velocity.

In addition, a "floor reaction force's vertical component" should be more precisely described as a "vertical component of the translation floor reaction force" in order to distinguish it from a moment component around a vertical axis of a floor reaction force. However, since the word is lengthy, "translation" is omitted here.

First, as for the movement of the body, when a robot walks, the body reaches the highest point at an instant when the body passes over the supporting leg. On the other hand, the body reaches the lowest point at that instant when the robot runs. That is, walking and running have inverse phases of the vertical movement pattern.

On the other hand, the floor reaction force is relatively constant during walking, while, during running, it largely varies and reaches the highest value at the instant when the body passes over the supporting leg. Of course, the floor reaction force is 0 at the instant when all the legs float in the air. From a more detailed observation, the floor reaction force produced during running is found to be approximately proportional to the extent of folding of the supporting leg. In other words, during running, the robot moves by jumping using the legs just like springs.

During slow jogging, the body vertical movement has the same phase as that of the typical running. In addition, in many cases, slow jogging doesn't include an instant when all the legs float in the air. Nevertheless, the floor reaction force is not completely but approximately 0 at an instant of switching of the supporting leg (free leg).

Therefore, as described above, it seems reasonable and appropriate that walking and running are distinguished from one another based on the characteristics of the patterns of the body vertical movement and floor reaction force so that slow jogging is also included in running.

In particular, distinguishing between running and walking in a most characteristic manner, it can be said that running is a movement mode in which the floor reaction force is 0 or substantially 0 at an instant of switching of the supporting leg, and walking is the other movement modes (in which the floor reaction force's vertical component is relatively constant).

In Japanese Patent Application No. 2000-352011, the applicants have already proposed a technique for generating a legged mobile robot's gait involving a floor reaction force in a flexible manner in real time while substantially satisfying a dynamical equilibrium condition (the dynamical equilibrium condition is a balance condition among the gravity, inertial force and floor reaction force for a desired gait. In a narrow sense, the condition is that the moment applied about the desired ZMP by the resultant force of gravity and the inertial force caused by the movement of the desired gait is 0. Details thereof will be described later). This technique and a series of control devices for legged mobile robots proposed by the applicants in Japanese Patent Laid-Open Nos. 10-86081 and 10-277969 and the like can be applied not only walking but also running.

However, according to these techniques, the body height (referred to as a body vertical position hereinafter) is determined in a geometrical manner based on the relative positional relationship between the body height and a foot, using the body height determination method previously proposed in Japanese Patent Laid-open No. 10-86080 by the applicants. Furthermore, the desired floor reaction force's vertical component is not set in an explicit manner but determined as a result of (depending on) the body vertical position (body height) determined in a geometrical manner as described above. Therefore, a desired floor reaction force's vertical component cannot always be produced. Thus, during running of the robot in which an instant when the floor reaction force's vertical component is 0 or substantially 0 has to be intentionally provided, the floor reaction force's vertical component produced as a result of a movement of the robot according to a desired gait may not be adequately reduced at the instant when the floor reaction force's vertical component should be 0 or substantially 0. If such a case occurs, the instant when the both feet of the robot float in the air or when only one of the feet is slightly in contact with the floor cannot be provided, so that it is difficult to make the robot run smoothly. That is, the conventional techniques are not the optimum control techniques, because the floor reaction force's vertical component pattern of the gait generated by the techniques is not always suitable for running.

In addition, in the case of a robot capable of running, it is desired that the robot can not only run smoothly but also walk smoothly and shifting between the walking gait and the running gait can be achieved smoothly. However, with the conventional techniques, a desired floor reaction force's vertical component suitable for running cannot always be generated, as described above. Thus, there is a possibility that shifting between the running gait and the walking gait cannot be achieved smoothly.

Therefore, an object of the present invention is to provide a gait generation device that can generate a desired gait for a robot which allows the robot to move smoothly regardless of the gait mode, such as a walking gait and a running gait, and allows the robot to smoothly shift between two different gait modes.

DISCLOSURE OF THE INVENTION

A gait generation device for a legged mobile robot according to the present invention is a gait generation device for generating a desired gait for a legged mobile robot that moves by operating a plurality of legs extending from a body, characterized in that the gait generation device comprises: desired vertical component trajectory determining means for determining a desired trajectory of a vertical component of a translation floor reaction force applied to the robot, a vertical component of a total center-of-gravity acceleration of the robot or a vertical component of a body acceleration of the robot; first desired vertical position determining means for determining a desired vertical position of the total center-of-gravity of the robot or the body thereof in such a manner that the vertical component of the translation floor reaction force, the vertical component of the total center-of-gravity acceleration or the vertical component of the body acceleration agrees with the desired trajectory set by the desired vertical component trajectory determining means; and second desired vertical position determining means for determining the desired vertical position of the total center-of-gravity of the robot or the body thereof based on a geometrical condition concerning displacement of a joint of a leg, and a final desired vertical position of the center-of-gravity of the robot or the body thereof is determined by selecting one of the desired vertical positions determined by the first and second desired vertical position determining means depending on the mode of the desired gait generated or combining the desired vertical positions (first implementation).

In the following description of the present invention (including the implementations other than the first implementation), for the sake of convenience, the vertical component of the translation floor reaction force, the vertical component of the total center-of-gravity acceleration of the robot or the vertical component of the body acceleration of the robot will be sometimes referred to as a translation floor reaction force (or the like) vertical component. In addition, the total center of gravity of the robot or the body thereof will be sometimes referred to as a total center of gravity (or the like).

According to the present invention (first implementation thereof), two desired vertical positions of the total center of gravity (or the like) are determined, and the final desired vertical position is determined by selecting one of them depending on the gait mode, such as a walking gait or running gait, or combining them.

In this case, as for one of the desired vertical positions (specifically, the desired vertical position determined by the first desired vertical position determining means), the desired trajectory of the translation floor reaction force (or the like) vertical component is first determined, and then, the desired vertical position of the total center of gravity (or the like) of the robot is determined in such a manner that the translation floor reaction force (or the like) vertical component agrees with the determined desired trajectory.

Here, the translation floor reaction force's vertical component is proportional to the sum of the vertical component of the total center-of-gravity acceleration of the robot and the gravitational acceleration. Furthermore, for example, in the case where the mass of the legs of the robot is sufficiently smaller than the mass of the body, the translation floor reaction force's vertical component is approximately proportional to the sum of the body acceleration vertical component and the gravitational acceleration. Thus, a desired translation floor reaction force's vertical component can be produced not only by determining the desired trajectory of the translation floor reaction force's vertical component itself or but also by determining the desired trajectory of the vertical component of the total center-of-gravity acceleration or body acceleration vertical component. Thus, according to the present invention, any of the desired trajectories of the translation floor reaction force's vertical component, the vertical component of the total center-of-gravity acceleration or the body acceleration vertical component may be set. Furthermore, the sum of the gravitational acceleration and the second-order differential of the trajectory of the total center-of-gravity vertical position or body vertical position is approximately proportional to the translation floor reaction force (or the like) vertical component.

Thus, if the desired vertical position of the total center of gravity of the robot or the body thereof is determined in such a manner that the translation floor reaction force (or the like) vertical component agrees with the desired trajectory of the translation floor reaction force (or the like) vertical component, the trajectory of the total center-of-gravity (or the like) vertical position is determined so that the translation floor reaction force (or the like) vertical component caused by a vertical movement (movement in the vertical direction) of the total center of gravity (or the like) of the robot agrees with the desired trajectory thereof. Thus, the desired vertical position determined by the first desired vertical position determining means allows production of the desired translation floor reaction force's vertical component or a translation floor reaction force's vertical component approximately equal to the desired one. Therefore, the desired vertical position is suitable for a running gait of the robot, for example.

On the other hand, the other desired vertical position (specifically, the desired vertical position determined by the second desired vertical position determining means) is determined based on a geometrical condition concerning displacement of a joint of a leg. Therefore, the desired vertical position allows the displacement of a joint of each leg to be kept within an appropriate range (for example, a joint displacement range which prevents the leg from being fully stretched). Therefore, the desired vertical position is suitable for a walking gait of the robot, for example.

According to the present invention, one of these desired vertical positions is selected depending on the gait mode, such as a walking gait and running gait, or these desired vertical positions are combined with each other. Thus, the desired gait generated can include a desired vertical position suitable for the respective gait modes or a movement mode during a period in which shifting between the gaits occurs.

Thus, according to the first implementation, a desired gait for a robot can be generated which allows the robot to move smoothly regardless of the gait mode, such as a walking gait and a running gait, and allows the robot to smoothly shift between two different gait modes.

In the first implementation, it is preferable that the desired vertical position determined by the first desired vertical position determining means is selected as the final desired vertical position of the total center-of-gravity of the robot or the body thereof if the desired gait is of a first gait mode which alternately repeats a floor-contact period, when at least one leg of the robot is in contact with the floor, and a floating period, when all the legs float in the air, and the desired vertical position determined by the second desired vertical position determining means is selected as the final desired vertical position of the total center-of-gravity of the robot or the body thereof if the desired gait is of a second gait mode in which the legs of the robot each alternately land and take off the floor while assuring that at least one of the legs is in contact with the floor at any time (second implementation).

According to this implementation, in order to generate a gait of the first gait mode which alternately repeats a floor-contact period and a floating period, that is, a running gait mode of the robot or the like, the desired vertical position based on the desired trajectory of the translation floor reaction force (or the like) vertical component is selected. On the other hand, in order to generate a gait of the second gait mode which alternately repeats landing and taking-off of each leg while assuring that at least one of the legs is in contact with the floor at any time, that is, a walking gait mode of the robot or the like, the desired vertical position based on the geometrical condition is selected. Thus, for each of the first and second gait modes, a desired gait suitable for the gait mode can be generated.

In the second implementation, it is preferable that the desired vertical component trajectory determining means determines the desired trajectory in such a manner that the vertical component of the translation floor reaction force for the desired trajectory varies in a convex pattern within the positive value region during the floor-contact period of the first gait mode and is kept at 0 during the floating period of the first gait mode (third implementation).

According to this implementation, the desired trajectory of the translation floor reaction force (or the like) vertical component determined is suitable for a running gait, and thus, a movement (particularly, vertical movement) of the robot with a desired gait suitable for running can be determined. That is, it is possible to surely prevent generation of a desired gait that cannot satisfy the requirements: the translation floor reaction force's vertical component has to be 0 during the floating period; and a sufficient translation floor reaction force's vertical component has to be produced during the floor-contact period. Therefore, with the desired gait, the robot can be made to move smoothly in the gait mode which repeats the floating period and the floor-contact period.

Furthermore, in the second and third implementations described above, it is preferable that, when generating the desired gait for a period in which shifting between the first gait mode and the second gait mode occurs, the final desired vertical position of the total center-of-gravity of the robot or the body thereof is determined by taking a weighted average of the desired vertical position determined by the first desired vertical position determining means and the desired vertical position determined by the second desired vertical position determining means (fourth implementation).

According to this implementation, the desired vertical position during the period in which shifting between the first gait mode and the second gait mode occurs can be determined so as to be suitable for the gait modes, and thus, the desired gait generated can allow the robot move smoothly during the period for shifting. In principle, as for the weight used in taking the weighted average, it is preferable that the weight related to the desired vertical position determined by the first desired vertical position determining means (desired vertical position based on the desired trajectory of the translation floor reaction force (or the like) vertical component) is higher than that related to the desired vertical position determined by the second desired vertical position determining means in a period closer to the period of the first gait mode, and the weight related to the desired vertical position determined by the second desired vertical position determining means (desired vertical position based on the geometrical condition) is higher than that related to the desired vertical position determined by the first desired vertical position determining means in a period closer to the period of the second gait mode.

In addition, in the second to fourth implementations, it is preferable that the first gait mode is a gait mode of a running operation of the robot, and the second gait mode is a gait mode of a walking operation of the robot (fifth implementation). Thus, a desired gait with which the two-legged mobile robot can walk, run and shift between walking and running smoothly can be generated.

In the first to fifth implementations described above, it is preferable that the geometrical condition concerns displacement of a particular joint of each leg of the legged mobile robot which is provided between an end portion of the leg and a joint of the leg which connects the leg to the body (sixth implementation). In other words, in order to make the robot make a desired movement with reliability and to reduce the impact on the supporting leg at the time of landing of or the like, it is particularly preferred to allow a certain margin for displacement of the particular joint (or to provide a state in which a certain joint displacement is permitted, for example, a state in which the leg is prevented from being fully stretched). According to the sixth implementation, since the geometrical condition is one-concerning displacement of the particular joint, the desired vertical position of the total center of gravity (or the like) which surely provides the preferred state can be determined. In the case of a two-legged mobile robot whose legs each have a hip joint, a knee joint and an ankle joint, for example, the particular joint is the knee joint.

In the sixth implementation, it is preferable that the geometrical condition is a condition which involves the displacements of all the particular joints as variables and is defined so that a value of a continuous monotone function of displacement of the particular joint in the stretching direction of each leg is approximately kept at a predetermined value (seventh implementation).

According to this implementation, the total center-of-gravity (or the like) vertical position that prevents each leg from being fully stretched can be determined. In the case of a two-legged mobile robot whose legs each have a hip joint, a knee joint and an ankle joint, for example, the function mentioned above may be addition of the bending angles, or the inverse numbers of the sines thereof, of the knee joints of the two legs.

BRIEF DESCRIPTION OF THE DRAWINGS

FIG. 47 is a diagram showing a relationship between a body vertical position and a floor reaction force's vertical component in a walking gait.

BEST MODE FOR CARRYING OUT THE INVENTION

In the following, one-embodiment of a gait generation device and a control device for a legged mobile robot according to the present invention will be described with reference to the drawings. In the embodiments of the present invention, a two-legged mobile robot is taken as an example of the legged mobile robot.

Figure 1:
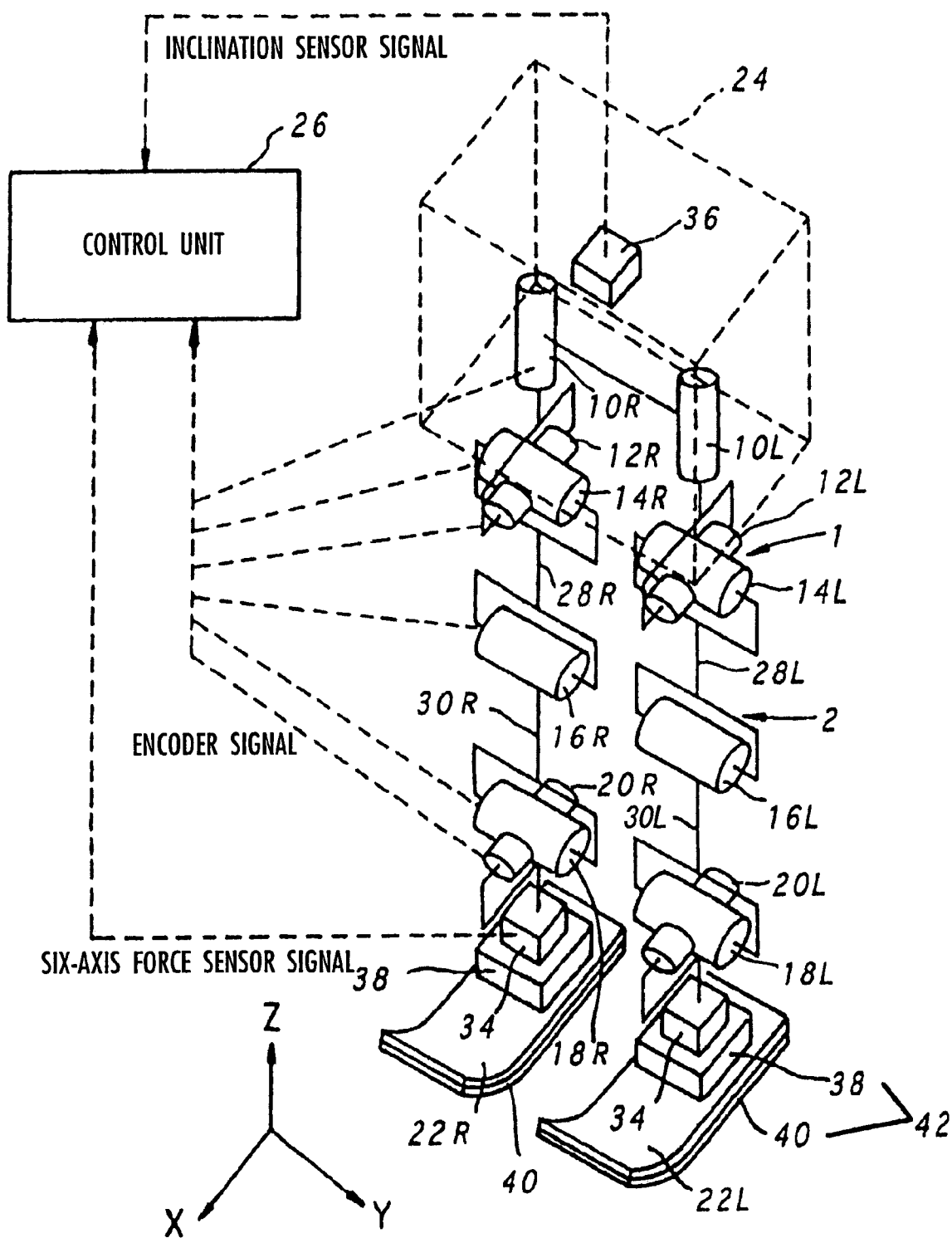
FIG. 1 is a schematic diagram showing a whole arrangement of a two-legged mobile robot, which is a legged mobile robot according to an embodiment of the present invention.

FIG. 1 is a schematic diagram showing a whole arrangement of a two-legged mobile robot, which is a legged mobile robot which uses a gait generation device and a control device according to an embodiment of the present invention.

As shown in the drawing, a two-legged mobile robot (referred to as a robot, hereinafter) 1 comprises a pair of left and right legs (leg links) 2, 2 extending downward from a body 24. The legs 2, 2 have the same construction and each have six joints. In the order of increasing distance from the body 24, the six joints include a hip (waist) joint 10R (10L) for convolution (rotation) (rotation in the yaw direction with respect to the body 24), a hip (waist) joint 12R (12L) for rotation in the roll direction (about the X axis), a hip (waist) joint 14R (14L) for rotation in the pitch direction (about the Y axis), a knee joint 16R (16L) for rotation in the pitch direction, an ankle joint 18R (18L) for rotation in the pitch direction, and an ankle joint 20R (20L) for rotation in the roll direction. Reference symbols R and L indicate the right leg and the left leg, respectively.

Under the two ankle joints 18R(L) and 20R(L) of each leg 2, a foot (foot portion) 22R(L) which constitutes the end portion of the leg 2 is attached. The body (base body) 24 is mounted on the top of the two legs 2, 2 via the hip joints 10R, 10L, 12R, 12L, 14R and 14L (three joints for each leg 2). The body 24 houses a control unit 26 and the like, which will be described in detail later. In FIG. 1, for the convenience of illustration, the control unit 26 is shown as being external to the body 24.

In each leg 2 configured as described above, the hip joint (or waist joint) is composed of the joints 10R (L), 12R (L) and 14R (L), and the knee joint is composed of the joint 16R (L), and the foot joint (ankle joint) is composed of the joints 18R(L) and 20R(L). The hip joint and the knee joint are connected to each other by a thigh link 28R(L), and the knee joint and the foot joint are connected to each other by a crus link 30R(L).

Although not shown, a pair of left and right arms are attached to the upper part of the body 24 on either side thereof, and a head is mounted on the top of the body 24. Detailed description of the arms and the head is omitted in this specification, because they have no direct concern with the essence of the present invention. However, each arm has a plurality of joints and can make movements, such as back and forth swing with respect to the body 24, by the action the joints.

Configuring each leg 2 as described above provides the foot 22R (L) of the leg 2 with six degrees of freedom with respect to the body 24. When the robot 1 moves, desired movements of the feet 22R and 22L can be realized by driving the twelve joints of the two legs 2, 2 (6*2=12) to appropriate angles (in this specification, the symbol "*" represents multiplication of scalar operation or outer product of vector operation). Thus, the robot 1 can move arbitrarily in a three-dimensional space.

The "position" and "velocity" of the body 24 described later in this specification refer to the position of a predetermined part of the body 24, specifically, a predetermined representative point of the body 24 (for example, a midpoint between the left and right hip joints) and the movement velocity of the point. Similarly, the "position" and "velocity" of each foot 22R(22L) refer to the position of a predetermined representative point of the foot 22R (22L) and the movement velocity of the point. In this embodiment, for example, the representative point of each foot 22R (22L) is set in the sole surface of the foot 22R (22L) (more specifically, a point at which a perpendicular line extending from the center of the ankle joints of each leg 2 to the sole surface of the foot 22R (22L) intersects with the sole surface, for example).

As shown in FIG. 1, each leg 2 has a well-known six-axis force sensor 34 disposed below the ankle joints 18R(L) and 20R(L) and interposed between the ankle joints and the foot 22R(L). The six-axis force sensor 34 detects the presence of landing of the foot 22R (22L) of the leg 2, the floor reaction force (floor-contact load) applied to the leg 2, and the like. The six axis force sensor outputs, to the control unit 26, detection signals of three directional components Fx, Fy and Fz of the translation force of the floor reaction force and three directional components Mx, My and Mz of the moment thereof. In addition, the body 24 has an inclination sensor 36 for detecting the inclination (posture angle) of the body 24 with respect to the Z axis (vertical direction (direction of gravity)) and the angular velocity thereof, and the inclination sensor 36 outputs the detection signals to the control unit 26. In addition, although not shown in detail, each joint in the robot 1 has an electric motor 32 for driving it (see FIG. 3) and an encoder (rotary encoder) 33 (see FIG. 3) for detecting the rotation amount of the electric motor 32 (rotation angle of the joint). The encoder 33 outputs the detection signal to the control unit 26.

Figure 2:
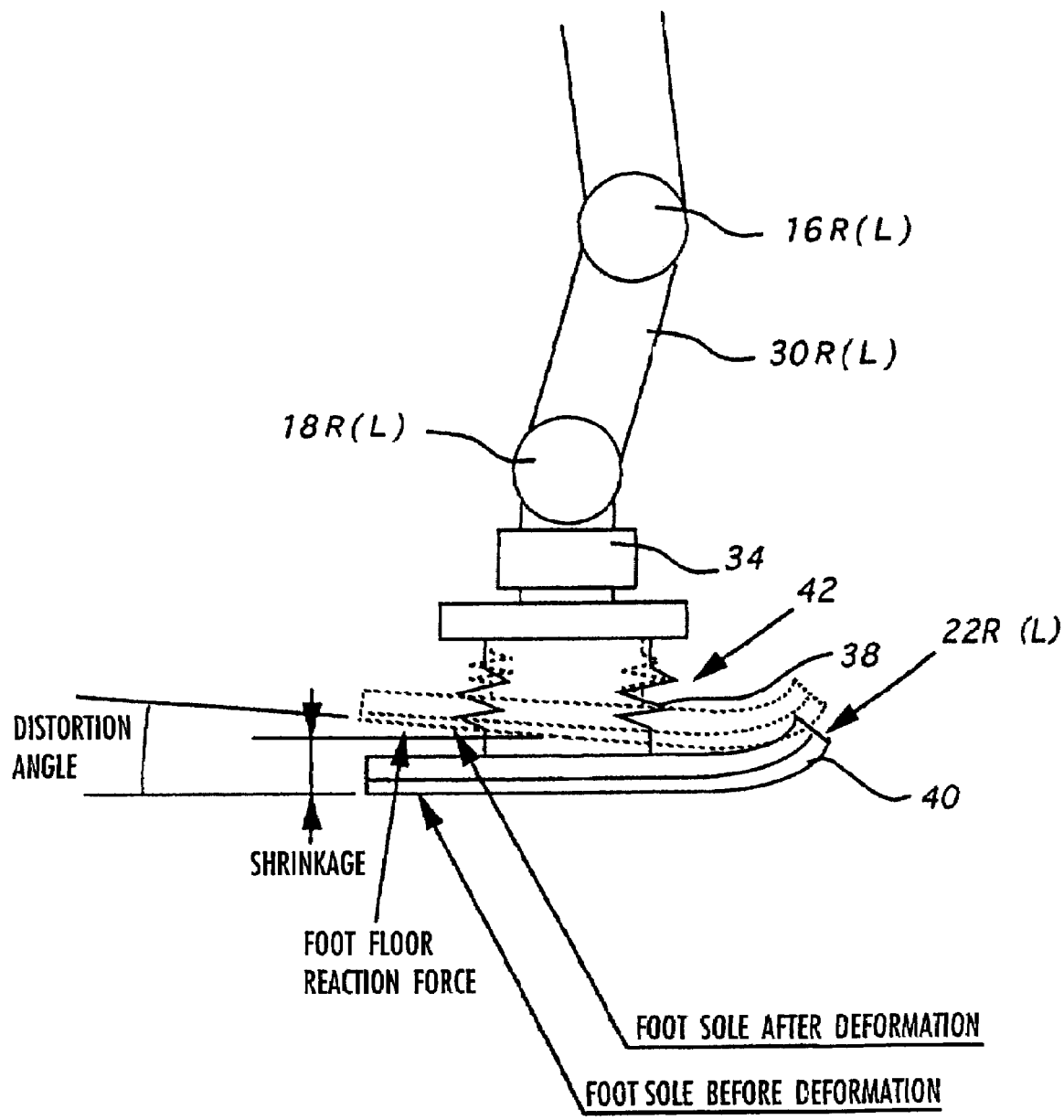
FIG. 2 is a side view of a foot portion of each leg of the robot shown in FIG. 1.

As shown in FIG. 2, a spring mechanism 38 is provided above each foot 22R(L) and between the foot 22R(L) and the six-axis force sensor 34, and a foot sole elastic member 40 made of a rubber or the like is attached to the foot sole (bottom surface) of each foot 22R(L). The spring mechanism 38 and the foot sole elastic member 40 constitute a compliance mechanism 42. Specifically, the spring mechanism 38 comprises a rectangular guide member (not shown) mounted on the upper surface of the foot 22R(L) and a piston member (not shown) mounted on the same side as the ankle joint 18R(L) (the ankle joint 20R(L) is not shown in FIG. 2) and the six-axis force sensor 34 and housed in the guide member in such a manner that the piston member can slightly move in the guide member due to an elastic member (such as a rubber or spring).

The foot 22R(L) shown by the solid line in FIG. 2 is in a state where no floor reaction force is applied to the foot. When a floor reaction force is applied to the leg 2, the spring mechanism 38 and the foot sole elastic member 40 of the compliance mechanism 42 are distorted, thereby shifting the foot 22R(L) to a position/posture as indicated by the dotted line in FIG. 2. This configuration of the compliance mechanism 42 is important not only for reducing the landing impact but also for increasing the controllability of the robot 1. Detailed description of the compliance mechanism is omitted herein, because it is described in detail in Japanese Patent Laid-Open No. 5-305584 previously proposed by the applicants.

Furthermore, although not shown in FIG. 1, a joystick (manipulator) 44 (see FIG. 3) for manipulating the robot 1 is provided external to the robot 1. A request concerning the gait of the robot 1, such as a request to turn the robot 1 moving straight ahead, can be entered to the control unit 26 as required by manipulating the joystick 44. In this case, requests that can be entered include those concerning the gait modes (walking gait, running gait or the like) of the robot 1 in motion, the landing position/posture or landing time of a free leg, and command data for prescribing the landing position/posture and landing time (for example, the movement direction of the robot 1, the movement velocity thereof).

Figure 3:
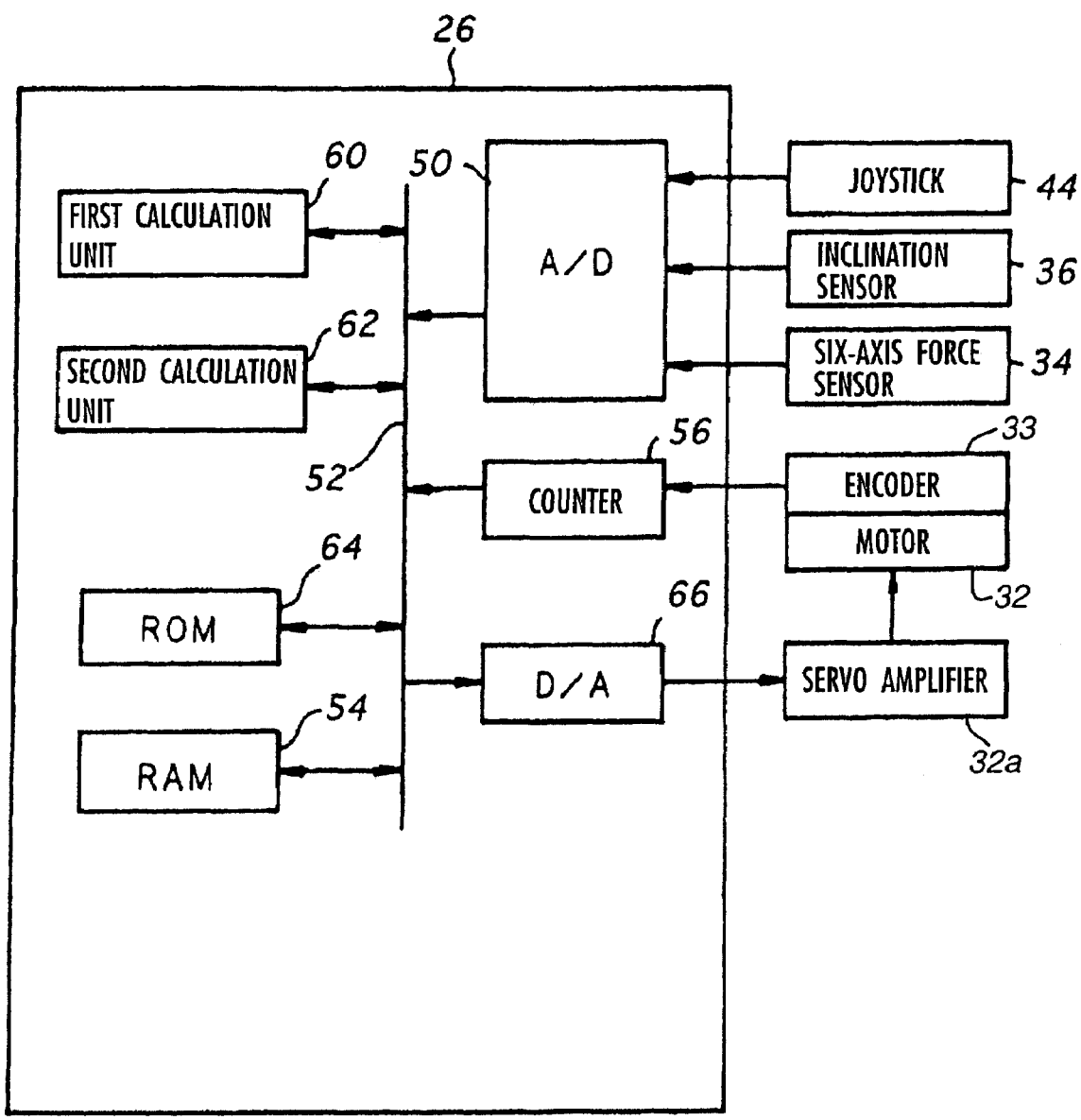
FIG. 3 is a block diagram showing a control unit provided in the robot shown in FIG. 1.

FIG. 3 is a block diagram showing an arrangement of the control unit 26. The control unit 26 is constituted by a microcomputer and comprises a first calculation unit 60 and a second calculation unit 62 (which constitute a CPU), an A/D converter 50, a counter 56, a D/A converter 66, a RAM 54, a ROM 64 and a bus line 52 for data transmission among these components. In the control unit 26, the output signals from the six-axis force sensors 34 of the legs 2, the inclination sensor 36, the joystick 44 and the like are converted into digital values in the A/D converter 50 and then input to the RAM 54 via the bus line 52. Besides, the outputs from the encoders 33 (rotary encoders) at the joints of the robot 1 are input to the RAM 54 via the counter 56.

As described later, the first calculation unit 60 generates a desired gait, calculates a joint angle displacement command (command value of the displacement angle of each joint or the rotation angle of each electric motor 32) and transmits the command to the RAM 54. The second calculation unit 62 reads, from the RAM 54, the joint angle displacement command and the measurement value of the joint angle indicated by the output signal of each encoder 33, calculates the operating amount of each joint to be driven and outputs the operating amount data to the electric motor 32 that drives the joint via the D/A converter 66 and a servo amplifier 32a.

Figure 4:
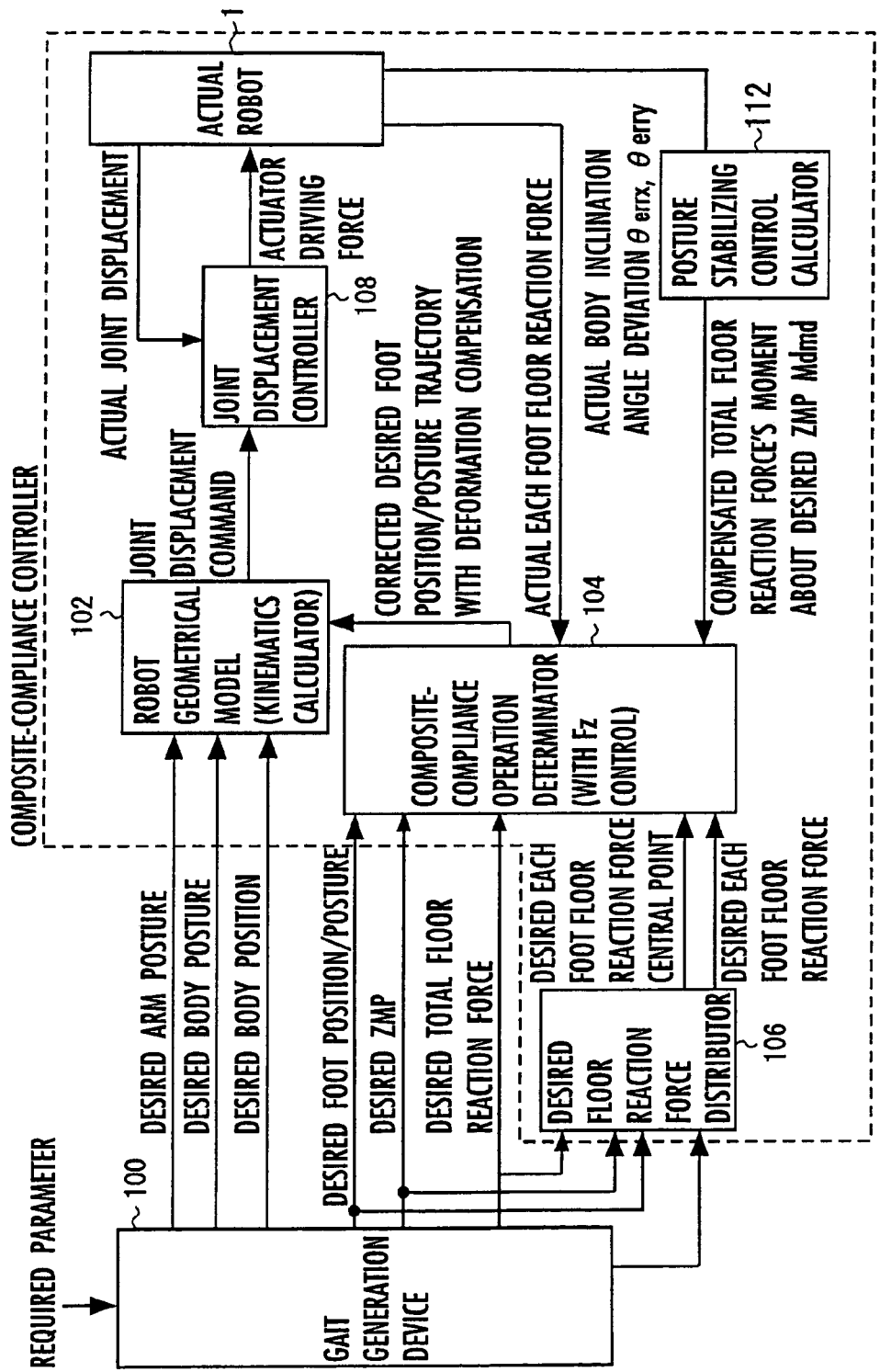
FIG. 4 is a block diagram showing a functional arrangement of the control unit shown in FIG. 3.

FIG. 4 is a block diagram showing a whole functional arrangement of the gait generation device and the control device of the robot 1 according to this embodiment. All the parts in FIG. 4 except for the part designated as an "actual robot" are implemented by the functions performed by the control unit 26 (functions performed mainly by the first calculation unit 60 and the second calculation unit 62). In the following description, the reference symbols R and L will be omitted if there is no need to discriminate between the left and right legs 2.

The control unit 26 has a gait generation device 100 that generates and outputs a desired gait flexibly and in real time as described later. The gait generation device 100 has functions that implement means according to the present invention. The desired gait output from the gait generation device 100 includes a desired body position/posture trajectory (trajectories of a desired position and a desired posture of the body 24), a desired foot position/posture trajectory (trajectories of a desired position and a desired posture of each foot 22), a desired arm posture trajectory (a trajectory of a desired posture of each arm), a desired total floor reaction force central point trajectory (a desired ZMP trajectory), and a desired total floor reaction force trajectory. If the body 24 has a movable member other than the legs 2 and the arms, a desired position/posture trajectory of the movable member is added to the desired gait.

Here, the term "trajectory" means a time-varying pattern (time-series pattern), and is sometimes referred to also as a "pattern" in the following description. In addition, the term "posture" means a spatial orientation of each component. Specifically, for example, the body posture is represented by the inclination angle (posture angle) of the body 24 with respect to the Z axis (vertical axis) in the roll direction (about the X axis) and the inclination angle (posture angle) of the body 24 with respect to the Z axis in the pitch direction (about the Y axis), and the foot posture is represented by the spatial azimuth angles of two axes set fixedly to each foot 22. In this specification, the body posture is sometimes referred to also as a body posture angle.

In the following description, the term "desired" will often be omitted as far as it causes no misunderstanding. The components of the gait other than those related to the floor reaction force, that is, the components related to the movement of the robot 1, such as the foot position/posture and the body position/posture, are collectively referred to as a "movement". Furthermore, the floor reaction force applied to each foot 22 (the floor reaction force composed of the translation force and the moment) is referred to as an "each-foot floor reaction force", and the resultant force of the "each-foot floor reaction forces" applied to all (two) the feet 22R and 22L of the robot 1 is referred to as a "total floor reaction force". However, in the following description, there is made little mention of the each-foot floor reaction force, and therefore, the "floor reaction force" means the same as the "total floor reaction force" unless otherwise specified.

In general, the desired floor reaction force is represented by the point of application, and the translation force and the moment applied to the point. The point of application can be set arbitrarily, so that one desired floor reaction force can be represented in an infinite number of ways. However, if the desired floor reaction force is represented by taking the desired floor reaction force central point (desired position of the central point of the total floor reaction force) as the point of application, the moment components of the desired floor reaction force are 0 except for the vertical component (the moment about the vertical axis (Z axis)). In other words, the horizontal moment components of the desired floor reaction force about the desired floor reaction force central point (the moments about the horizontal axes (X axis and Y axis)) are 0.

Here, in a gait which satisfies the dynamical equilibrium condition, the ZMP (the point where the moments applied by the resultant force of the inertial force and gravity applied to the point are 0 except for the vertical moment) calculated from the desired movement trajectory of the robot 1 agrees with the desired floor reaction force central point. Therefore, providing the desired floor reaction force central point trajectory means the same as providing the desired ZMP trajectory (for more information, see Japanese Patent Application No. 2000-352011 filed by the applicants).

Based on such a background, in the specification of Japanese Patent Application No. 2000-352011 described above, the desired gait is defined as follows.

(a) In a broad sense, the desired gait is a set of a desired movement trajectory and a desired floor reaction force trajectory for a period of one or more steps.

(b) In a narrow sense, the desired gait is a set of a desired movement trajectory and a ZMP trajectory for a period of one step.

(c) A gait series is a connection of several gaits.

In walking, when the vertical position of the body 24 (body height) of the robot 1 is determined by the body height determination method previously proposed in Japanese Patent Laid-open No. 10-86080 by the applicants, the translation floor reaction force's vertical component is determined accordingly. Furthermore, if the body horizontal position trajectory of the robot 1 is determined in such a manner that the horizontal component of the moment produced about the desired ZMP by the resultant force of the inertial force due to the movement with the desired gait and gravity is 0, the translation floor reaction force's horizontal component is also determined. Therefore, in the specification of the Japanese Patent Application No. 2000-352011, the physical value concerning the floor reaction force of the desired gait which has to be explicitly set is only the desired ZMP. Therefore, as the definition of the desired gait in a narrow sense, the definition (b) described above is sufficient. On the other hand, in a running gait of the robot 1 described in this embodiment (details thereof will be described later), the floor reaction force's vertical component (the translation floor reaction force's vertical component) is also essential in controlling the robot. Therefore, in the present invention, a desired trajectory of the floor reaction force's vertical component is explicitly set, and then, trajectories of the desired body's vertical position and the like of the robot 1 are determined. Thus, in this specification, as a definition of the desired gait in a narrow sense, (b') described below is used.

(b') in a narrow sense, the desired gait is a set of a desired movement trajectory and a desired ZMP trajectory thereof and a desired translation floor reaction force's vertical component trajectory for a period of one step.

In this specification, to be readily understood, the term "desired gait" is used to mean the desired gait in the narrow sense of the above (b') unless otherwise specified. In this case, the term "one step" in the desired gait is used to mean a leg operation starting with landing of one leg 2 of the robot 1 and ending with landing of the other leg 2. Note that, in the following description, the "floor reaction force's vertical component" means the "translation floor reaction force's vertical component", and the vertical component of the moment of the floor reaction force (the component about the vertical axis) is discriminated from the "floor reaction force's vertical component" by using the term "moment". Similarly, the "floor reaction force's horizontal component" means the "translation floor reaction force's horizontal component".

Furthermore, of course, a "two-leg supporting period" refers to a period in which the two legs 2, 2 support the weight of the robot 1, a "one-leg supporting period" refers to a period in which either one of the legs 2, 2 supports the weight of the robot 1, a "floating period" refers to a period in which both the legs 2, 2 are away from the floor (floating in the air). The leg 2 that doesn't support the weight of the robot 1 during the one-leg supporting period is referred to as a "free leg". In the running gait described in this embodiment, there is no two-leg supporting period, and the one-leg supporting periods (landing periods) and the floating periods are repeated alternately. In this case, during the floating period, both the two legs 2, 2 don't support the weight of the robot 1. However, the leg 2 that has been a free leg during the one-leg supporting period immediately preceding the floating period is referred to as a free leg during the floating period, and the leg 2 that has been a supporting leg during the one-leg supporting period immediately preceding the floating period is referred to as a supporting leg during the floating period.

With the running gait shown in FIG. 5 as an example, a desired gait generated by the gait generation device 100 will be described schematically. Here, other definitions and details concerning the gait are described in Japanese Patent Laid-Open No. 10-86081 previously proposed by the applicants, and therefore, the following is descriptions that are not made in Japanese Patent Laid-Open No. 10-86081.

First, the running gait shown in FIG. 5 will be described. This running gait is one similar to a typical running gait of a human being. In this running gait, the one-leg supporting periods in which the foot 22 of only one of the left and right legs 2 of the robot 1 (supporting leg) lands (is in contact with the floor) and the floating periods in which both the legs 2, 2 float in the air are repeated alternately. The first state in FIG. 5 is a state (initial state) of the robot 1 at the start of a one-leg supporting period, the second state is a state thereof at the middle of the one-leg supporting period, the third state is a state thereof at the start of a floating period following the one-leg supporting period (the end of the one-leg supporting period), the fourth state is a state thereof at the middle of the floating period, and the fifth state is a state thereof at the end of the floating period (the start of the next one-leg supporting period).

Figure 5:
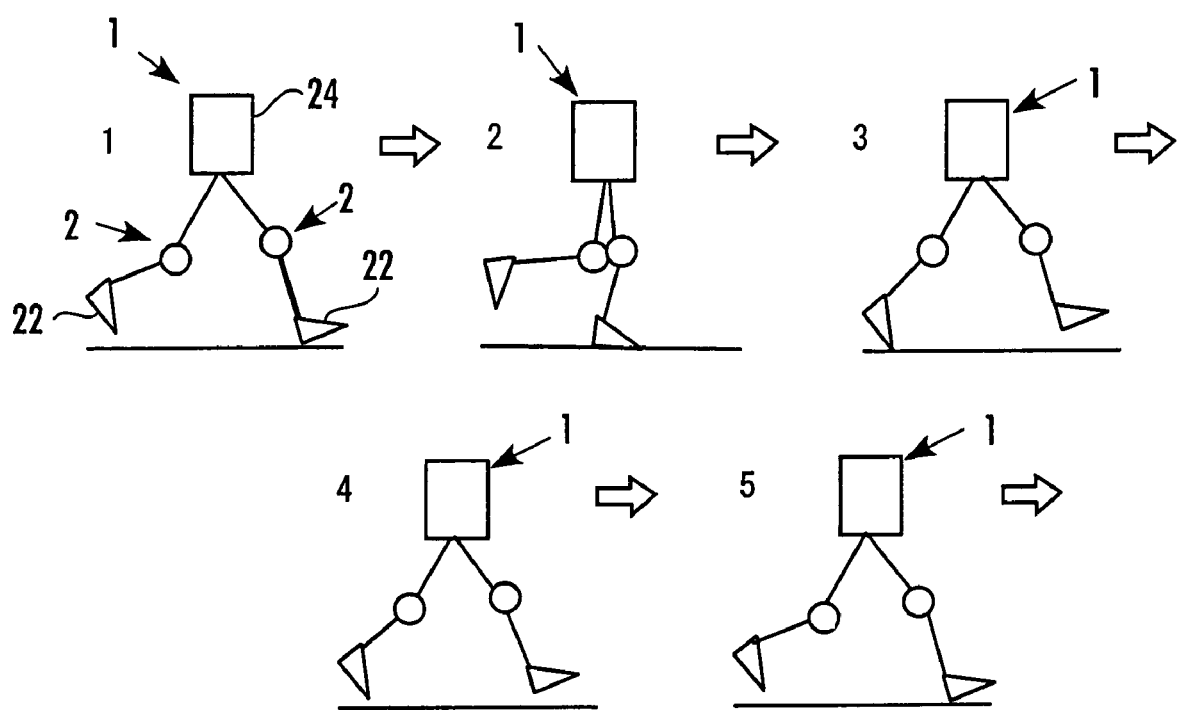
FIG. 5 is a diagram for illustrating a running gait for the robot shown in FIG. 1.

In this running gait, as shown in the first state in FIG. 5, the robot 1 lands on the heel of the foot 22 of the supporting leg (the leading leg 2 of the robot 1 in the movement direction) at the start of the one-leg supporting period. Then, as shown in the second state in FIG. 5, substantially the whole surface of the sole of the landing foot 22 (foot 22 of the supporting leg) of the robot 1 comes into contact with the floor, and then, as shown in the third state in FIG. 5, the robot 1 jumps into the air by kicking the floor on the toe of the foot 22 of the supporting leg (foot 22 of the trailing leg 2 in the movement direction of the robot 1 in the third state shown in FIG. 5). This is the time when the one-leg supporting period ends and the floating period starts. During the one-leg supporting period, the free leg, which is located rearward of the supporting leg at the start of the one-leg supporting period as shown in the first state in FIG. 5, is swung forward of the supporting leg toward a next expected landing position, as shown in the second and third states in FIG. 5. Then, after the floating period shown as the fourth state in FIG. 5, the robot 1 lands on the heel of the foot 22 of the free leg (leg 2 that has been the free leg during the one-leg supporting period immediately preceding the floating period), and then, the next one-leg supporting period starts.

With reference to the running gait in FIG. 5, a desired gait generated by the gait generation device 100 will be described schematically. As described in detail later, when the gait generation device 100 generates a desired gait, basic required values (required parameters) for desired gait generation, such as landing position/posture (expected landing position/posture) and landing time (expected landing time) of the foot 22 of the free leg, are supplied to the gait generation device 100 via a required operation of the joystick 44 or the like. The gait generation device 100 generates the desired gait using the required parameters. More specifically, based on the required parameters, the gait generation device 100 determines parameters (referred to as gait parameters) that define some of the components of the desired gait, such as the desired foot position/posture trajectory and the desired floor reaction force's vertical component trajectory for the desired gait, and then successively determines instantaneous values of the desired gait using the gait parameters, thereby generating a time-series pattern of the desired gait.

In this case, the desired foot position/posture trajectory (more specifically, desired trajectories of spatial components (such as X axis component) of the position and posture of the foot) is generated for each foot 22 using the finite duration settling filter proposed by the applicants in Japanese Patent No. 3233450, for example. The finite duration settling filter is a series connection of plural (three or more, in this embodiment) stages of first-order delay filters of a variable time constant, that is, filters having a transmission function represented as $1/(1+\tau s)$ where $\tau$ is a variable time constant (this filter is referred to as a unit filter, hereinafter). And, the finite duration settling filter can generate and output a trajectory that reaches to a specified value at a desired specified time. In this case, the time constant $\tau$ of the unit filter of each stage is successively set in a variable manner based on the remaining time before the specified time after the definite duration settling filter starts generating the output. More specifically, as the remaining time decreases, the value of $\tau$ decreases from a predetermined initial value (>0), and finally, at the specified time when the remaining time is 0, the value of $\tau$ becomes 0. And, a step input having a height depending on the specified value (more specifically, the amount of variation of the output of the definite duration settling filter from the initial value to the specified value) is given to the definite duration settling filter. Such a definite duration settling filter can not only generate such an output that reaches to the specified value at the specified time but also have the variation rate of the output thereof being 0 or substantially 0 at the specified time. In particular, if the unit filters are interconnected in three or more stages (three stages are enough), the variation acceleration (the differential value of the variation rate) of the output of the definite duration settling filter can be 0 or substantially 0.

The generation of the foot position/posture trajectory (the position/posture trajectory of the foot 22 from a landing thereof to the next landing thereof) using such a definite duration settling filter is conducted in the following manner, for example. For example, the desired foot position trajectory in the X axis direction (back-and-forth direction) is generated as follows. That is, the height of the step input to the definite duration settling filter is determined depending on the X-axis directional position of the next expected landing position of each foot 22 (more specifically, the amount of variation (displacement) in the X axis direction of the next expected landing position with respect to the preceding landing position, this being equivalent to the specified value) which is determined by the required parameters, and the time constant $\tau$ is initialized to a predetermined initial value. Then, the determined step input is given to the definite duration settling filter, and generation of the trajectory of the X-axis directional position of the foot 22 is started. During the trajectory generation, the time constant $\tau$ is successively set in a variable manner so as to decrease from the initial value to 0 by the expected landing time of the foot 22 (which is equivalent to the specified time). In this way, the trajectory of the position of the foot 22 in the X axis direction that reaches to the expected landing position at the expected landing time is generated.

Besides, the desired foot position trajectory in the Z axis direction (vertical direction) is generated in the following manner, for example. Specifically, first, based on the next expected landing position and expected landing time of the foot 22, the Z-axis directional position of the foot 22 at the time when the foot 22 reaches the maximum height (vertical position) (referred to as a highest position, hereinafter) and the time required to reach the highest position are determined. Then, according to the highest position (which is equivalent to the specified value), the height of the step input to the definite duration settling filter is determined, and the time constant τ is initialized. And then, the determined step input is given to the definite duration settling filter, and the foot position trajectory to the highest position in the Z axis direction is successively generated. In this regard, the time constant τ is successively set in a variable manner so as to decrease from the initial value to 0 by the time when the highest position is reached (this time being equivalent to the specified time). Furthermore, when the generation of the trajectory to the highest position in the Z axis direction is completed, the time constant τ is initialized, a step input of the polarity opposite to that of the step input having been used (more specifically, a step input of the opposite polarity having a height depending on the amount of variation in the Z axis direction from the highest position to the next expected landing position (this being equivalent to the specified value)) is input to the definite duration settling filter, and the foot position trajectory in the Z axis direction from the highest position to the expected landing position is successively generated. In this regard, the time constant τ is successively set in a variable manner so as to decrease from the initial value to 0 by the expected landing time of the foot 22.

When generating the foot position trajectory in the Z axis direction, the time constant τ may be set in a variable manner so as to decrease from the initial value to 0 in a period from the start of the trajectory generation to the expected landing time of the foot 22, and the polarity of the step input may be switched to the opposite one at the time when the highest position is reached or the time in the vicinity thereof. In this case, although the foot 22 cannot reach to a desired highest position with a high precision, the foot 22 can reach the expected landing position at the expected landing time without problems.

The foot posture trajectory can be generated using the definite duration settling filter, as with the foot position trajectory described above. In this case, as for a spatial component of the foot posture whose posture angle variation is monotonic (monotonically increasing or monotonically decreasing), the foot posture trajectory can be generated in the same manner as the foot position trajectory in the X axis direction described above. Besides, as for a spatial component of the foot posture whose posture angle variation has a maximum value or minimum value, the foot posture trajectory can be generated in the same manner as the foot position trajectory in the Z axis direction described above.

Here, the desired foot position/posture trajectory generated using the definite duration settling filter as described above is the desired position/posture trajectory of each foot 22 in a supporting leg coordinate system fixed on the floor surface described later.

The desired foot position/posture trajectory generated as described above is configured so that the position of each foot 22 starts moving by gradually accelerating from the initial floor-contact state (the state at the start time in the desired gait) toward the expected landing position. In addition, the desired foot position/posture trajectory is configured so that the variation rate of the foot position is gradually reduced and finally reaches to 0 or substantially 0 at the expected landing time, and the foot reaches to the expected landing position at the expected landing time and stops moving. Thus, at the instant when each foot 22 lands, the velocity thereof with respect to the floor (the variation rate of the position of the foot 22 in the supporting leg coordinate system fixed on the floor) is 0 or substantially 0. Therefore, if the foot lands from a state where both the legs 2, 2 float in the air (state during the floating period) in the running gait, it is subject to a reduced landing impact.

In the running gait, the vertical velocity of the body 24 is downward in the later half of the floating period because of gravity applied to the robot 1, and the vertical velocity remains downward at the time of landing. Therefore, if the desired foot position/posture trajectory is generated in such a manner that the velocity of the foot 22 with respect to the floor at the instant of landing is 0 or substantially 0, and the desired position/posture trajectory of the body 24 is generated so as to satisfy the dynamical equilibrium condition as described later, the relative velocity of the foot 22 of the free leg with respect to the body 24 is upward at the time immediately before landing. That is, at the instant of landing in the running gait, the desired gait of the robot 1 is one in which the robot 1 lands at the floor while retracting the free leg 2 to the body 24. In other words, in the desired gait in this embodiment, the robot 1 lands by retracting the foot 22 of the free leg toward the body 24 so that the foot 22 has a velocity with respect to the floor of 0 or substantially 0 at the instant of landing. Thus, the landing impact is reduced and prevented from being excessive.

In this embodiment, since the definite duration settling filter is a series connection of three or more (three, for example) stages of unit filters, the velocity of each foot 22 (variation rate of the position of the foot) is reduced to 0 or substantially 0 by the expected landing time, and the acceleration of each foot 22 is also reduced to 0 or substantially 0 at the expected landing time, so that the foot 22 stops moving. That is, the acceleration with respect to the floor is also 0 or substantially 0 at the instant of landing. Thus, the landing impact is further reduced. In particular, even if the actual landing time of the robot 1 varies from the desired landing time, the impact doesn't increase significantly. Incidentally, in order to simply make the velocity of each foot 22 with respect to the floor 0 or substantially 0 at the expected landing time, the definite duration settling filter may be composed of two stages of unit filters. However, in this case, the acceleration of each foot 22 is not 0 at the expected landing time typically.

Here, the foot posture continues to change after the foot 22 lands on the heel at the expected landing time until substantially the whole surface of the sole of the foot 22 comes into contact with the floor. Therefore, the foot posture trajectory is generated using the definite duration settling filter by setting the time when substantially the whole surface of the sole of the foot 22 comes into contact with the floor as the specified time.

Furthermore, while the definite duration settling filter is used to generate the foot position trajectory in this embodiment, the desired foot position trajectory may be generated using a function, such as a polynomial that is defined so that the variation rate of the foot position is 0 or substantially 0 (the time differential value of the foot position is 0) at the expected landing time, and the variation acceleration of the foot position (the time differential value of the variation rate) is 0 or substantially 0 at the expected landing time. This holds true for the generation of the desired foot posture trajectory. However, for generation of the desired foot posture trajectory, the function, such as a polynomial, is defined so that the variation rate of the posture of each foot 22 and the variation acceleration thereof are 0 or substantially 0 at the time when substantially the whole surface of the sole of the foot 22 comes into contact with the floor as described above.

Figure 6:
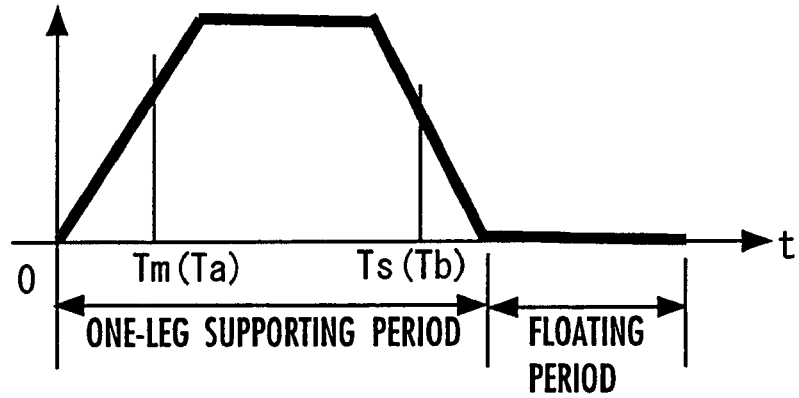
FIG. 6 is a graph showing an example of setting of a desired floor reaction force's vertical component.

The desired floor reaction force's vertical component trajectory is set as shown in FIG. 6, for example. In this embodiment, the shape of the desired floor reaction force's vertical component trajectory in the running gait (specifically, the shape thereof in the one-leg supporting period) is prescribed to be trapezoidal (protruding in the direction of the floor reaction force's vertical component increasing). The height of the trapezoid and the times of the apexes of the trapezoid are determined as gait parameters (floor reaction force's vertical component trajectory parameters) for defining the desired floor reaction force's vertical component trajectory. Here, during the floating period in the running gait, the desired floor reaction force's vertical component is constantly set to 0. As in this example, the desired floor reaction force's vertical component trajectory is preferably set to be substantially continuous (i.e. not to have discontinuous values). This is intended to make the joints of the robot 1 move smoothly when controlling the floor reaction force. Here, the words "substantially continuous" imply that a trajectory doesn't lose its continuity because of discrete values that inevitably occur when a continuous analog trajectory (continuous trajectory in the true sense) is converted into a digital trajectory in a discrete-time system.

Figure 7:
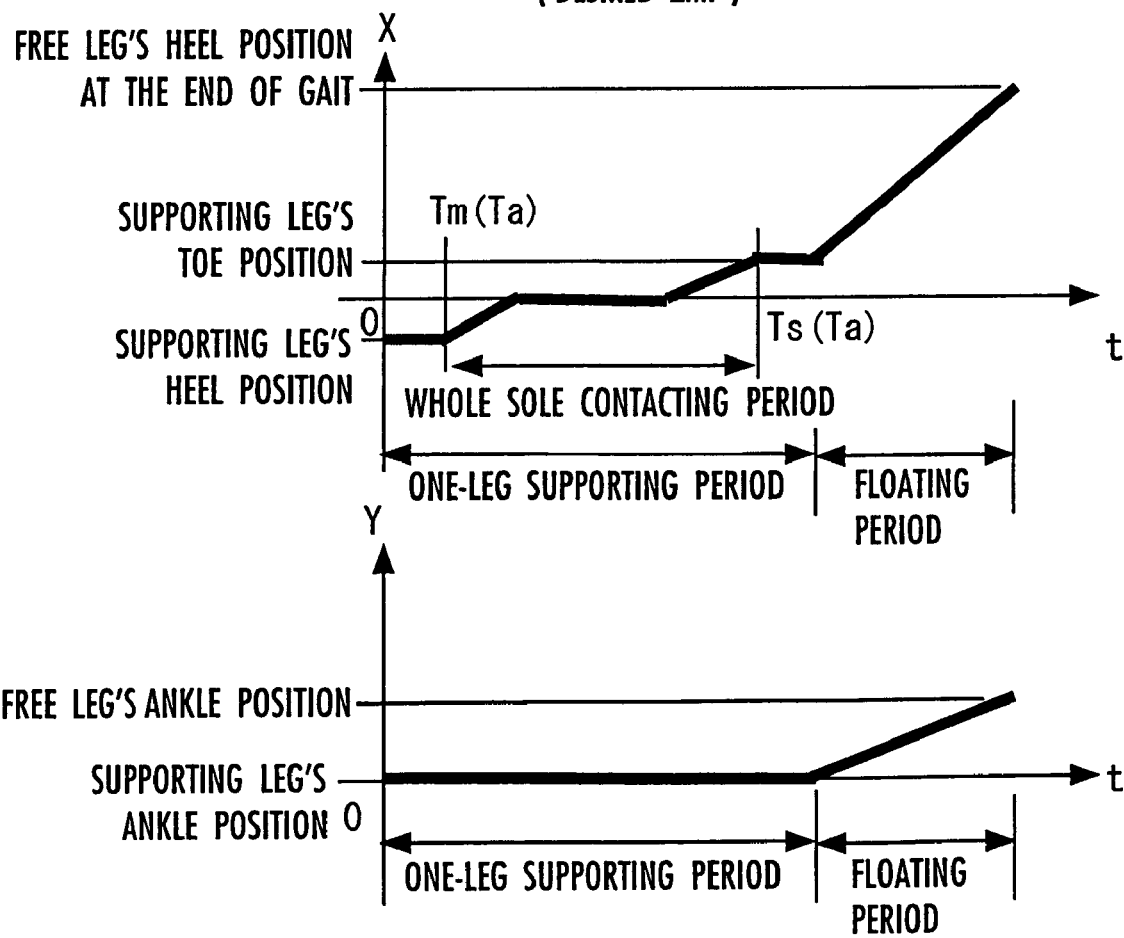
FIG. 7 is a graph showing an example of setting of a desired ZMP.

The desired ZMP trajectory is set as follows. In the running gait shown in FIG. 5, the robot 1 lands on the heel of the foot 22 of the supporting leg, then jumps into the air by kicking the floor on the toe of the foot 22 of the supporting leg, and finally lands on the heel of the foot 22 of the free leg, as described above. Therefore, the desired ZMP trajectory during the one-leg supporting period is set so that the desired ZMP is initially positioned at the heel of the foot 22 of the supporting leg 2, shifted to the longitudinal middle point of the foot 22 in the period in which substantially the whole surface of the sole of the foot 22 of the supporting leg is in contact with the floor, and then shifted to the toe of the foot 22 of the supporting leg by the time when the foot takes off the floor, as shown in the upper part of FIG. 7. Here, the upper part of FIG. 7 shows the desired ZMP trajectory in the X axis direction (back and forth direction), and the lower part of FIG. 7 shows the desired ZMP trajectory in the Y axis direction (sideward direction). As shown in the lower part of FIG. 7, the desired ZMP trajectory in the Y axis direction during the one-leg supporting period is set in such a manner that the desired ZMP is at the same position as the central point of the ankle joints of the supporting leg 2 in the Y axis direction.

In the running gait, after the end of the one-leg supporting period, both the legs 2, 2 move away from the floor, and the floor reaction force's vertical component becomes 0. When the floor reaction force's vertical component is 0, that is, in the floating period, the total center of gravity of the robot 1 performs a free-fall movement, and the an angular momentum variation about the total center of gravity is zero. At this point, since the moment of the resultant force of gravity and the inertial force acting on the robot 1 is 0 at an arbitrary point on the floor, the desired ZMP is not settled. That is, any point on the floor satisfies the condition for ZMP that "a point of application where the horizontal component of the moment produced by the resultant force of gravity and the inertial force is 0". In other words, even if the desired ZMP is set in an arbitrary point, the dynamical equilibrium condition that the horizontal component of the moment applied around the desired ZMP by the resultant force is 0. Therefore, the desired ZMP may be set discontinuously. For example, during the floating period, the desired ZMP may be set so as not to move from the desired ZMP position at the time when the leg takes off the floor (when the one-leg supporting period ends) and to move discontinuously (in a step-like manner) to the desired ZMP position at the time of landing in the end of the floating period. However, in this embodiment, as shown in the upper part of FIG. 7, the X axis-directional position of the desired ZMP trajectory during the floating period is adapted to continuously shift from the toe of the foot 22 on the supporting leg side to the landing position of the heel of the foot 22 on the free leg side by the time of the next landing of the free leg 2. Furthermore, as shown in the lower part of FIG. 7, the Y axis-directional position of the desired ZMP trajectory during the floating period is adapted to continuously shift from the Y axis-directional position of the center of the ankle joint of the supporting leg 2 to the Y axis-directional position of the center of the ankle joint of the free leg 2 by the time of the next landing of the free leg 2. That is, the desired ZMP trajectory is made continuous (substantially continuous) for the whole period of the gait. Further, as described later, the desired gait is generated (more specifically, the desired body position/posture trajectory is adjusted) in such a manner that the moment (excluding the vertical component) of the resultant force of gravity and the inertial force about the desired ZMP becomes zero.

A reason for making the desired ZMP trajectory continuous will be described below. During the floating period, using a precise dynamic model, the moment about the desired ZMP applied by the resultant force of gravity and the inertial force becomes 0, and if the desired gait is generated by setting the desired floor reaction force's vertical component to 0, a true value of a moment applied about the origin of a coordinate system (called a global coordinate system) fixed to the floor by a resultant force of gravity and an inertial force due to the generated desired gait (which means a moment applied about the origin of the coordinate system by a resultant force of gravity and an inertial force calculated by the precise dynamics model, and is hereinafter referred to as a true moment about the origin) becomes 0.

However, in the case where the dynamics mode used in generating a desired gait as described above is not a precise model but an approximate model, the true moment about the origin of the generate gait may not be 0. Moreover, if the approximate mode is described in a differential equation or an integral equation, which is generally used for representing the dynamics, the true moment about the origin depends upon a position of the desired ZMP. Thus, the true moment about the origin may move by a very small amount when the position of the desired ZMP is changed by a very small amount. Therefore, in this case, if the position of the desired ZMP is moved discontinuously, the true moment about the original so changes discontinuously.

This means that a true inertial force of the generated gait (an inertial force calculated by the precise model) becomes discontinuous. This also means that an acceleration (angular acceleration) of displacement of any one or all of joints of the robot 1 becomes discontinuous.

Therefore, if an approximate error of a model is taken into account, in order to make the generated gait smooth, it is desirable to make the desired ZMP trajectory continuous (substantially continuous) even during the floating period. However, in a dynamics model used in this embodiment, which will be described later, since a desired gait, which reduces a horizontal component of a moment about a desired ZMP to 0, can be unconditionally generated regardless of a position of the desired ZMP, it is not always necessary to make the desired ZMP continuous.

Note that, in this embodiment, the positions and times of the apexes of the desired ZMP trajectory such as shown in FIG. 7 are set as ZMP trajectory parameters (parameters defining the desired ZMP trajectory). In addition, the words "substantially continuous" used for representing the ZMP trajectory have the same meaning as in the floor reaction force's vertical component trajectory described above.

The ZMP trajectory parameters are determined to have a high stability margin and not to change abruptly. Here, the high stability margin refers to a state in which the desired ZMP exists near the center of a smallest projecting polygon (a so-called supporting polygon) including a contact surface of the robot 1 (for more detail, see Japanese Patent Application Laid-Open No. 10-86081). The desired ZMP trajectory in FIG. 7 is set so as to satisfy such a condition.

In addition, the desired arm posture is represented as a relative posture with respect to the body 24.

Further, the desired body position/posture, the desired foot position/posture and a reference body posture described later are described in a global coordinate system. The global coordinate system is a coordinate system that is fixed to the floor as described above. More specifically, a supporting leg coordinate system described later is used as the global coordinate system.

In this embodiment, the gait generation device 100 generates not only the desired body posture but also a reference body posture. The reference body posture is a body posture that is generated complying with a gait request (request to the gait generation device 100 from another device, such as a behavior planning unit, or from the outside (via the joystick 44 or the like)).

The desired body posture (hereinafter, the "body posture" without the word "reference" refers to the desired body posture) is generated so as to follow or agree with the reference body posture in the long term.

In walking, usually, the desired body posture only has to always agree with the reference body posture as described in the embodiment described in the specification of Japanese Patent Application No. 2000-352011 filed by the applicant. In Japanese Patent Application No. 2000-352011, although the concept of the reference body posture is not described, the desired body posture pattern is given explicitly and preferentially, which is equivalent to the desired body posture always agreeing with the reference body posture.

However, in a gait including a floating period such as running or in walking on a low friction floor surface, the dynamical equilibrium condition cannot be satisfied simply by adjusting the body's horizontal acceleration while causing the floor reaction force's horizontal component of the desired gait to fall within the allowable range (or within friction limit).

Thus, in this embodiment, the desired body posture is intentionally deviated from the reference body posture as required. More specifically, two movement modes, which are described below, are generated in a composite manner so as to satisfy the dynamical equilibrium condition while keeping the floor reaction force's horizontal component of the desired gait within the allowable range (or within friction limit).

Figure 8:
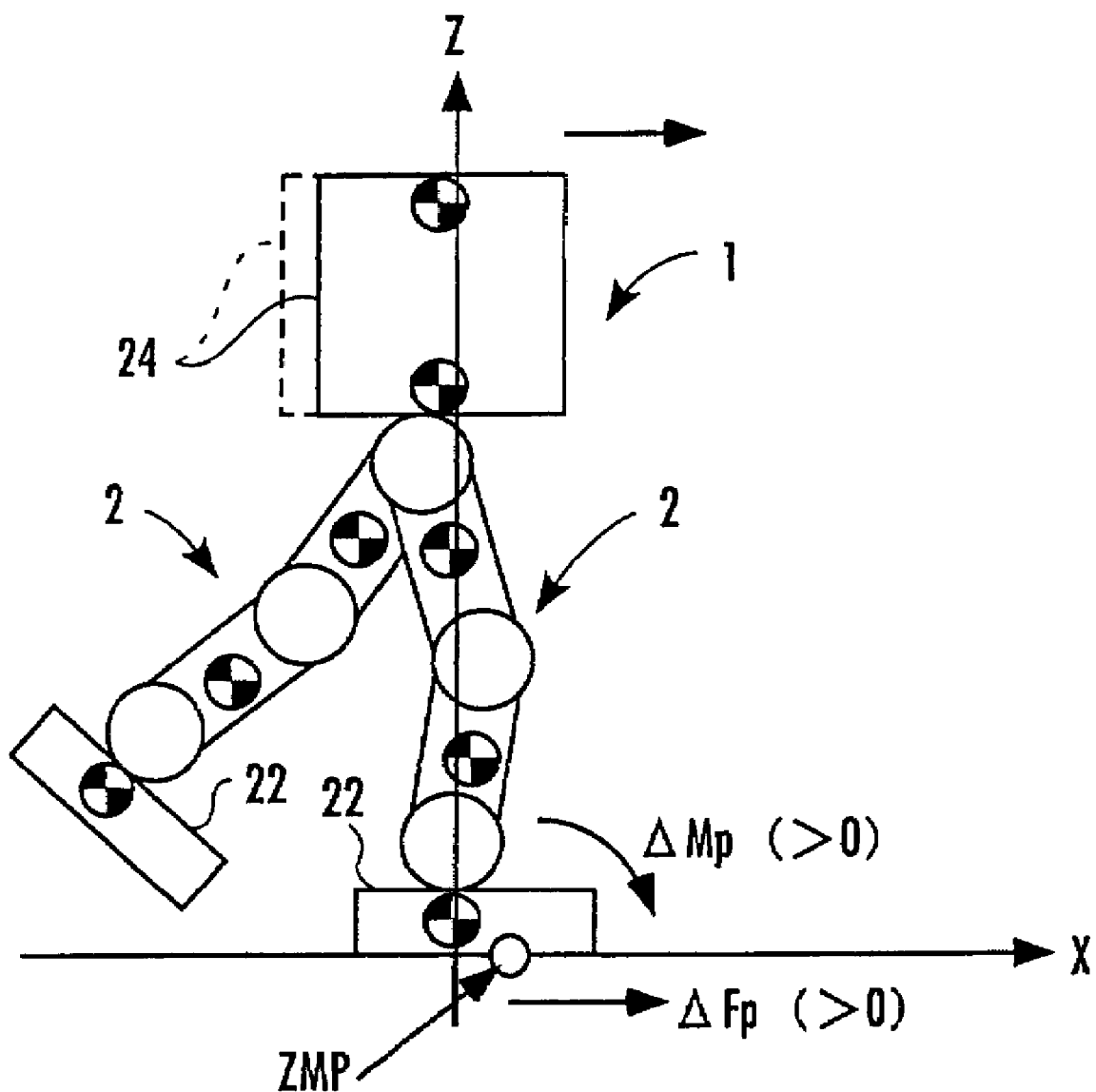
FIGS. 8 and 9 are diagrams for illustrating movement modes (body translation mode and body rotation mode, respectively) of the robot.

As shown in FIG. 8, if only the body's horizontal acceleration is brought into perturbation (slightly changed) from a certain movement state of the robot 1, the total center-of-gravity horizontal acceleration and the angular momentum about the total center of gravity of the robot 1 are brought into perturbation. That is, the perturbation of the body's horizontal acceleration causes perturbation of the floor reaction force's moment component about the desired ZMP (excluding the component about the vertical axis) and the floor reaction force's horizontal component without causing perturbation of the floor reaction force's vertical component that is in balance with the resultant force of the inertial force and gravity caused by the perturbation of the body's horizontal acceleration in a dynamical sense (without causing perturbation of the total center-of-gravity vertical acceleration of the robot 1). The movement mode for causing perturbation of the body horizontal acceleration of the robot 1 is referred to as a body translation mode.

In other words, referred to as a body translation mode is such a movement that causes changes of the component of the floor reaction force's moment about the desired ZMP (excluding the component about the vertical axis) and the floor reaction force's horizontal component without causing any change of the floor reaction force's vertical component.

A variation of the floor reaction force moment's component per unit acceleration at this point is denoted by $\Delta Mp$, and a variation of the floor reaction force's horizontal component per unit acceleration is denoted by $\Delta Fp$. If the body 24 is horizontally accelerated in the forward direction in the situation shown in FIG. 8, $\Delta Mp$ and $\Delta Fp$ are applied in the directions indicated by the arrows in FIG. 8, respectively.

While, in order to be perceptually more readily understood, the body translation mode is represented using the floor reaction force balanced with the resultant force of the inertial force and gravity caused by the movement, representing the same using the resultant force of the inertial force and gravity is more accurate theoretically. Here, the resultant force and the floor reaction force have the same magnitude and the opposite directions.

Figure 9:
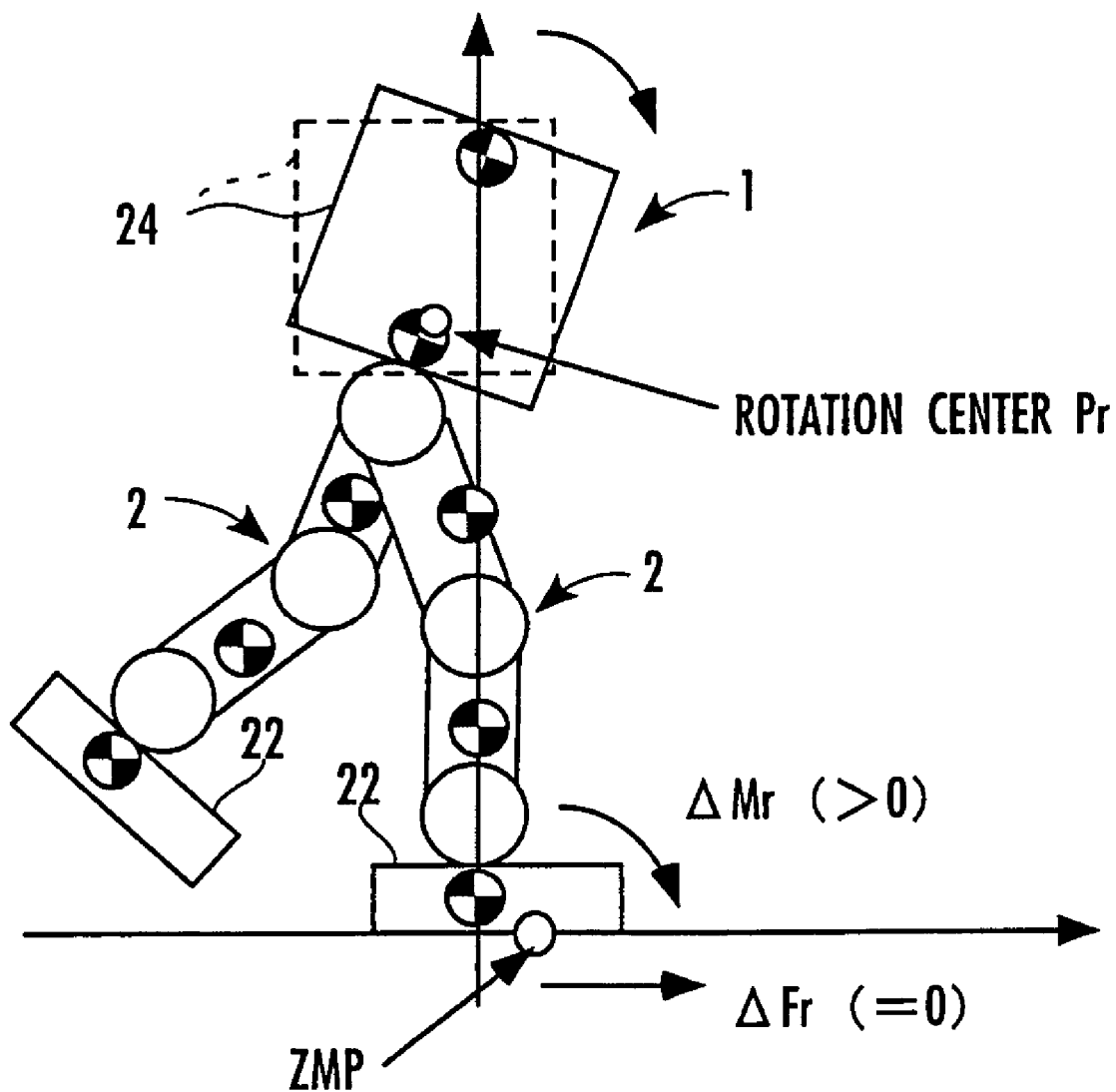

On the other hand, as shown in FIG. 9, if the body posture angular acceleration (angular acceleration of a posture angle of the body 24) is brought into perturbation about a certain point Pr from a certain movement state of the robot 1, the total center of gravity of the robot 1 is not brought into perturbation, but the angular momentum about the total center of gravity is brought into perturbation. That is, the perturbation of the body posture angular acceleration about the point Pr causes perturbation of the component of the floor reaction force's moment (excluding a component about the vertical axis) about the desired ZMP, without causing perturbations of the floor reaction force's vertical component and the floor reaction force's horizontal component. The movement mode for causing perturbation of the body posture angle acceleration of the robot 1 in this way is referred to as a body rotation mode.

In other words, referred to as a body rotation mode is such a movement that causes changes of the component of the floor reaction force's moment about the desired ZMP (excluding the component about the vertical axis) without causing any change of the floor reaction force's vertical component and the floor reaction force's horizontal component.

A variation of the floor reaction force moment's component per unit angular acceleration is denoted by $\Delta Mr$, and a variation of the floor reaction force's horizontal component per unit angular acceleration is denoted by $\Delta Fr$. $\Delta Fr$ is 0. If an angular acceleration of the body posture angle is generated to cause the body 24 to incline forward in the situation shown in FIG. 9, $\Delta Mr$ is applied in the direction indicated by the arrow in FIG. 9.

Now, a robot dynamics model used for this embodiment will be described. In this embodiment, a simplified (approximated) dynamics model shown below is used. However, concerning the dynamics model described below, a kinematics model (a model representing structures and dimensions of joints and links, that is, a model representing a relationship between joint displacement and position/postures of links) is also necessary.

Figure 10:
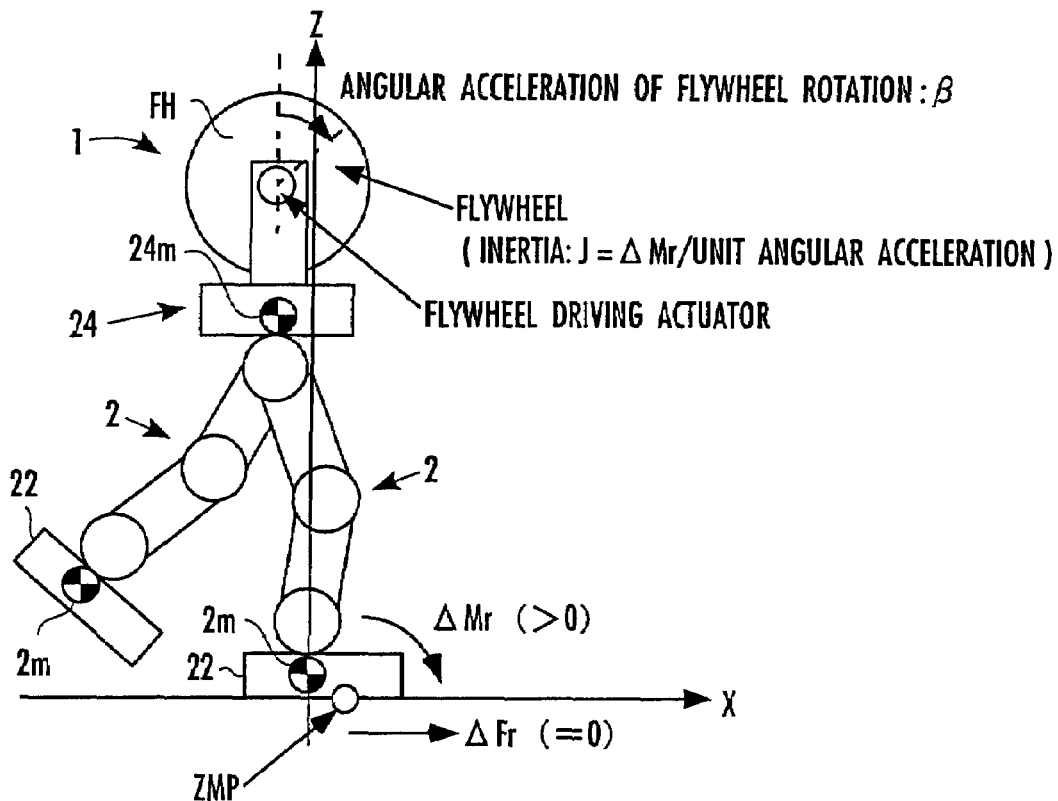
FIGS. 10 and 11 are diagrams for illustrating dynamics models of the robot.

FIG. 10 is a robot dynamics model used for this embodiment. As shown, this dynamics model has three material particles in total, including two material particles 2m, 2m corresponding to the legs 2, 2 of the robot 1, respectively, and a material particle 24m corresponding to the body 24, and a flywheel FH having a certain inertia and no mass. This dynamics model is a decoupled one, that is, the dynamics of the legs 2, 2 (dynamics of the material particles 2m, 2m) and the dynamics of the body 24 (dynamics of the material particle 24m and the flywheel FH) don't interfere with each other, and the dynamics of the whole robot 1 is represented by a linear coupling of these dynamics. In addition, the relationship between the movement of the body 24 and the floor reaction force is separated into the relationship between the translation movement of the body 24 (in the body translation mode) and the floor reaction force and the relationship between the rotation movement of the body 24 (in the body rotation mode) and the floor reaction force. Specifically, the floor reaction force caused by horizontal movement of the body material particle 24m corresponds to the floor reaction force caused by horizontal translation movement of the body 24 (in the body translation mode), and the floor reaction force caused by rotation movement of the flywheel corresponds to the floor reaction force caused by rotation of the posture angle of the body 24 (in the body rotation mode).

Here, the mass of the arms of the robot 1 is included in the mass of the body 24, and the body material particle 24m has a mass including the mass of the arms. In this embodiment, the movement (swing movement) of the arms of the robot 1 in the desired gait is attained in such a manner that it cancels the inertial force's moment about the vertical axis produced in the robot 1 by the movements other than the swing movement and keeps fixed the relative position of the center of gravity of the both arms with respect to the body 24. Thus, effects of the swing movement of the arms on the floor reaction force moment (except for the component thereof about the vertical axis) and the floor reaction force's horizontal component are neglected.

In the following, the simplified model will be formulated. In this regard, for the sake of simplicity of explanation, only the equation of motion in the sagittal plane (the plane containing the back-and-forth axis (X axis) and the vertical axis (Z axis)) is described, and the equation of motion in the lateral plane (the plane containing the sideward axis (Y axis) and the vertical axis (Z axis)) is omitted.

For convenience of explanation, variables and parameters concerning the dynamics model are defined as follows. Each of the material particles 2m, 2m and 24m is a representative point of its corresponding part or a point geometrically uniquely determined from the position/posture of the part. For example, the position of the material particle 2m for the supporting leg 2 is located above the representative point of the sole of the foot 22 of the leg 2 by a predetermined distance.

Zsup: supporting leg material particle's vertical position
Zswg: free leg material particle's vertical position
Zb: body material particle's vertical position (typically different from the body's vertical position)
ZGtotal: total center-of-gravity vertical position
Xsup: supporting leg material particle's horizontal position
Xswg: free leg material particle's horizontal position
Xb: body material particle's horizontal position (this is a point which is shifted from the point Pr in the back-and-forth direction by a predetermined distance. The shift is determined so that the center of gravity in a strict model and the center of gravity in this dynamics model agree with each other as precisely as possible when the robot stands upright, for example. The body material particle's horizontal position is typically different from the body horizontal position.)
XGtotal: total center-of-gravity horizontal position
θ by: body posture angle about the Y axis with respect to the vertical direction (inclination angle)
mb: body material particle's mass
msup: supporting leg material particle's mass
mswg: free leg material particle's mass
mtotal: total robot mass (=mtotal+msup+mswg)
J: body's moment of inertia (This is an equivalent moment of inertia in the body rotation mode.) Typically, this doesn't agree with the moment of inertia of the body 24 of the actual robot 1.)
Fx: floor reaction force's horizontal component (specifically, the back-and-forth (X axis) component of the translation floor reaction force)
Fz: floor reaction force's vertical component (specifically, the vertical (Z axis) component of the translation floor reaction force) In this embodiment, this equals to the desired translation floor reaction force's vertical component)
My: floor reaction force moment about the desired ZMP (specifically, the component of the floor reaction force moment about the sideward axis (Y axis))

In this embodiment, the relationship between the position of the material particle 2m of each leg 2 and the position of the foot 22 of the leg 2 (position of a predetermined representative point of the foot 22) is previously prescribed, and thus, if the position of either one of them is determined, the position of the other is uniquely determined. In addition, the relationship between the position of the body material particle 24m and the position of the body 24 (position of a predetermined representative point of the body 24) is previously prescribed in accordance with the posture angle of the body 24, and thus, if one of the positions and the posture angle are determined, the position of the other is uniquely determined.

In addition, for an arbitrary variable X, dX/dt represents the first order differential of X, and d2X/dt represents the second order differential of X. Thus, if the variable X represents a displacement, dX/dt represents the velocity, and d2X/dt represents the acceleration. The character g denotes the coefficient of the acceleration of gravity. Herein, g is a positive value.

The equations of motion for the dynamics model (formulas representing the dynamical equilibrium condition) are represented by the formulas 01, 02 and 03.

$$Fz = mb*(g+d2Zb/dt2)+msup*(g+d2Zsup/dt2)+mswg*(g+d2Zswg/dt2) \quad \text{formula 01}$$

$$Fx = mb*d2Xb/dt2+msup*d2Xsup/dt2+mswg*d2Xswg/dt2 \quad \text{formula 02}$$

$$My = -mb*(Xb-Xzmp)*(g+d2Zb/dt2)+mb*$$
$$(Zb-Zzmp)*(d2Xb/dt2)-msup*(Xsup-Xzmp)*$$
$$(g+d2Zsup/dt2)+msup*(Zsup-Zzmp)*$$
$$(d2Xsup/dt2)-mswg*(Xswg-Xzmp)*$$
$$(g+d2Zswg/dt2)+mswg*(Zswg-Zzmp)*$$
$$(d2Xswg/dt2)+J*d2\theta by/dt2 \quad \text{formula 03}$$

In addition, as for the center of gravity of the whole robot, the following relational formulas hold.

$$ZGtotal=(mb*Zb+msup*Zsup+mswg*Zswg)/mtotal \quad \text{formula 04}$$

$$XGtotal=(mb*Xb+msup*Xsup+mswg*Xswg)/mtotal \quad \text{formula 05}$$

The following are relationships between the dynamics model and ΔFp, ΔMp, ΔFr and ΔMr.

ΔFp is a perturbation amount of Fx provided when d2Xb/dt2 is brought into perturbation by a unit amount in the formula 02 and, thus, can be determined by the following formula.

$$\Delta Fp = mb \quad \text{formula 06}$$

That is, the variation ΔFp of the horizontal component of the floor reaction force per unit acceleration in the body translation mode is equivalent to the mass of the body material particle 24m in the dynamics model.

ΔMp is a perturbation amount of My provided when d2Xb/dt2 is brought into perturbation by a unit amount in the formula 03 and, thus, can be determined by the following formula.

$$\Delta Mp = mb*(Zb-Zzmp) \quad \text{formula 07}$$

That is, the variation ΔMp of the floor reaction force moment's component per unit acceleration in the body translation mode is the product of the body material particle mass in the dynamics model and the height (vertical position) of the body material particle 24m from the desired ZMP. The relationship between the positions of the body material particle 24m and the desired ZMP and the movement of the body material particle 24m is equivalent to the behavior of an inverted pendulum, the body material particle 24m being assumed to be the material particle of the inverted pendulum and the desired ZMP being assumed to be the fulcrum of the inverted pendulum.

ΔFr is a perturbation amount of Fx provided when d2θby/dt2 is brought into perturbation by a unit amount in the formula 02 and, thus, can be determined by the following formula.

$$\Delta Fr = 0 \quad \text{formula 08}$$

That is, the variation ΔFr of the translation floor reaction force's horizontal component per unit acceleration in the body rotation mode is 0.

ΔMr is a perturbation amount of My provided when d2θby/dt2 is brought into perturbation by a unit amount in the formula 03 and, thus, can be determined by the following formula.

$$\Delta Mr = J \quad \text{formula 09}$$

That is, the variation ΔMr of the floor reaction force moment component per unit acceleration in the body rotation mode is equivalent to the moment of inertia of the flywheel.

The gait generation device 100 according to this embodiment generates sequentially a desired gait for one step from the landing of one leg 2 of the robot 1 to the landing of the other leg 2 (the desired gait in the narrow sense) with the desired gait for one step as a unit. Therefore, in the running gait shown in FIG. 5 generated in this embodiment, the desired gait is generated sequentially from the start of a one-leg supporting period to the end of the following floating period (that is, the start of the next one-leg supporting period). Here, the desired gait to be newly generated is referred to as a "current time gait", the next gait is referred to as a "next time gait", and the desired gait after next is referred to as a "next but one gait". In addition, the desired gait generated immediately before the "current time gait" is referred to as a "last time gait".

When the gait generation device 100 newly generates a current time gait, the required values (requests) of the expected landing position/posture and expected landing time of the foot 22 of the free leg for the next two steps of the robot 1 are input to the gait generation device 100 as required gait parameters (or the gait generation device 100 reads the required parameters from a storage device). Then, using the required parameters, the gait generation device 100 generates the corrected desired body position/posture trajectory, the desired foot position/posture trajectory, the desired ZMP trajectory, the desired floor reaction force's vertical component trajectory, the desired arm posture trajectory, and the like. In this case, a part of the gait parameters defining these trajectories are corrected appropriately in such a manner that continuity of walking is secured.

Figure 12:
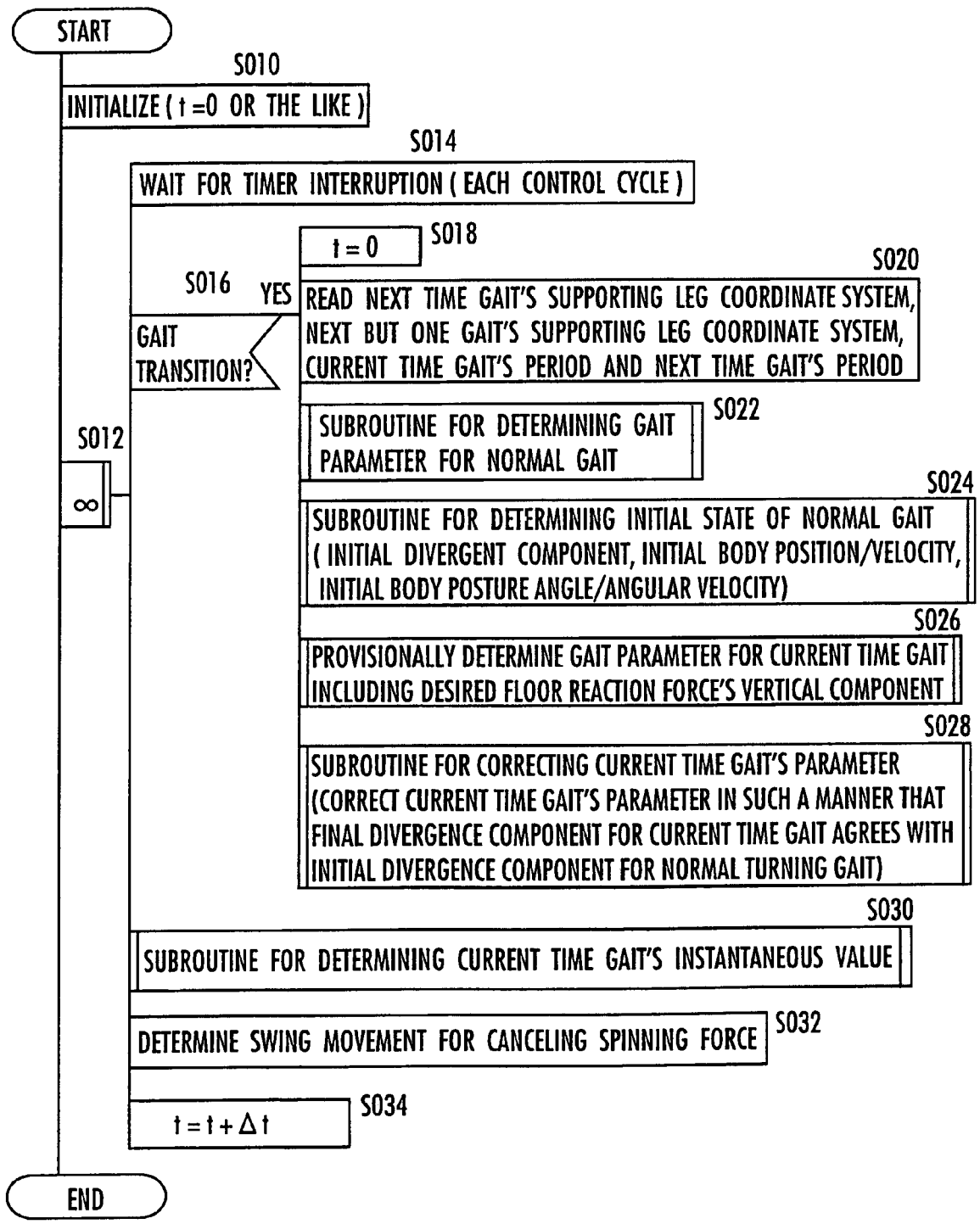
FIG. 12 is a flowchart showing main routine process performed by the gait generation device provided in the control unit shown in FIG. 3.

Now, taking the generation of the running gait shown in FIG. 5 as an example, details of a gait generation process performed by the gait generation device 100 will be described with reference to FIGS. 12 to 38. FIG. 12 is a flowchart (structured flowchart) showing a gait generation process performed by the gait generation device 100.

First, in step S010, various initialization operations, such as an operation of initializing the time t to 0, are conducted. This processing is conducted when activating the gait generation device 100, for example. Then, the process proceeds to step S014 through step S012, where the gait generation device 100 waits for a timer interruption for each control cycle (calculation process cycle of the flowchart in FIG. 12). The control cycle is Δt.

Then, the process proceeds to step S016, where it is determined whether a gait transition is detected or not. If a gait transition is detected, the process proceeds to step S018, or otherwise, the process proceeds to step S030. Here, the "gait transition" means a timing at which generation of the last time gait is completed and generation of the current time gait is started. For example, the transition from the control cycle having completed generation of the last time gait to the next control cycle is a gait transition.

When the process proceeds to step S018, the time t is initialized to 0. Then, the process proceeds to step S020, where a next time gait's supporting leg coordinate system, a next but one time gait's supporting leg coordinate system, a current time gait's period and a next time gait's period are read in. These supporting leg coordinate systems and gait periods are determined by the required parameters described above. That is, in this embodiment, the required parameters given to the gait generation device 100 via the joystick 44 or the like include the required values of the expected landing positions/postures of the foot 22 of the free leg (position/posture of the foot 22 which is, once landing, rotated without slipping to come into contact with the floor at substantially the whole surface of the sole) and expected landing times for the next two steps. And, the required parameters are given to the gait generation device 100 before starting generation of the current time gait (before the gait transition detected in step S016) with the required values for the first step and the required values for the second step being associated with the current time gait and the next time gait, respectively. These required values can be changed in the process of generating the current time gait.

The next time gait's supporting leg coordinate system is determined depending on the required value of the expected landing position/posture of the foot 22 of the free leg for the first step (foot 22 of the free leg in the current time gait) included in the required parameters.

Figure 15:
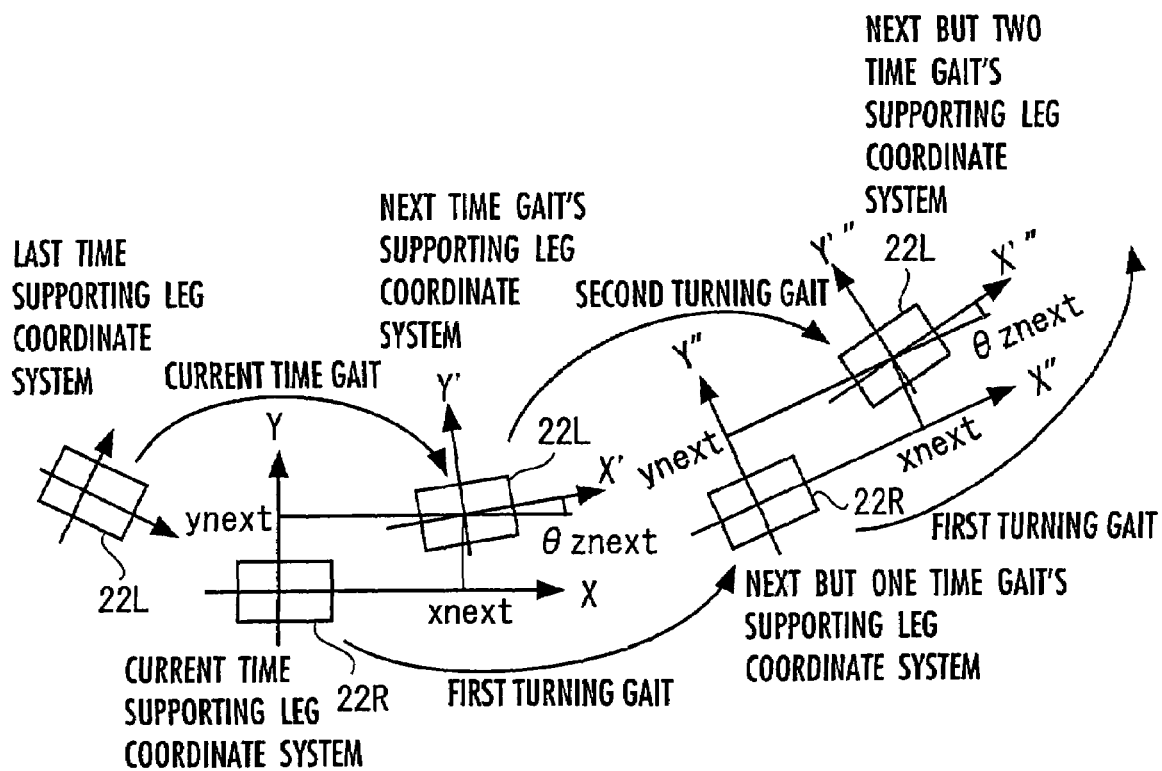
FIG. 15 is a diagram illustrating a relationship between foot landing positions/postures in a normal gait and coordinate systems.

For example, referring to FIG. 15, the required value of the expected landing position/posture of the foot 22 of the free leg in the current time gait (first step) (foot 22L in the drawing) is shifted in the X axis direction (back-and-forth direction of the foot 22R of the supporting leg in the current gait) and the Y axis direction (sideward direction of the foot 22R of the supporting leg in the current gait) in the current time gait supporting leg coordinate system by xnext and ynext, respectively, and rotated by θznext about the Z axis with respect to the landing position/posture of the foot 22 of the supporting leg in the current gait (foot 22R in the drawing). Here, the supporting leg coordinate system is a global coordinate system (coordinate system fixed to the floor) whose origin is set at a point where a perpendicular line, which is drawn from the center of the ankle of the supporting leg 2 to the floor surface in a state where the foot 22 of the supporting leg is in a horizontal posture (more generally, parallel to the floor surface) and substantially the whole surface of the sole of the foot 22 of the supporting leg is in (intimate) contact with the floor surface, intersects with the floor surface and whose XY plane is the horizontal plane passing through the origin (in this embodiment, the point agrees with the representative point of the foot 22 in the state where substantially the whole surface of the sole of the foot 22 of the supporting leg is in contact with the floor surface). In this case, the X axis and Y axis directions are the back-and-forth and sideward directions of the foot 22 of the supporting leg, respectively. Here, the origin of the supporting leg coordinate system is not necessarily required to agree with the representative point of the foot 22 (point representative of the position of the foot 22) in the state where substantially the whole surface of the sole of the foot 22 of the supporting leg is in contact with the floor surface, and may be set at a point other than the representative point.

Here, the next time gait's supporting leg coordinate system is a coordinate system whose origin is set at the representative point (or, more specifically, a point matched to the representative point on the floor) of the foot 22L of the free leg in the current time gait in the case where the foot 22L lands according to the required value of the expected landing position/posture of the foot 22L (where the representative point of the foot 22 agrees with the required value of the expected landing position and the posture (orientation) of the foot 22 agrees with the required value of the expected landing posture) as shown in the drawing, and whose X' axis and Y' axis directions are the back-and-forth and sideward directions of the foot 22L, respectively, in the horizontal plane passing through the origin.

Similarly, the next but one time gait's supporting leg-coordinate system (see the X"Y" coordinate in FIG. 15) is determined depending on the required value of the expected landing position/posture of the foot 22 of the free leg in the second step. The current time gait's period is a time period from the expected landing time (required value) of the foot 22 of the supporting leg in the current time gait to the expected landing time (required value) of the foot 22 of the free leg in the first step (current time gait). The next time gait's period is a time period from the expected landing time (required value) of the foot 22 of the free leg in the first step to the expected landing time (required value) of the foot 22 of the free leg in the second step.

In this embodiment, the required parameters are input to the gait generation device 100 by operating the joystick 44 as required. Alternatively, the required parameters or the positions/postures and gait periods corresponding thereto may be previously stored as a movement schedule of the robot 1. Alternatively, the next time gait's supporting leg coordinate, the next but one time gait's supporting leg coordinate, the current time gait's period and the next time gait's period may be determined based on an instruction (request) input via a manipulator, such as the joystick 44, and the movement history of the robot 1 up to that moment.

Then, the process proceeds to step S022, where the gait generation device 100 determines gait parameters for a normal turning gait, which is a virtual cyclic gait following the current time gait. The gait parameters include a foot trajectory parameter for defining a desired foot position/posture trajectory in the normal turning gait, a reference body posture trajectory parameter for defining a reference body posture trajectory, and an arm trajectory parameter for defining a desired arm posture trajectory, a ZMP trajectory parameter for defining a desired ZMP trajectory and a floor reaction force's vertical component trajectory parameter for defining a desired floor reaction force's vertical component trajectory. Furthermore, the gait parameters include a parameter for defining a desired floor reaction force's horizontal component allowable range.

The term "normal turning gait" in this specification is used to refer to a cyclic gait that, when repeated, results in no discontinuity in the movement states (states of the foot position/posture, body position/posture and the like) of the robot 1 at the boundaries between the gaits (boundaries between the successive gaits for different steps, in this embodiment). In the following, the "normal turning gait" is sometimes abbreviated as a "normal gait".

In this embodiment, the normal turning gait is a cyclic gait comprising two steps of the robot 1, and one cycle of the normal turning gait comprises a first turning gait following the current time gait and a second turning gait following the first turning gait. The word "turning" is used herein because "turning" can include "straight advance" in a broad sense since a turning ratio of 0 results in straight advance. Furthermore, if the desired gait to be generated is the running gait shown in FIG. 5, the current time gait of the desired gait is a running gait having a one-leg supporting period and a floating period. Therefore, both of the first turning gait and second turning gait of the normal turning gait are gaits having a one-leg supporting period and a floating period as with the current time gait. That is, the first and second turning gaits are basically the same as the current time gait.

More specifically, one cycle of the normal turning gait of the two-legged mobile robot requires at least two steps of gait in the narrow sense described above. A complicated normal turning gait having a cycle of three or more steps of gait can be set. However, as described later, the normal turning gait is used exclusively to determine a divergence component (described in detail later) at the end (end time) of the current time gait. Therefore, using the normal turning gait comprising a cycle of three or more steps is not very effective in spite of the increasing complexity of the gait generating process. Thus, in this embodiment, one cycle of the normal turning gait is composed of two steps of gait (first and second turning gaits). For a legged mobile robot having three or more legs, the number of gaits required to define the normal turning gait increases accordingly. In the following, for the convenience of explanation, the normal turning gait comprising a plurality of gaits in the narrow-sense (two steps of gait in this embodiment) is regarded as one step of gait.

The normal turning gait is a provisional gait created in the gait generation device, 100 for determining movement states of the robot 1 including the divergence component at the end of the current time gait, the body's vertical positional velocity, the body's posture angle and the angular velocity, and is not output directly from the gait generation device 100.

Figure 13:
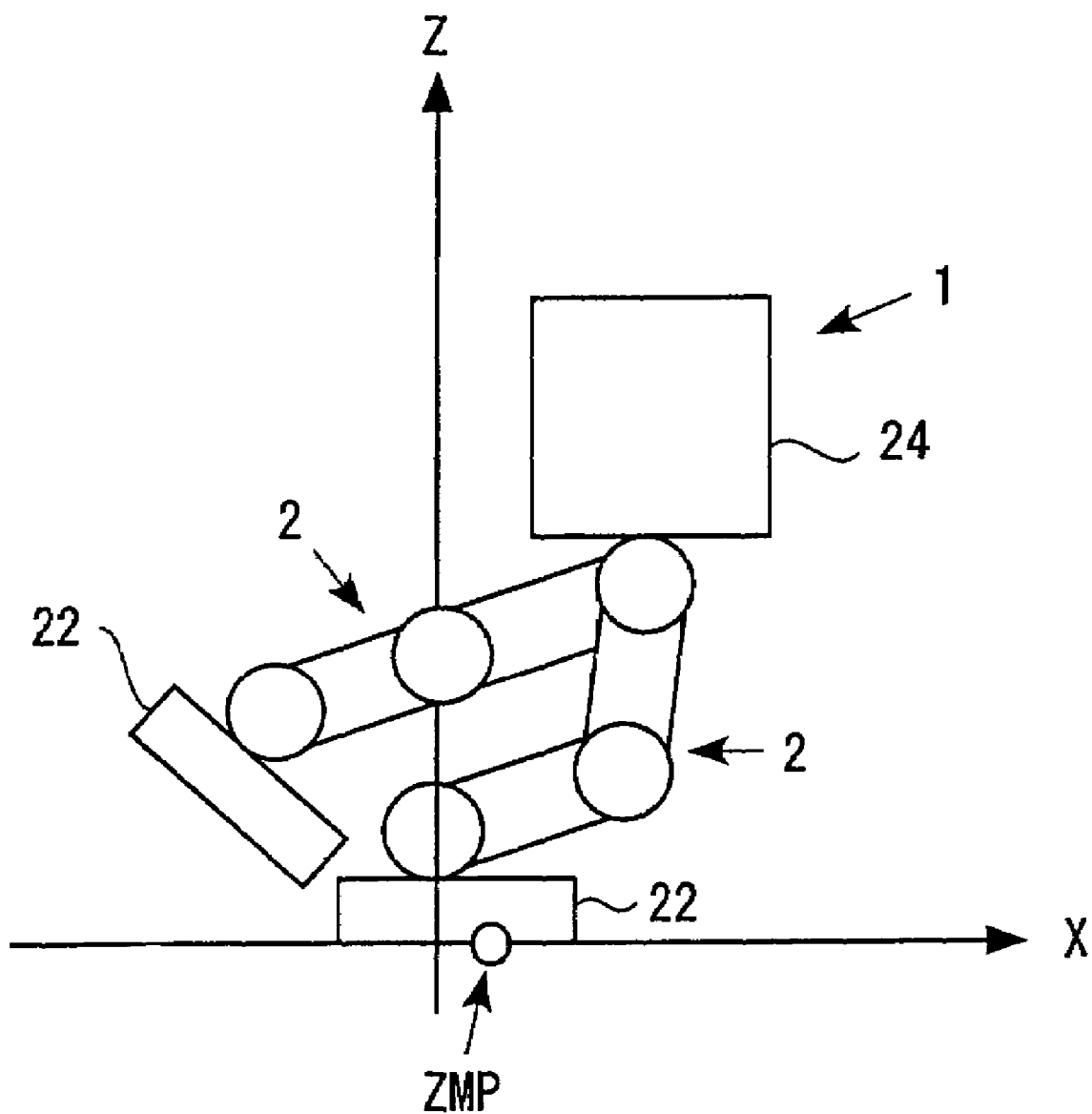
FIG. 13 is a diagram illustrating a divergence state of the body position of the robot.

Here, the word "divergence" means that the position of the body 24 of the two-legged mobile robot 1 is displaced far from the positions of the feet 22, 22, as shown in FIG. 13. The value of the divergence component is a numerical value that represents the degree of displacement of the position of the body 24 of the two-legged mobile robot 1 from the positions of the feet 22, 22 (more specifically, the origin of the global coordinate system (supporting leg coordinate system) set on the surface with which the foot 22 of the supporting leg is in contact).

In this embodiment, the desired gait is generated by using the divergence component as a reference index in order to allow the gait to, be continuous without a divergence occurring in the gait. However, even an initial divergence component of a normal gait (a divergence component of a normal gait at the initial time thereof), which is a representative example of continuous gaits, is not always simply 0 and varies with a parameter of the normal gait (the normal gait is a cyclic gait that has no discontinuity in the trajectory and can be repeated with the same pattern or, in theory, can be infinitely repeated without divergence even if repeated infinitely in theory). That is, the appropriate divergence component varies with the gait configuration, for example, the manner of walking or running. Thus, in this embodiment, the current time gait is generated in such a manner that the normal gait to be generated following the current time gait is set in accordance with the required parameters of the current time gait, the initial divergence component of the normal gait is determined, and then the final divergence component of the current gait is made to agree with the initial divergence component of the normal gait (more generally, the current gait is made to be continuous with or close to the normal gait). The basic principle of such gait generation is the same as that described in Japanese Patent Application No. 2000-352011 previously proposed by the applicants.

In the embodiments of the present invention, the linear three-material-particle dynamics model used in the first embodiment describe in Japanese Patent Application No. 2000-352011 is not used. However, the concept of the divergence component and convergence component defined by the following formulas can be applied, in an approximation manner with an adequate precision, to a perturbation of the behavior of the nonlinear dynamics model, such as the model shown in FIG. 10.

divergence component=body material particle's horizontal position+body material particle's horizontal velocity/$\omega 0$          formula 10 convergence component=body material particle's horizontal position−body material particle's horizontal velocity/$\omega 0$          formula 11

However, the body material particle's horizontal position is the body material particle's horizontal position Xb in the dynamics model shown in FIG. 10.

Furthermore, $\omega 0$ is a predetermined value, and the value during running has to be slightly varied from the value during walking gait generation described in Japanese Patent Application No. 2000-352011.

Other details concerning the divergence and convergence components are described in Japanese Patent Application No. 2000-352011, and thus, further description thereof is omitted herein.

In this embodiment, in addition to the method described in Japanese patent application no. 2000-352011, as described later, a gait parameter that defines the desired floor reaction force's vertical component trajectory is set, and the total center-of-gravity vertical position of the robot 1 is determined so as to satisfy, in terms of dynamics, the desired floor reaction force's vertical component. In this case, the second-order integral of the floor reaction force's vertical component defines the total center-of-gravity vertical position of the robot 1. Therefore, if the desired floor reaction force's vertical component is set inadequately, the total center-of-gravity vertical position or body's vertical position of the robot 1 becomes too high or too low. Therefore, how to set the desired floor reaction force's vertical component is also an important problem. However, a relationship between a floor reaction force's vertical component and a body vertical position is similar to a relationship between a ZMP and a body horizontal position. Thus, only by slightly changing a part of desired ZMP determination method for making a body horizontal position/velocity appropriate as indicated in this embodiment described below, the desired ZMP determination method can be applied to a determination method for a desired floor reaction force's vertical component for making a body vertical position/velocity appropriate.

Returning to the main subject, in step S022, a process described below is conducted in accordance with the flowchart shown in FIG. 14.

First, in step S100, foot trajectory parameters of the gait parameters for the normal gait are determined in such a manner that the foot position/posture trajectories of the current time gait, the first turning gait and the second turning gait are connected to each other in this order. A specific setting manner will be described below with reference to FIG. 15. In the following description, the foot 22 of the supporting leg 2 is referred to as a supporting leg's foot, and the foot 22 of the free leg 2 is referred to as a free leg's foot. Furthermore, the terms "initial (start)" and "final (end)" concerning the "gait" mean the start time and end time of the gait, respectively, or instantaneous gaits at the start time and end time of the gait, respectively.

The foot trajectory parameters include supporting leg's foot positions/postures and free leg's foot positions/postures at the start and end of the first turning gait and the second turning gait, and gait periods of the turning gaits. Of the foot trajectory parameters, the free leg's foot position/posture at the start of the first turning gait is regarded as the supporting leg's foot position/posture at the end of the current time gait seen from the next time's gait supporting leg coordinate system. In this case, in the running gait, the supporting leg's foot 22 at the end of the current time gait has floated in the air. The supporting leg's foot position/posture at the end of the current time is determined by using the finite duration settling filter to generate, until the end of the current gait, the foot position/posture trajectory (specifically, trajectory seen from the next time gait's supporting leg coordinate system) that leads from the supporting leg's foot position/posture at the start of the current time gait (=the free leg's foot position/posture at the end of the last time gait) to the free leg's foot position/posture at the end of the next time gait that is determined depending on the required value of the expected landing position/posture of the free leg's foot 22 for the second step (required value of the expected landing position/posture in the next time gait of the supporting leg's foot 22 in the current time gait) of the required parameters or the next but one time gait's supporting leg coordinate system associated with the required value.

Here, the free leg's foot position/posture at the end of the next time gait is determined in such a manner that the position/posture of the foot 22 rotated from the position/posture by a predetermined angle to the horizontal posture in the pitch direction by lowering the toe while keeping the foot 22 in contact with the floor agrees with the position/posture thereof in the next but one time gait's supporting leg coordinate system. In other words, the free leg's foot position/posture at the end of the next time gait is the position/posture of the foot 22 that is rotated by a predetermined angle in the pitch direction by raising the toe while keeping the foot 22 in contact with the floor without slipping (a state where the foot 22 has the toe raised and the heel in contact with the floor) from the required value of the landing position/posture of the free leg's foot 22 in the second step of the required parameters.

In addition, the supporting leg's foot position/posture at the start of the first turning gait is regarded as the free leg's foot position/posture at the end of the current time gait seen from the next time gait's supporting leg coordinate system. In this case, as with the free leg's foot position/posture at the end of the next time gait, the free leg's foot position/posture at the end of the current time gait is determined depending on the next time gait's supporting leg coordinate system or the required value of the expected landing position/posture of the free leg for the first step (current time gait) of the required parameters associated with the next time gait's supporting leg coordinate system. That is, the free leg's foot position/posture at the end of the current time gait is determined in such a manner that the representative point of the foot 22 rotated from the position/posture by lowering the toe while keeping the foot 22 in contact with the floor to bring substantially the whole of the sole of the foot 22 into contact with the floor agrees with the origin of the next gait's supporting leg coordinate system.

As with the free leg's foot position/posture at the end of the current time gait and the free leg's foot position/posture at the end of the next time gait, the free leg's position/posture at the end of the first turning gait is determined based on the position/posture in the next but one time gait's supporting leg coordinate system seen from the next time gait's supporting leg coordinate system. More specifically, the free leg's foot position/posture at the end of the first turning gait is set in such a manner that the position/posture of the foot 22 that is rotated from the position/posture by a predetermined angle to the horizontal posture while keeping the foot 22 in contact with the floor without slipping agrees with the position/posture in the next but one time gait's supporting leg coordinate system seen from the next time gait's supporting leg coordinate system.

At the end of the first turning gait, the supporting leg's foot 22 is away from the floor and floats in the air. To determine the trajectory after the supporting leg's foot 22 takes off the floor, an expected landing position/posture of the first turning gait's supporting leg's foot is set. The expected landing position/posture of the first turning gait's supporting leg's foot is set based on the position/posture in a next but two gait's supporting leg coordinate system seen from the next time gait's supporting leg coordinate system. More specifically, the expected landing position/posture of the first turning gait's supporting leg's foot is the position/posture in the next but two gait's supporting leg coordinate system seen from the next time gait's supporting leg coordinate system. Here, the next but two gait's supporting leg coordinate system is set in such a manner that the relative position/posture relationship between the next but one time gait's supporting leg coordinate system and the next but two gait's supporting leg coordinate system agrees with the relative position/posture relationship between the current time gait's supporting leg coordinate system and the next time gait's supporting leg coordinate system.

As with the supporting leg's foot position/posture at the start of the first turning gait, the supporting leg's foot position/posture at the end of the first turning gait is determined by using the finite duration settling filter to generate the foot position/posture trajectory leading from the supporting leg's foot position/posture at the start of the first turning gait to the expected landing position/posture of the first turning gait's supporting leg's foot (more specifically, trajectory seen from the next time gait's supporting leg coordinate system) until the end of the first turning gait.

The free leg's foot position/posture at the start of the second turning gait is the supporting leg's foot position/posture at the end of the first turning gait seen from the next but one time gait's supporting leg coordinate system. The supporting leg's foot position/posture at the start of the second turning gait is the free leg's foot position/posture at the end of the first turning gait seen from the next but one time gait's supporting leg coordinate system.

The free leg's foot position/posture at the end of the second turning gait is the free leg's foot position/posture at the end of the current time gait seen from the current time gait's supporting leg coordinate system. The supporting leg's foot position/posture at the end of the second turning gait is the supporting leg's foot position/posture at the end of the current time gait seen from the current time gait's supporting leg coordinate system.

The gait periods of the first and second turning gaits are set to be the same as the period of the next time gait. The gait periods of the first and second turning gaits are not necessarily required to be the same. However, both the periods are preferably determined in accordance with the period of the next time gait. Movement parameters of the current time gait, the first turning gait and the second turning gait other than those described above (including time parameters including the two leg supporting period duration) are appropriately determined so as to satisfy the gait requirements (for example, that the velocity of an actuator falls within an allowable range, that an allowable angle of the actuator is not surpassed and that a foot is not in contact with the floor or the like) in accordance with the parameters determined as described above.

Then, the process proceeds to step S102, where the reference body position/posture trajectory parameter for defining the reference body position/posture trajectory to be followed by the desired body posture is determined. The reference body posture is not necessarily required to be constant, as far as the reference body posture is the same at the start of the normal gait (start of the first turning gait) and the end thereof (end of the second turning gait) (the posture angle of the reference body posture and the angular velocity thereof are the same at the start and the end of the normal gait). However, in this embodiment, to be readily understood, the reference body posture is the upright posture (vertical posture). That is, in this embodiment, the reference body posture is the upright posture throughout the duration of the normal gait. Therefore, in this embodiment, the angular velocity and angular acceleration of the posture angle of the reference body posture are 0.

Then, the process proceeds to step S104, where arm posture trajectory parameters, more specifically, the arm posture trajectory parameters other than those concerning the angular momentums of the arms about the vertical axis (or body trunk axis) are determined. For example, arm posture trajectory parameters, such as the relative height of the tip of the arm with respect to the body 24 or the relative position of the center of gravity of the entire arm with respect to the body 24, are determined. In this embodiment, the relative position of the center of gravity of the entire arm is kept constant with respect to the body.

Then, the process proceeds to step S106, where floor reaction force's vertical component trajectory parameters are set. In this case, the floor reaction force's vertical component trajectory parameters are set in such a manner that the floor reaction force's vertical component trajectory defined by the parameters is substantially continuous (i.e., has no step-wise discrete values) in the first and second turning gaits as shown in FIG. 6. That is, the desired floor reaction force's vertical component trajectory of the normal turning gait is set to be the pattern shown in FIG. 16. According to this pattern, both for the first and second turning gaits, the floor reaction force's vertical component varies in a trapezoidal shape during the one leg supporting period and is kept at 0 during the floating period. And, the times of the apexes of the pattern and the heights (peak values) of the trapezoids are set as the floor reaction force's vertical component trajectory parameters.

In setting the floor reaction force's vertical component trajectory parameters, the average value of the floor reaction force's vertical component for the whole gait duration (period of one cycle of the normal gait, which is a sum of the periods of the first and second turning gaits) is made to agree with the weight of the robot 1. That is, the average value of the floor reaction force's vertical component is made equal in magnitude and opposite in direction to gravity applied to the robot 1.

Setting the floor reaction force's vertical component trajectory as described above is required to satisfy the normal gait requirement. The normal gait requirement is that the initial states of all the state variables (positions, postures and velocities of the parts of the robot 1) of the gait seen from the supporting leg coordinate system (coordinate system set on the surface at which the supporting leg's foot 22 is in contact) agree with the final states of the gait (final states of the second turning gait) seen from the next supporting leg coordinate system (supporting leg coordinate system of the next first turning gait) (hereinafter, this requirement is sometimes referred to as a boundary requirement of the normal gait). Therefore, the difference between the total center-of-gravity vertical velocity of the robot 1 at the end of the normal gait and the total center-of-gravity vertical velocity at the start of the normal gait (more specifically, difference between the total center-of-gravity vertical velocity at the end of the second turning gait and the total center-of-gravity vertical velocity at the start of the first turning gait) has to be 0. Since the difference described above is an integral (first order integral) of the difference between the floor reaction force's vertical component and gravity, the floor reaction force's vertical component trajectory has to be set as described above in order for the difference to be 0.

In this embodiment, the average values of the floor reaction force's vertical component for the periods of the first and second turning gaits are made to agree with the weight of the robot 1. More specifically, for example, after the times of the apexes of the trapezoidal line of the floor reaction force's vertical component trajectory in the first and second turning gaits are determined in accordance with the periods of the gaits, the heights of the trapezoids are determined in such a manner that the average values of the floor reaction force's vertical component for the first and second turning gaits agree with the weight of the robot 1 (the height of the trapezoids is determined by solving an equation representing agreement between the average values and the weight with the height of the trapezoid being assumed to be an unknown quantity).

This results in a difference of 0 between the total center-of-gravity vertical velocity at the end of the first turning gait and the total center-of-gravity vertical velocity at the start of the first turning gait and a difference of 0 between the total center-of-gravity vertical component at the end of the second turning gait and the total center-of-gravity vertical velocity at the start of the second turning gait. However, this is not essential. Alternatively, for example, the body's vertical position becomes too high or too low and, thus, the robot takes an unreasonable posture in the vicinity of the boundary between the first and second turning gaits, the height of the trapezoid of the floor reaction force's vertical component trajectory for the turning gaits may be modified from the state where the average values for the turning gaits agree with the weight.

Figure 16:
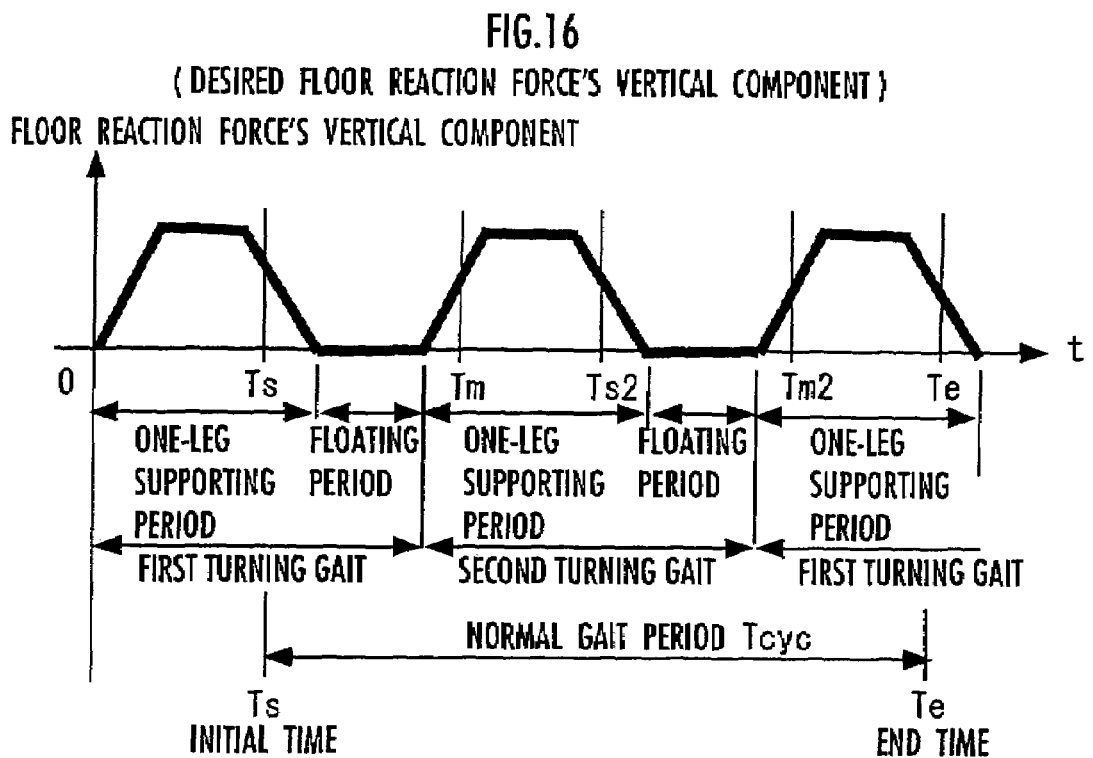
FIG. 16 is a graph showing an example of setting of a desired floor reaction force's vertical component for the normal gait.
Figure 17:
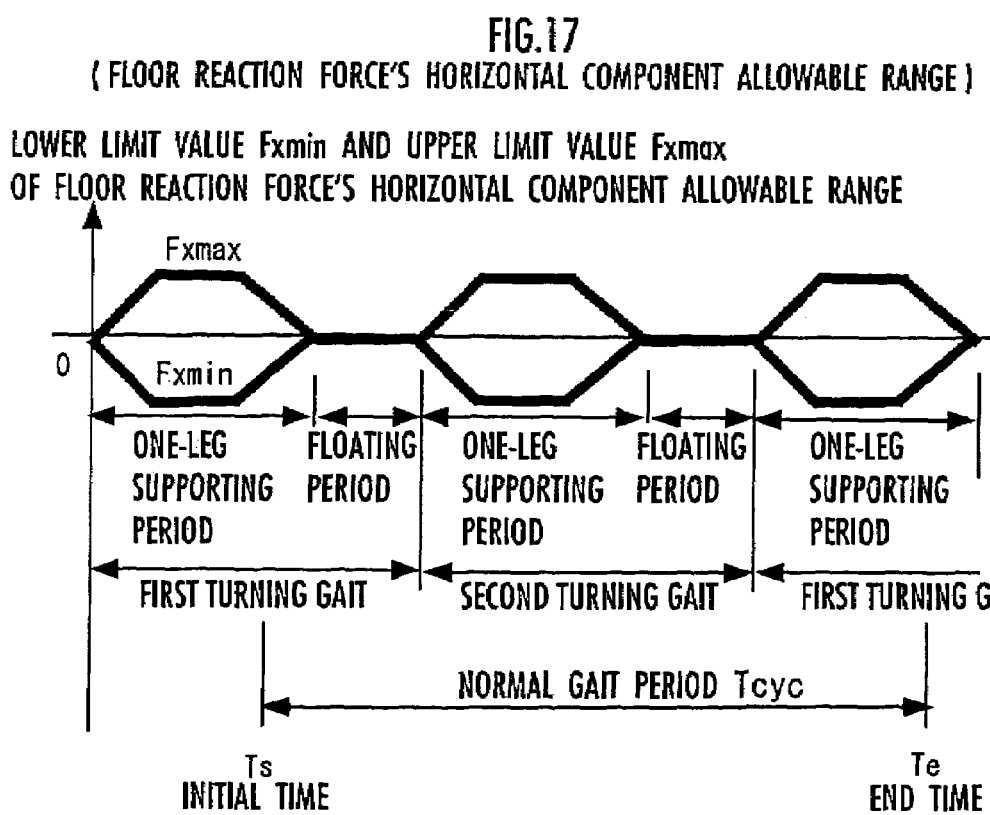
FIG. 17 is a graph showing an example of setting of a floor reaction force's horizontal component allowable range for the normal gait.

Then, the process proceeds to step S108, where an allowable range [Fxmin, Fxmax] (more specifically, a parameter that defines the allowable range) of the floor reaction force's horizontal component is determined, as shown in FIG. 17, in accordance with the floor reaction force's vertical component trajectory determined as described above as shown in FIG. 16. The polygonal line on the negative side in FIG. 17 represents the floor reaction force's horizontal component's allowable lower limit value Fxmin, and the polygonal line on the positive side represents the floor reaction force's horizontal component's allowable upper limit value Fxmax. The following is a supplementary description of a method of setting these values. In the following, a case where the floor surface is horizontal will be described.

The floor reaction force's horizontal component occurs due to friction between the floor and the foot 22. However, friction cannot be produced infinitely. Therefore, in order to prevent the actual robot 1 from slipping when it moves in accordance with the desired gait generated, the floor reaction force's horizontal component of the desired gait has to always fall within the friction limit. Thus, in order to satisfy this requirement, the floor reaction force's horizontal component allowable range is set, and, as described later, the desired gait is generated in such a manner that the floor reaction force's horizontal component of the desired gait falls within the allowable range.

Assuming that the friction coefficient between the floor and the foot 22 is $\mu$, the value of Fxmin has to be always equal to or higher than $-\mu*$ (floor reaction force's vertical component), and the value of Fxmax has to be always equal to or lower than $\mu*$ (floor reaction force's vertical component). The simplest settings areas follows. Herein, ka is a positive constant smaller than 1.

$F\text{xmin}=-ka*\mu*$(floor reaction force's vertical component)

$F\text{xmax}=ka*\mu*$(floor reaction force's vertical component)      formula 12

The floor reaction force's horizontal component allowable range shown in FIG. 17 is an exemplary range set in accordance with the formula 12. As parameters for defining the floor reaction force's horizontal component allowable range, the times of the apexes of trapezoidal waveform and the values of the waveform at the times in FIG. 17 may be set. However, in the case where the floor reaction force's horizontal component allowable range is determined by the formula 12, the parameter to be set may be only the value of (ka*μ) in the formula 12.

As far as the requirement (that the floor reaction force's horizontal component of the desired gait always falls within the friction limit) is satisfied, the floor reaction force's horizontal component allowable range may be set in any other setting method.

Then, the process proceeds to step S110, where a ZMP trajectory parameter that define the ZMP trajectory for the normal gait, which is a sum of the first and second turning gaits, is determined. In this case, the desired ZMP trajectory is determined to have a high stability margin and not to change abruptly, as described above.

Figure 18:
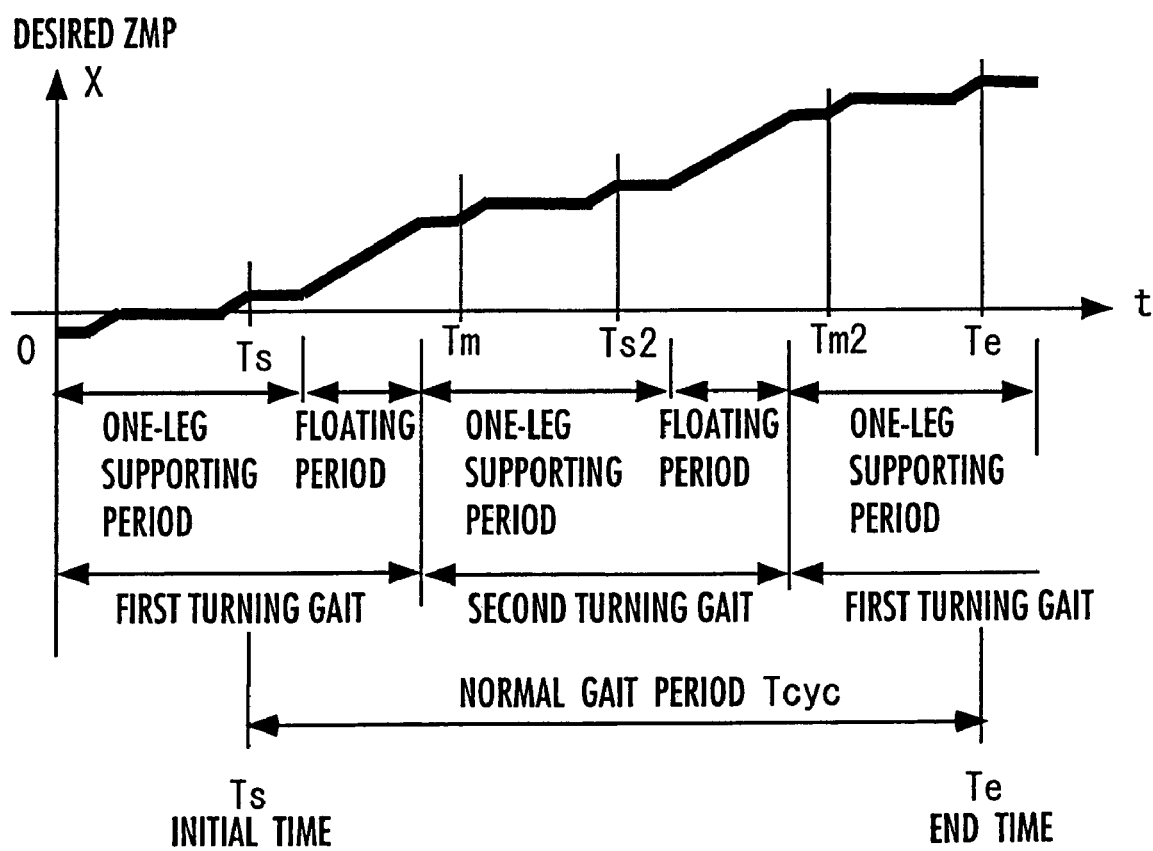
FIG. 18 is a graph showing an example of setting of a desired ZMP for the normal gait.

More specifically, in the running gait shown in FIG. 5, the heel of the supporting leg's foot 22 first lands, and some time after that, substantially the whole surface of the sole of the supporting leg's foot 22 comes into contact with the floor. Then, only the toe of the supporting leg's foot 22 comes into contact with the floor. Then, the robot jumps into the air by kicking the floor on the toe of the supporting leg's foot 22, and finally, the heel of the free leg's foot 22 lands. Besides, the desired ZMP has to lie within the contact surface. Thus, in this embodiment, as shown in the upper part of FIG. 7, both for the first and second turning gaits of the normal gait, the x-axis directional position of the desired ZMP is set to remain at the initial position, which is the position of the heel of the supporting leg's foot 22, until substantially the whole surface of the sole of the foot 22 comes into contact with the floor. Then, the desired ZMP is shifted to the middle of the supporting leg's foot 22 and then to the toe, making the foot 22 in contact with the floor only at the toe. Then, the desired ZMP remains at the position of the toe of the supporting leg's foot 22 until the foot takes off the floor. After that, as described above, the desired ZMP is shifted continuously from the toe of the supporting leg's foot 22 to the landing position of the heel of the free leg's foot 22 by the time of the next landing of the free leg's foot 22. Thus, the desired ZMP trajectory (X-axis directional trajectory) for the normal gait comprising the first and second turning gaits is as shown in FIG. 18. The times and positions of the apexes of the desired ZMP trajectory are set as ZMP trajectory parameters. In this case, the times of the apexes of the trajectory are determined based on the gait periods of the first and second turning gaits determined based on the required parameters, and the positions of the apexes of the trajectory are determined based on the positions/postures in the next time gait's supporting leg coordinate system and the next but one time gait's supporting leg coordinate system, or based on the required values of the expected landing positions/postures of the free leg's foot for the first and second steps of the required parameters that define these coordinate systems. The Y-axis directional position of the ZMP trajectory is determined as shown in the lower part of FIG. 7. More specifically, the trajectory of the Y-axis directional position of the desired ZMP for the first turning gait is set in the same pattern as that shown in the lower part of FIG. 7, and the trajectory of the Y-axis directional position of the desired ZMP for the second turning gait is set to have the same shape as that for the first turning gait and to be connected to the end of the trajectory for the first turning gait.

Finally, the process proceeds to step S112, where the initial time, the end time and the period of one step (one cycle) of the normal gait are redefined as follows.

The normal gait has to be a gait having state variables that are continuous at the start and the end thereof. For convenience of determination of such a gait, in this embodiment, until the normal gait is determined, unlike the definition of the gait in the narrow sense, the initial time, the end time and the period of one step of the normal gait are defined as shown in FIG. 16. That is, the time at which the floor reaction force's vertical component is decreased to some degree in the latter half of the one leg supporting period of the first turning gait is set as the initial time Ts of the normal gait. As shown in FIG. 7, the initial time Ts is preferably set to the instant when the supporting leg's foot 22 having been in contact with the floor at substantially the whole surface of the sole thereof comes into contact with the floor only at the toe thereof or a time immediately before the instant (the end time of the period in which whole the sole of the foot is in contact with the floor or a time immediately before the end time in FIG. 7). In addition, as for the relationship between the desired ZMP and the time Ts determined in step S110 and shown in FIG. 18 (or FIG. 7), it is preferable that the time Ts is the instant when the supporting leg's foot is in contact with the floor only at the toe after the desired ZMP has been completely shifted to the toe of the supporting leg's foot 22 through the middle thereof after substantially the whole surface of the sole of the supporting leg's foot 22 had come into contact with the floor in the first turning gait. Such an initial time Ts is determined in accordance with the desired ZMP trajectory parameter previously determined, for example. The reason why the initial time Ts is determined as described above will be described later.

Furthermore, as shown in FIG. 16, the period Tcyc of the normal gait is a sum of the gait periods of the first and second turning gaits. The end time of the normal gait is Te. Te is the time Ts plus Tcyc.

From the point in time when the normal gait is determined (when the loop of step S204 in FIG. 19 described later exits), the definitions of the initial time, the end time and the like of the gait in the narrow sense described above are adopted again. In the following description, the initial time according to the definition of the gait in the narrow sense described above (the time of the landing of the supporting leg's foot 22) is assumed to be 0, and reference symbol Ts is used to discriminate this original initial time 0 from the above-described initial time Ts used until the normal gait is determined (sometimes simply abbreviated as "Ts").

After the processings from steps S010 to S022 in FIG. 12 is conducted, the process proceeds to step S204, where initial states of the normal gait are calculated. The initial states calculated in this step include the initial body horizontal position/velocity (initial body position and initial body velocity in the horizontal direction), the initial body vertical position/velocity (initial body vertical position and initial body velocity in the vertical direction), the initial divergence component, the initial body posture angle and the angular velocity thereof for the normal gait. These initial states are calculated in a searching manner according to the flowchart in FIG. 19.

Figure 19:
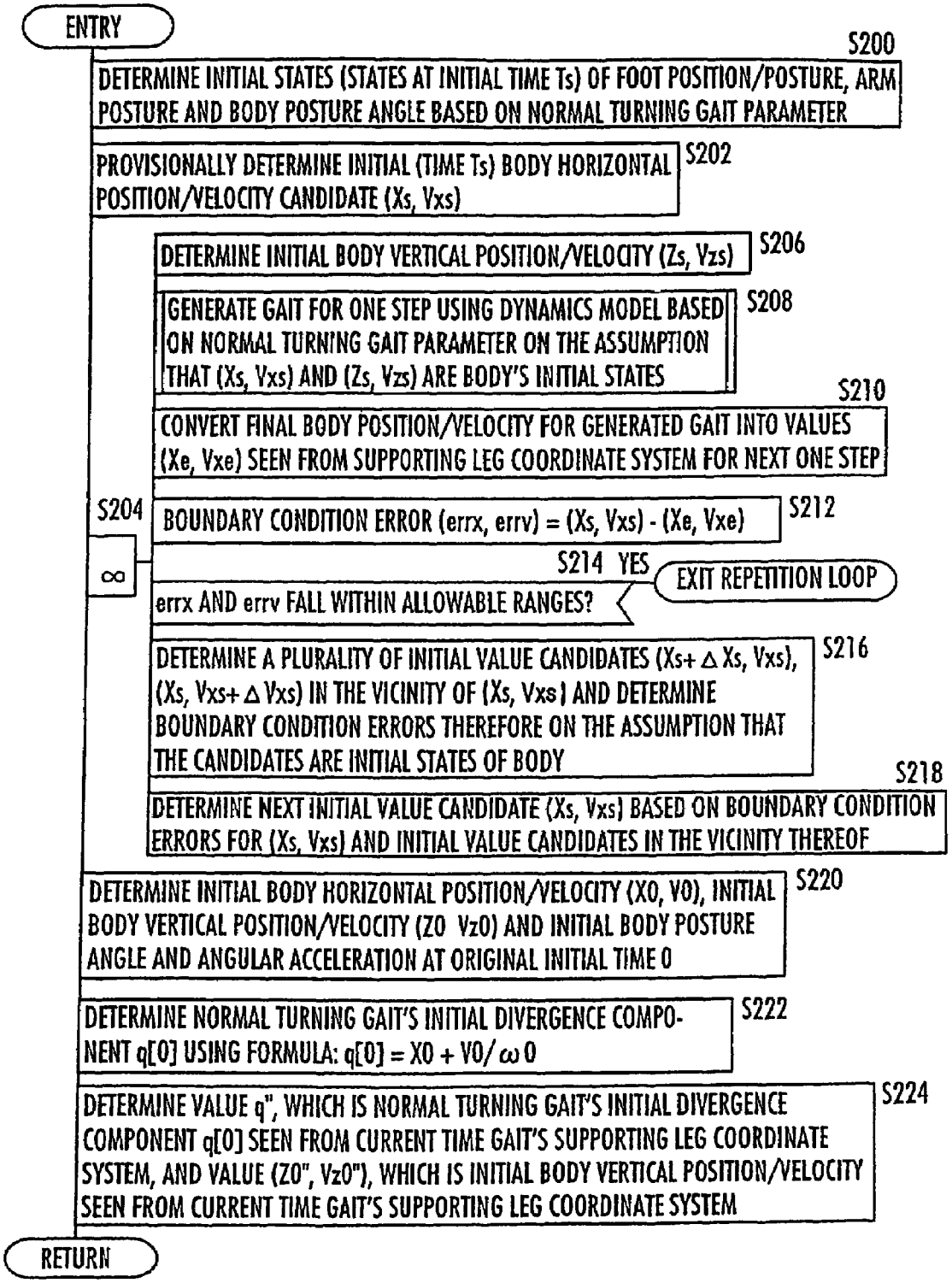
FIG. 19 is a flowchart showing subroutine process in the flowchart shown in FIG. 12.

In the flowchart in FIG. 19, first, in step S200, the initial states (states at the initial time Ts) of the desired foot position/posture, the desired arm posture and the desired body posture angle (posture angle and direction) are determined based on the gait parameters for the normal gait (parameters determined in step S022 in FIG. 12). The term "state" refers to a position, a posture angle and variation rates (time differentials) thereof.

Figure 14:
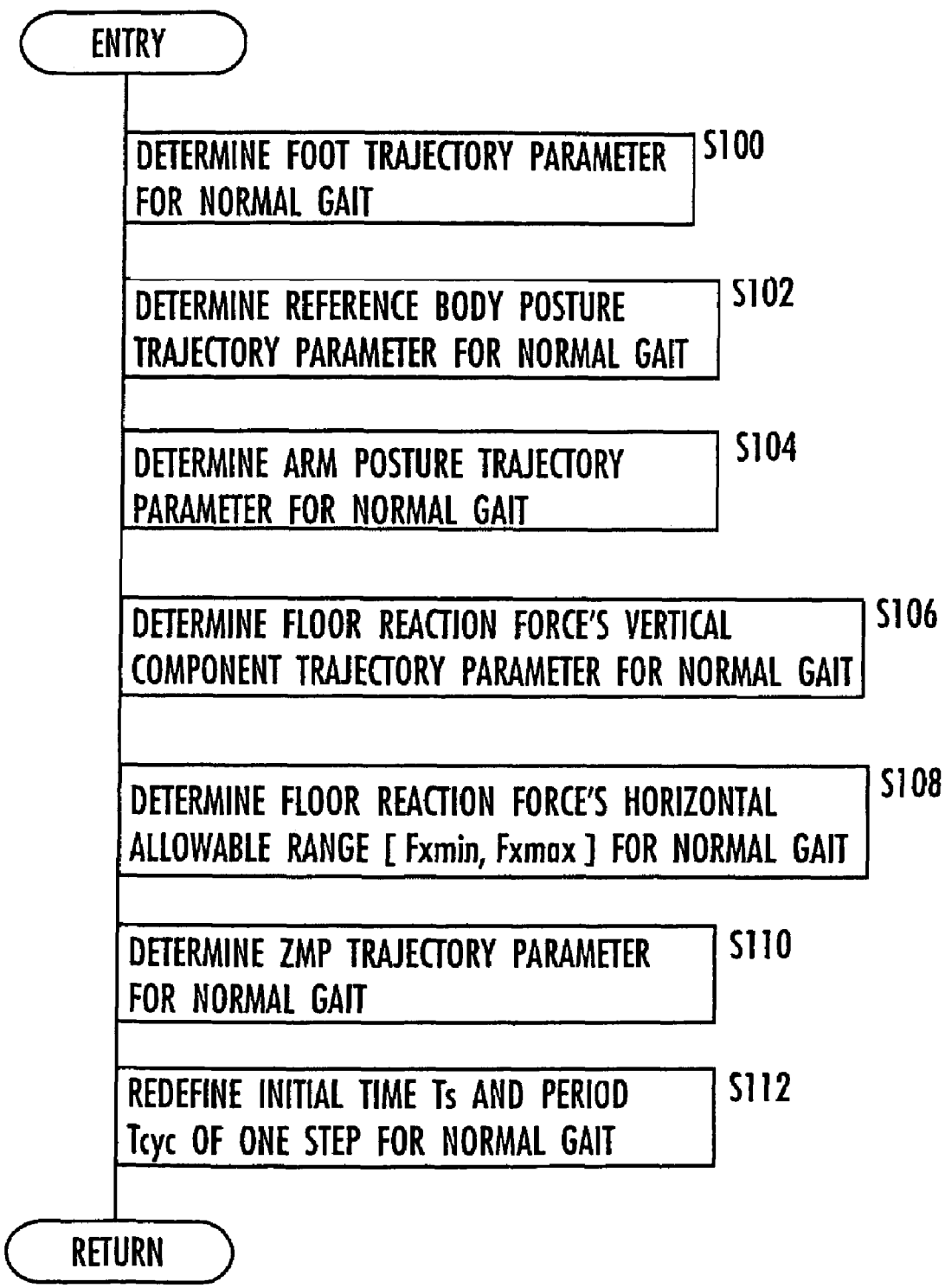
FIG. 14 is a flowchart for illustrating subroutine process in the flowchart shown in FIG. 12.

In this case, the initial state of the desired foot position/posture of the supporting leg is determined by using the finite duration settling filter to generate the foot position/ posture trajectory (trajectory seen from the next time gait's supporting leg coordinate system) leading from the supporting leg's foot position/posture at the start of the first turning gait of the foot trajectory parameters determined in step S100 in FIG. 14 to the free leg's foot position/posture at the end of the second turning gait until the time Ts. The initial state of the desired foot position/posture for the free leg is determined by using the finite duration settling filter to generate the foot position/posture trajectory leading from the supporting leg's foot position/posture at the start of the current time gait seen from the next time gait's supporting leg coordinate system to the free leg's foot position/posture at the end of the first turning gait until the time Ts. Besides, the initial state of the desired arm posture is determined by determining the arm posture (total center-of-gravity position of the arms with respect to the body 24, for example) at the time Ts based on the arm posture trajectory parameters determined in step S104 in FIG. 14. Besides, as the initial state of the desired body posture angle, the reference body posture (posture angle) and the angular velocity thereof at the time Ts, which are determined based on the reference body posture trajectory parameters determined in step S102 in FIG. 14, are determined. In this embodiment, since the reference state posture angle is the vertical posture, the initial state of the desired body posture angle is 0 (the posture angle and the angular velocity thereof are 0). Furthermore, in this embodiment, the desired foot position/posture trajectory, the floor reaction force's vertical component trajectory and the desired ZMEP trajectory for the normal gait are independently determined from the foot trajectory parameters, the floor reaction force's vertical component trajectory parameters and the ZMP trajectory parameters determined in the flowchart in FIG. 14, respectively. For example, the instantaneous desired foot position/posture for the normal gait is determined based on the foot trajectory parameters, independently of the instantaneous value of the floor reaction force's vertical component.

Then, in step S202, (Xs, Vxs), which are candidates for the initial body horizontal position/velocity (that is, body horizontal position/posture candidates at the initial time Ts), are provisionally determined, where Xs is the horizontal position and Vxs is the horizontal velocity. The candidates (Xs, Vxs) provisionally determined in this step may be arbitrary ones and, for example, may be the body horizontal position/velocity of the initial states of the normal gait determined when the last time gait is generated.

For the simplicity of explanation, a case where the initial states for the normal gait in the X direction (back and forth direction) in the sagittal plane are searched for is taken as an example. Actually, however, both for the position and velocity, the initial states for the normal gait (initial states that satisfy the boundary requirement of the normal gait) for the X direction (back and forth direction) and the Y direction (sideward direction) have to be searched for separately or concurrently.

As the determination method in a searching manner, the simplex method or a method of determining an affine Jacobian (sensitivity matrix) and determining a next candidate by the steepest descent method may be used. In this embodiment, the steepest descent method is used.

Then, in step S206 after step S204, the initial (time Ts) body vertical position/velocity (Zs, Vzs) is determined, where Zs is the vertical position and Vzs is the vertical velocity.

In this embodiment, the initial body vertical velocity Vzs is determined as follows in an analytical manner.

For the robot 1, the following dynamical relationship holds.

$$\text{(final total center-of-gravity vertical position)} - \text{(initial total center-of-gravity vertical position)} = \text{second order integral of (floor reaction force's vertical component/total mass of the robot)} + \text{second order integral of the gravitational acceleration} + \text{(initial total center-of-gravity vertical velocity)} * \text{(duration of one step)} \quad \text{formula 13}$$

(The gravitational acceleration is a negative value.)

In the normal gait, since the final total center-of-gravity vertical position agrees with the initial total center-of-gravity vertical position, the right side in the formula 13 has to be 0. Thus, the initial total center-of-gravity vertical velocity can be determined from these relationships. Specifically, a value obtained by dividing the floor reaction force's vertical component, which is calculated from the floor reaction force's vertical component parameters set in step S104 in FIG. 14, by the total mass of the robot 1 is integrated two times with respect to the period of one step (from the time Ts to the time Te), thereby determining the displacement of the total center of gravity due to the floor reaction force's vertical component (first term in the right side of the formula 13). Furthermore, the gravitational acceleration is integrated two times with respect to the period of one step, thereby determining the displacement of the total center of gravity due to gravity (second term in the right side of the formula 13). Then, the sum of the displacement of the total center of gravity due to the floor reaction force and the displacement of the total center of gravity due to gravity is inverted in sign, and the resulting value is divided by the duration of one step (duration of one cycle Tcycl of the normal gait), thereby determining the initial total center-of-gravity vertical velocity.

Then, in order to determine the initial body vertical position Zs, the total center-of-gravity vertical velocity at the time 0 is determined using the following formula. In this process, the value determined from the formula 13 as described above is substituted for the total center-of-gravity vertical velocity at the time Ts in the following formula, and the integral time is from the time 0 to the time Ts.

$$\text{(total center-of-gravity vertical velocity at the time } Ts) - \text{(total center-of-gravity vertical velocity at the time 0)} = \text{first order integral of (floor reaction force's vertical component/total mass of the robot)} + \text{first order integral of the gravitational acceleration} \quad \text{formula 14}$$

(The gravitational acceleration is a negative value.)

Then, the body height determination method proposed in Japanese Patent Laid-Open No. 10-86080 by the applicants is used to determine the body height (body vertical position) at the time 0 (that is, at the instant of landing). In this process, the body vertical position (body height) that allows the knees of the legs 2, 2 not to be fully stretched at the time 0 is determined based on the foot position/posture at the time 0 (the supporting leg's foot position/posture at the start of the first turning gait (at the time 0) and the free leg's foot position/posture at the start of the first turning gait (at the time 0) determined in step S100 in FIG. 14) and a predetermined geometrical condition concerning the bending angle of the knees of the legs 2. Specifically, assuming that the bending angle of the knee of the supporting leg 2 is θsup and the bending angle the knee of the free leg 2 is θswg, the body vertical position is determined in such a manner that the sum of the inverse numbers of the sinusoidal values of the knee bending angles θsup and θswg equals to a predetermined value (finite value), for example. Here, the knee bending angles θsup and θswg are the angles of the center axis of the crus part with respect to the center axis of the thigh part of each leg 2 and increase from 0 as the knee is bent from a state where each leg 2 is fully stretched. Such a method of determining the vertical position of the body 24 is described in detail in Japanese Patent Laid-Open No. 10-86080, and thus, further description thereof is omitted herein.

Then, from the body vertical position and the foot position/posture at the time 0 thus determined, the total center-of-gravity vertical position at the time 0 is determined using the robot 1 model. For example, the kinematics model represented by the formula 04, which corresponds to the model shown in FIG. 10, may be used to determine the total center-of-gravity vertical position at the time 0. Specifically, the vertical position of the body material particle 24m is determined from the body vertical position and the body posture angle (0 in this embodiment) at the time 0, and the vertical positions of the supporting leg material particle 2m and the free leg material particle 2m are determined from the supporting leg's foot position/posture and the free leg's foot position/posture at the time 0 (the supporting leg's foot position/posture at the start of the first turning gait and the free leg's foot position/posture at the start of the first turning gait determined in step S100 in FIG. 14), respectively. Then, these vertical positions of the body material particle 24m, the supporting leg material particle 2m and the free leg material particle 2m are substituted for Zb, Zsup and Zswg in the formula 04, respectively, thereby determining the total center-of-gravity vertical position (ZGtotal in the formula 04). Alternatively, a more precise model of the robot 1 (for example, the multi-mass model such as shown in FIG. 11) may be used to take into consideration the body horizontal position and the arm posture at the time 0 to determine the total center-of-gravity vertical position at the time 0.

Then, in the formula 13, the total center-of-gravity vertical position at the time 0 determined as described above is substituted for the initial total center-of-gravity vertical position in the left side of the formula 13, the total center-of-gravity vertical velocity at the time 0 determined as described above is substituted for the initial total center-of-gravity vertical velocity in the right side of the formula 13, Ts is substituted for the duration of one step in the formula 13, and a period from the time 0 to the time Ts is defined as the integral time, thereby calculating the value of the final total center-of-gravity vertical position in the left side of the formula 13, which is regarded as the initial (time Ts) total center-of-gravity vertical position. Furthermore, from the initial (time Ts) total center-of-gravity vertical position, the foot position/posture at the time Ts (determined in step S200) and the like, the initial (time Ts) body vertical position Zs is determined using a model of the robot 1 (the kinematics model represented by the formula 04, for example). Specifically, from the horizontal positions/postures of the supporting leg and the free leg at the time Ts, the vertical positions of the supporting leg material particle 2m and the free leg material particle 2m in the model shown in FIG. 10 are determined, and the vertical positions and the initial (time Ts) total center-of-gravity position determined as described above are applied to the formula 04, thereby determining the vertical position of the body material particle 24m (Zb in the formula 04). Then, from the vertical position of the body material particle 24m and the body posture at the time Ts (0 in this embodiment), the initial (time Ts) body vertical position Zs can be determined in an inverse operation manner. In this case also, a more precise model may be used to take into consideration the body horizontal position and the arm posture to determine the initial body vertical position Zs.

Finally, from the initial state of the foot position/posture determined in step S200, the initial total center-of-gravity vertical velocity determined in step S206 and the like, the initial body vertical velocity is determined using a model of the robot 1 (for example, the kinematics model represented by the formula 04). Specifically, the initial total center-of-gravity vertical velocity determined based on the formula 13 and the vertical velocities of the supporting leg material particle 2m and the free leg material particle 2m determined by the initial states of the foot positions/postures of the supporting leg and free leg are applied to a formula obtained by time-differentiating the both sides of the formula 04, thereby determining the vertical velocity of the body material particle 24m. Then, from the vertical velocity of the body material particle 24m and the initial state of the body posture angle (determined in step S200 or S208 described later), the body vertical velocity is determined. Alternatively, such an initial body vertical velocity that provides the initial total center-of-gravity vertical velocity determined as described above may be determined using a more precise model of the robot 1 by taking into consideration the initial state of the arm posture (determined in step S200), the initial state of the body horizontal position provisionally determined (the latest ones provisionally determined in step S202 or step S216 or S218 described later) and the initial body vertical position determined as described above in addition to the initial state of the foot position/posture and the initial total center-of-gravity vertical velocity.

Figure 11:
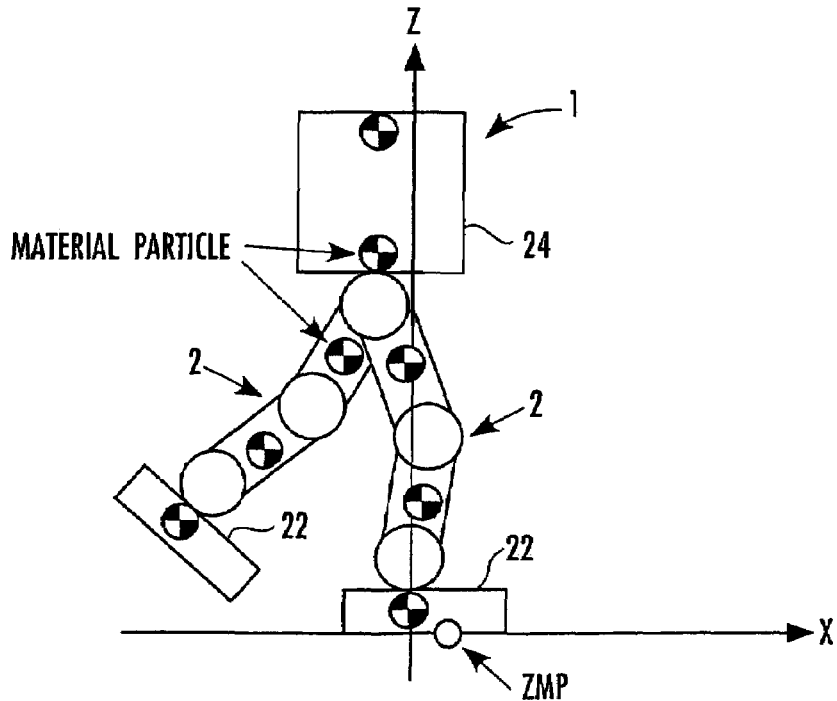

More specifically, even if the model of the robot 1 is a complicated (precise) one such as shown in FIG. 11, since the robot 1 has six degrees of freedom for each leg, all the initial states of the robot are determined uniquely if the initial states of the foot position/posture trajectory and the body position/posture trajectory (position/posture and the variation rates thereof) are given. Therefore, the initial total center-of-gravity vertical velocity can be determined uniquely if the same are given. Inversely, since the robot has six degrees of freedom for each leg, even if one, concerning velocity, of the initial states of the foot position/posture trajectory and the body position/posture trajectory (for example, the initial body vertical velocity) is undetermined, the undetermined initial state is determined uniquely if the initial total center-of-gravity vertical velocity is given.

After the processing of step S206, the process proceeds to step S208, where a provisional normal turning gait is generated. More specifically, based on the gait parameters of the normal gait determined in step S022 in FIG. 12, the desired ZMP, the desired floor reaction force's vertical component, the desired foot position/posture, the reference body posture, the desired arm posture and the floor reaction force's horizontal component allowable range at instants between the initial time Ts and the end time Te are determined successively. Then, in such a manner that the dynamical equilibrium conditions concerning the desired ZMP and the desired floor reaction force's vertical component and the condition concerning the floor reaction force's horizontal component allowable range are satisfied, the body position/posture is determined using the dynamics model (model shown in FIG. 10) assuming that the body horizontal position/velocity (Xs, Vxs) and the body vertical position/velocity (Zs, Vzs) are the initial (time Ts) states of the body 24, thereby generating the gait from the time Ts to the end time Te. In this process, the body posture is generated so as to agree with the reference body posture as closely as possible.

The generation of the normal gait is performed only in the gait generation device 100, and the result is not output to the composite-compliance determinator 104, described later, as a desired value for driving the actual robot 1.

Details of a normal gait generation process using successive calculation, which is the processing in step S208, will be described below.

Figure 20:
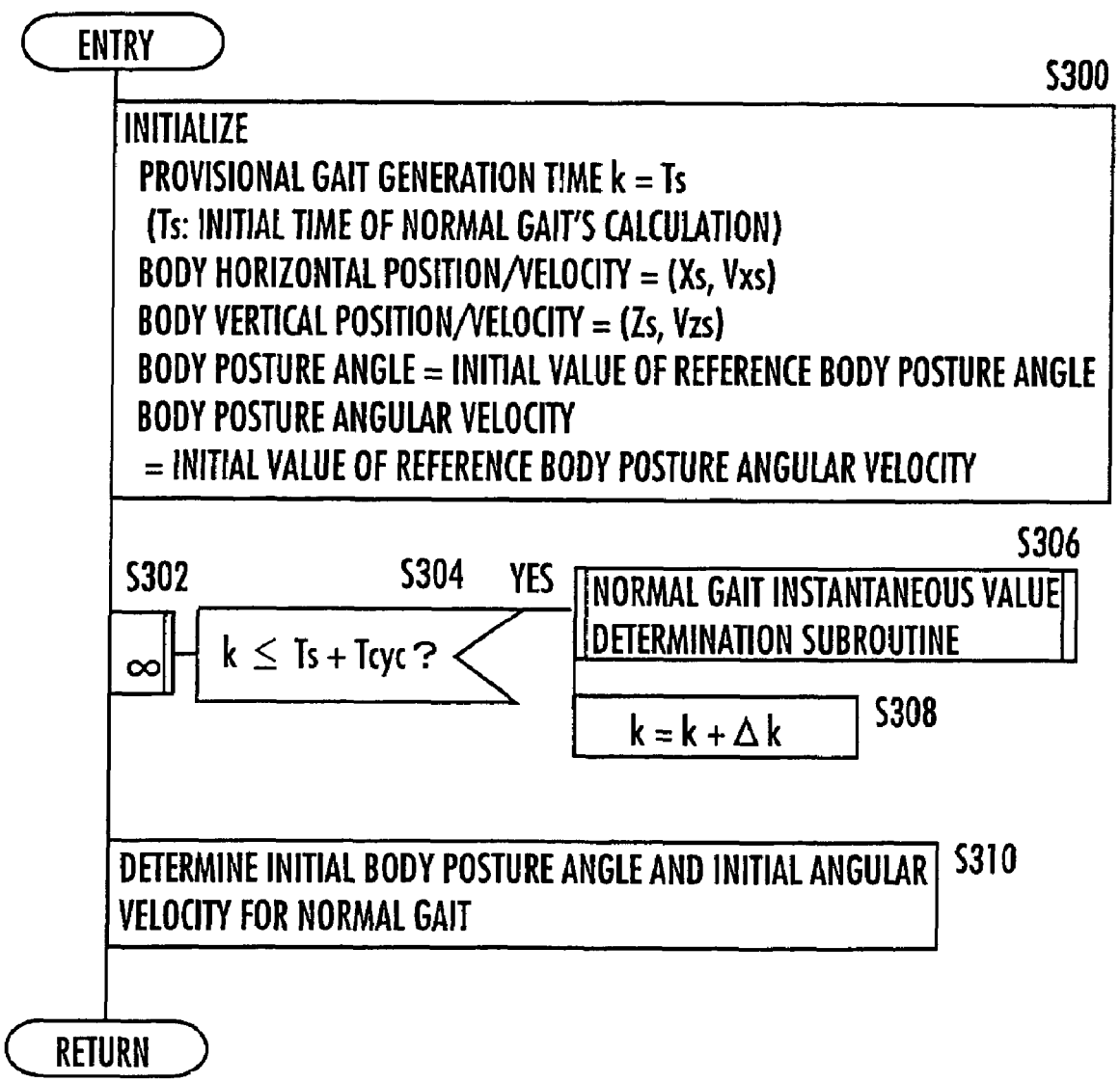
FIG. 20 is a flowchart showing subroutine process in the flowchart shown in FIG. 19.

FIG. 20 is a subroutine flowchart showing the process.

In step S300, various initializations are performed. Specifically, the initial time Ts is substituted for the provisional gait generation time k. Furthermore, the currently determined provisional values (Xs, Vxs) (determined in step S202 in FIG. 19 or steps S216 or S218 described later) are substituted for the body horizontal position/velocity, and the latest values (Zs, Vzs) determined in step S206 are substituted for the body vertical position/velocity. In addition, the reference body posture angle's initial value (reference body posture angle at the time Ts) is substituted for the desired body posture angle, and the reference body posture angular velocity's initial value (reference body posture angular velocity at the time Ts) is substituted for the desired body posture angular velocity. In addition, the initial desired body posture angular velocity is eventually changed as described later, and therefore, a value different from the reference body posture angular velocity's initial value may be substituted for the desired body posture angular velocity.

Then, in step S304 after step S302, it is determined whether the provisional gait generation time k precedes the end time of the gait or not (whether $k \leq Ts+Tcyc$). If the result of the determination is YES, the process proceeds to a gait instantaneous value determination subroutine of step S306, where gait instantaneous values are determined. Then, the process of the gait generation device 100 proceeds to step S308, where the provisional gait generation time k is incremented by Δk, and then, the process returns to step S304.

Here, Δk is an interval between provisional gait generations and may generally be the same as the control cycle Δt. If the dynamical precision of the provisional gait can be lowered, Δk may be set longer than Δt for reducing the calculation amount.

If the result of the determination in step S304 is NO, the process proceeds to step S310. By the process described above, the normal gait is generated from the start to the end thereof before the process proceeds to step S310.

Details of the gait instantaneous value determination subroutine of step S306 will be described with reference to FIG. 21.

Figure 21:
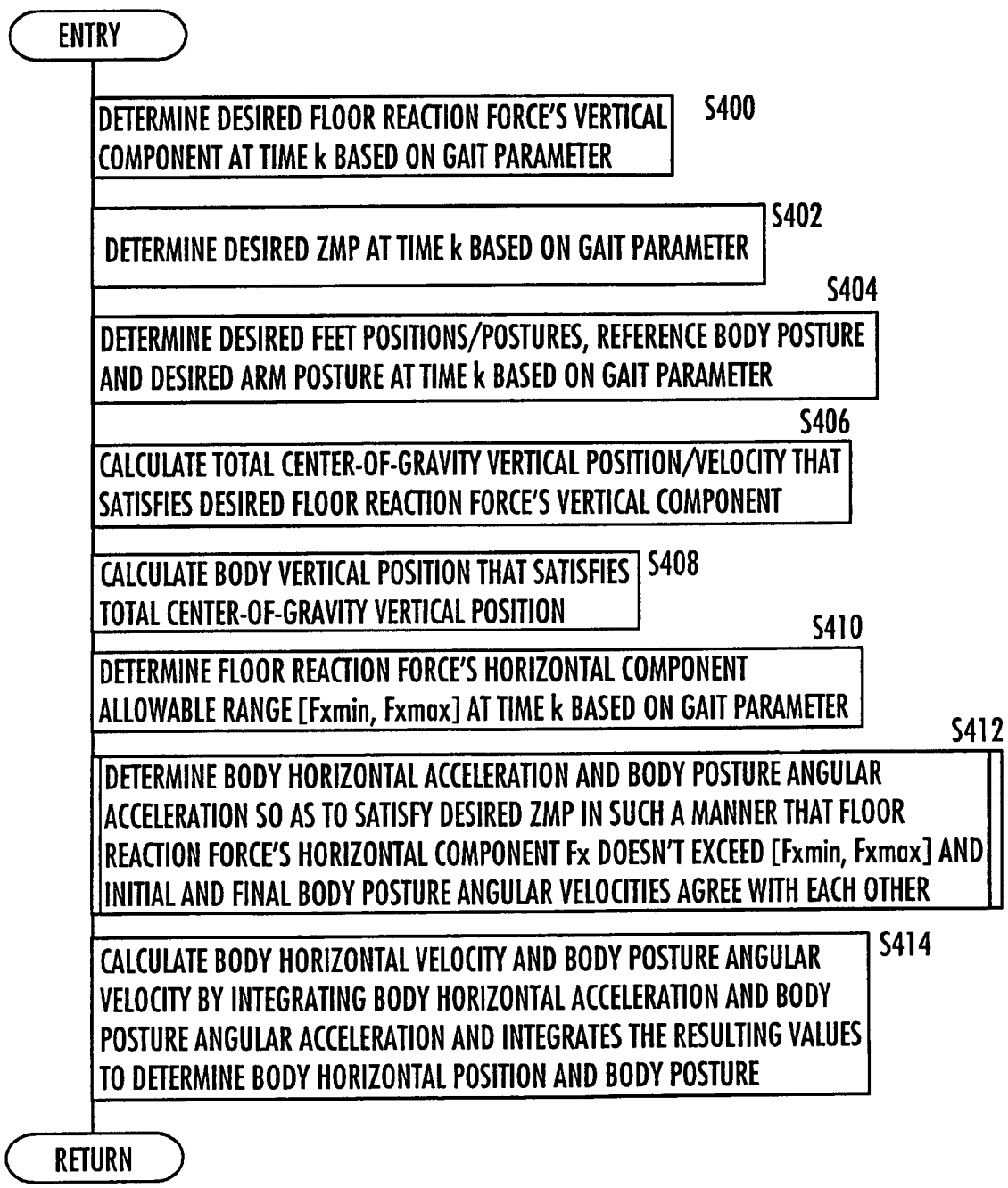
FIG. 21 is a flowchart showing subroutine process in the flowchart shown in FIG. 20.

First, in step S400 in FIG. 21, based on the normal gait parameters (floor reaction force's vertical component trajectory parameters), the value (current time value) of the desired floor reaction force's vertical component at the time k shown in FIG. 16 is determined. Furthermore, in step S402, based on the normal gait parameters (ZMP trajectory parameters), the value (current time value) of the desired ZMP trajectory at the time k shown in FIG. 18 is determined.

Then, the process proceeds to step S404, where based on the normal gait parameters (the foot trajectory parameters, the reference body posture trajectory parameters and the arm posture trajectory parameters), the values (current time values) of the desired feet positions/postures (desired foot positions/postures of the supporting leg and the free leg), the reference body posture and the desired arm posture at the time k are determined. More specifically, as for the desired arm posture, the total center-of-gravity position of the both arms is determined, although the movement (swing movement) of the arm involving a change of angular momentum about the vertical axis (or body trunk axis) is not determined yet. The current time value (value at the time k) of the desired foot position/posture is determined in the same manner as the foot position/posture at the initial time Ts determined in step S200 in FIG. 19.

Then, the process proceeds to step S406, where the value (current time value) of the total center-of-gravity vertical position/velocity at the time k that provides the desired floor reaction force's vertical component (i.e., brings the sum of the vertical inertial force of the robot 1 and the gravity into balance with the desired floor reaction force's vertical component) is calculated. Specifically, based on the formulas 01 and 04 concerning the dynamics model in FIG. 10, for example, the total center-of-gravity vertical position/velocity is calculated. That is, according to the formulas 01 and 04, there is provided a formula (equation of motion concerning the total center of gravity of the robot 1 in the vertical direction) that represents that the total mass of the robot 1 multiplied by the sum of the total center-of-gravity vertical acceleration due to the movement of the robot 1 and the gravitational acceleration equals to the floor reaction force's vertical component. Thus, from the formula and the desired floor reaction force's vertical component, the total center-of-gravity vertical acceleration is determined.

This formula itself generally holds without depending on the model of the robot 1. Then, the total vertical acceleration thus determined is integrated, thereby calculating the total center-of-gravity vertical velocity, and the total center-of-gravity vertical velocity is further integrated, thereby calculating the total center-of-gravity vertical position. More generally, these calculations are performed using the dynamical formulas represented by the following formulas 15 and 16 (discrete versions of the Newton's equation of motion).

total center-of-gravity vertical velocity at the time $k =$   formula 15
total center-of-gravity vertical velocity at the time
$(k - \Delta k) +$ ((floor reaction force's vertical component/total
mass of the robot) + gravitational acceleration) $* \Delta k$
(The gravitational acceleration is a negative value.)

total center-of-gravity vertical position at the time $k =$   formula 16
total center-of-gravity vertical position at the time
$(k - \Delta k) +$ total center-of-gravity vertical velocity
at the time $k * \Delta k$ Then, the process proceeds to step S408, where the body vertical position that provides the total center-of-gravity vertical position is calculated. Specifically, using the formula 04 concerning the model in FIG. 10, the total center-of-gravity vertical position is calculated. That is, from the current values of the desired foot positions/postures of the supporting leg and the free leg, the vertical positions of the supporting leg material particle $2m$ and the free leg material particle $2m$ in the model in FIG. 10 are determined. Then, these vertical positions of the supporting leg material particle $2m$ and the free leg material particle $2m$ and the current value of the total center-of-gravity vertical position determined in step S407 are applied to the formula 04, thereby determining the vertical position of the body material particle $24m$. Furthermore, the body vertical position is determined from the vertical position of the body material particle $24m$ and the current value of the desired body posture angle (the current reference body posture angle set in step S404 or the last time desired body posture angle (at the time $k-\Delta k$) determined in step S414 described later).

Alternatively, a more precise model (for example, a model in which a material particle is given to each link of the robot 1 as shown in FIG. 11) may be used to determine the body vertical position. In this case, the body vertical position is determined in such a manner that the total center-of-gravity vertical position agrees with the current time value of the total center-of-gravity vertical position determined as described above. Here, the total center-of-gravity vertical position is determined by the current time value of the desired feet positions/postures determined as described above (value at the time k), the desired body posture at the time $(k-\Delta k)$ (or current time value of the reference body posture determined as described above), the current time value of the desired arm posture determined as described above (position of the center of gravity of the arms), the body horizontal position at the time $(k-\Delta k)$ and the body vertical position to be determined.

In this case, the body posture and the body horizontal position at the time k are undetermined, and therefore, the values thereof at the time $(k-\Delta k)$ are used instead thereof. For a higher precision, the estimated values thereof at the time k maybe determined from the gait state at the time $(k-\Delta k)$ by extrapolation.

Then, the process proceeds to step S410, where based on the gait parameters (parameters defining the floor reaction force's horizontal component allowable range) determined in step S108 in FIG. 14, the value (current time value) of the floor reaction force's horizontal component allowable range [Fxmin, Fxmax] at the time k shown in FIG. 17 is determined.

Then, the process proceeds to step S412, the current time values of the body horizontal acceleration and the body posture angular acceleration are determined in such a manner that the dynamical equilibrium condition concerning the desired ZMP (condition that the horizontal component of the moment caused about the desired ZMP by the resultant force of the inertial force of the robot 1 and the gravity is 0) is satisfied. However, the body horizontal acceleration and the body posture angular acceleration are determined in such a manner that the floor reaction force's horizontal component Fx doesn't exceed the range [Fxmin, Fxmax] and an equal body posture angular velocity is provided at the start and the end of the normal gait. Details thereof will be described below.

Since the instantaneous values (current time values) of the foot position/posture and the body vertical position have been determined as described above at this point in time, the desired movement of the robot 1 except for the degree of freedom of the movement of the arm that involves a change of the angular momentum about the vertical axis can be determined uniquely by determining the body horizontal position and the body posture angle. Therefore, if the body horizontal position and the body posture angle are determined, all the quantities concerning the floor reaction force are uniquely determined except for the moment of the floor reaction force about the vertical axis. In this embodiment, the desired floor reaction force's vertical component and the desired ZMP for the normal gait are defined by the floor reaction force's vertical component trajectory parameters and the desired ZMP trajectory parameters determined in step S022 in FIG. 12, respectively. Therefore, of the quantities concerning the floor reaction force, only the floor reaction force's horizontal component is determined depending on the body horizontal position and the body posture angle determined. In addition, as described above, since the robot 1 has six degrees of freedom for each leg, the positions/postures of the parts of each leg 2 are uniquely determined from the desired foot position/posture and the desired body position/posture. The degree of freedom of the movement of the arm that involves a change of the angular momentum about the vertical axis is used to cancel a spinning force, as described later.

In gait generation, if the desired ZMP is provided (the horizontal component of the floor reaction force moment about the desired ZMP is brought to 0) using primarily the body rotation mode rather than the body translation mode, there arises a possibility that the body posture angle fluctuates too largely. Thus, to avoid this, the body translation mode should be used as far as circumstances permit. However, since the body translation mode involves a change of the floor reaction force's horizontal component, in the case where the floor reaction force's horizontal component allowable range is narrow, there is a possibility that the robot slips if the body translation mode works intensely. In such a case, the body rotation mode has to be used. In particular, in a period in which the floor reaction force's horizontal component allowable range is 0 as in the case of the running gait, such a gait that produce a floor reaction force's horizontal component cannot be generated, and thus, the body rotation mode has to be used. In view of the points described above, in this embodiment, the body horizontal acceleration and the body posture angular acceleration are determined according to the flowchart shown in FIG. 22.

First, in step S500, a time Tm is set. The time Tm is an instant when the floor reaction force's vertical component has increased to a predetermined level during a second turning gait after the initial time Ts and the floating period of a first turning gait. In addition, there is set a time Ts2 at which the floor reaction force's vertical component has decreased to some degree in the latter half of the second turning gait. In addition, there is set a time Tm2 at which the floor reaction force's vertical component has increased to a predetermined magnitude in the next first turning gait after the floating period in the second turning gait.

FIG. 16 shows these times. The time Tm is preferably set to the instant when substantially the whole surface of the sole of the supporting leg's foot 22 comes into contact with the floor or a time immediately after the instant. The same holds true for the time Tm2. Besides, the time Ts2 is preferably set to the instant when the foot 22 having been in contact with the floor at substantially the whole surface of the sole thereof comes into contact with the floor only at the toe thereof or a time immediately before the instant.

As for the relationship between the desired ZMP shown in FIG. 18 determined in step S110 in FIG. 14 and the times Tm, Ts2 and Tm2, it is preferably that the time Tm is an instant when the desired ZMP, which has remained at an initial position, which is the position of the heel of the supporting leg's foot 22, until substantially the whole surface of the sole of the foot 22 comes into contact with the floor, starts moving toward the middle of the supporting leg's foot 22. The time Ts2 is preferably set to an instant when the desired ZMP is completely shifted to the toe and only the toe of the supporting leg's foot 22 is in contact with the floor. In addition, the time Tm2 is preferably set to an instant when the desired ZMP, which has remained at an initial position, which is the position of the heel of the supporting leg's foot 22, until substantially the whole surface of the sole of the foot 22 comes into contact with the floor, starts moving toward the middle of the supporting leg's foot 22.

The reason why these times are determined as described above will be described later.

Then, in step S502, it is determined whether the present time k (value indicated by a normal gait generation timer) lies between the time Ts and the time Tm or between the time Ts2 and the time Tm2. If the result of the determination in step S502 is YES, the process proceeds to step S504, and if the result is NO, the process proceeds to step S518.

In step S504, the body horizontal acceleration αtmp is determined which is required to satisfy the current time desired ZMP (at the time k) in the case where the angular acceleration for the body rotation mode is set to 0 to make the robot 1 move in the body translation mode from the last time instantaneous gait state (gait state at the time k−1) of the robot 1. The value αtmp is determined using, for example, the formula 03 concerning the dynamics model shown in FIG. 10. More specifically, for example, the vertical accelerations of the supporting leg material particle 2m and the free leg material particle 2m at the present time k are determined using time series values of the desired foot position/posture determined before the present time k, and the vertical positions of the supporting leg material particle 2m and the free leg material particle 2m are determined using the (current time) desired foot position/posture at the present time k. Besides, the vertical position of the body material particle 24m is determined using the (current time) floor reaction force's vertical position at the present time k, and the vertical acceleration of the body material particle 24m at the present time k is determined using time series values of the desired body vertical position determined before the present time k. Then, a formula obtained by substituting the determined values into the formula 03 and substituting 0 for My and d2θby/dt2 in the formula 03 is solved with respect to the body material particle's horizontal acceleration d2Xb/dt2, whereby the body material particle's horizontal acceleration d2Xt/dt2 is determined as the body horizontal acceleration αtmp. Note that it is also possible that, using a more strict dynamics model, the body horizontal acceleration αtmp, which reduces a horizontal component of a floor reaction moment about a desired ZMP to zero, is determined in a searching manner. Further, in this embodiment, since the reference body posture is the vertical posture and the body posture angular acceleration depending on the reference body posture is 0, the body horizontal acceleration αtmp is determined assuming that the angular acceleration in the body rotation mode is 0. However, in the case where the reference body posture trajectory parameters are set so that the reference body posture varies and the reference body posture angular acceleration at the present time k which depends on the reference body posture has a value other than 0, the body horizontal acceleration αtmp may be determined using the dynamics model by setting the angular acceleration for the body rotation mode to the value of the reference body posture angular acceleration other than 0 (for example, the body horizontal acceleration αtmp may be determined in the same manner as described above by setting d2θby/dt2 in the formula 03 to the value of the reference body posture angular acceleration other than 0).

Then, the process proceeds to step S506, where the floor reaction force's horizontal component Fxtmp at the time k in the case where the body horizontal acceleration is αtmp is determined using the dynamics model. In this embodiment, Fxtmp is determined using the formula 02 of the dynamics model. That is, Fxtmp is determined using the following formula 17. In this formula, d2Xsup/dt2 and d2Xswg/dt2 represent the supporting leg's foot material particle horizontal acceleration and the free leg's foot material particle horizontal acceleration at the time k, respectively.

$$Fxtmp = mb*\alpha tmp + msup*d2Xsup/dt2 + mswg*d2Xswg/dt2 \qquad \text{formula 17}$$

Figure 23:
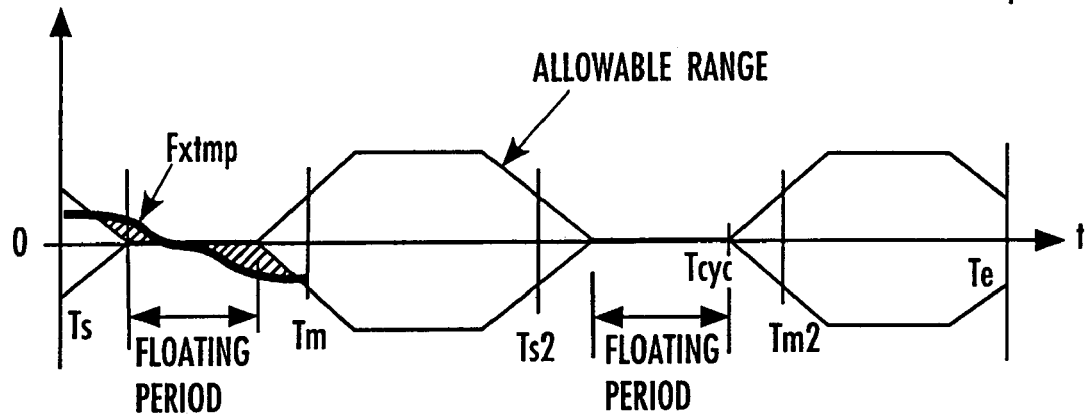
FIGS. 23 to 30 are graphs for illustrating essential process in the flowchart shown in FIG. 22.

An example of Fxtmp thus determined is shown in FIG. 23. In FIG. 23, the shaded areas indicate that Fxtmp exceeds the floor reaction force's horizontal component allowable range [Fxmin, Fxmax].

Then, the process proceeds to step S508, where the body horizontal acceleration α for the body translation mode, the floor reaction force's horizontal component Fx caused by the body horizontal acceleration, and the body angular acceleration β for the body rotation mode are determined in the following matter (S508 to S516).

That is,

If Fxtmp>Fxmax, the process proceeds to step S510, where Fx is determined by the following formula.

$$Fx = Fxmax \qquad \text{formula 18}$$

If Fxtmp<Fxmin, the process proceeds to step S512, where Fx is determined by the following formula.

$$Fx = Fxmin \qquad \text{formula 19}$$

Otherwise, that is, if Fxtmp lies within the floor reaction force's horizontal component allowable range [Fxmin, Fxmax], the process proceeds to step S514, where Fx is determined by the following formula.

$$Fx = Fxtmp \qquad \text{formula 20}$$

In any of the cases, the process then proceeds to step S516, where the body horizontal acceleration α and the body posture angular acceleration β are determined by the following formulas.

$$\alpha = \alpha tmp + (Fx - Fxtmp)/\Delta Fp \qquad \text{formula 21}$$

$$\beta = (\alpha tmp - \alpha)*\Delta Mp/\Delta Mr \qquad \text{formula 22}$$

However, ΔFp, ΔMp and ΔMr are determined by the formulas 06, 07 and 09, respectively.

For a higher precision of the dynamical calculation, after the body angular acceleration β is determined as described above, the body horizontal acceleration α for the body translation mode is preferably determined in an analytic or searching manner using a more precise dynamics model so that a composite movement of the body translation mode and the body rotation mode having the body angular acceleration β satisfies the desired ZMP. As the determination method in a searching manner, the simplex method or a method of determining an affine Jacobian (sensitivity matrix) and determining a next candidate by the pseudo Newton method may be used.

Furthermore, in order to entirely prevent the floor reaction force's horizontal component Fx from exceeding the floor reaction force's horizontal component allowable range [Fxmin, Fxmax], a set of the body horizontal acceleration a and the body angular acceleration β may be determined in a searching manner in such a manner that Fx=Fxmax and the horizontal component of the floor reaction force moment about the desired ZMP is 0 in step S510 or Fx=Fxmin and the horizontal component of the floor reaction force moment about the desired ZMP is 0 in step S512.

Figure 24:
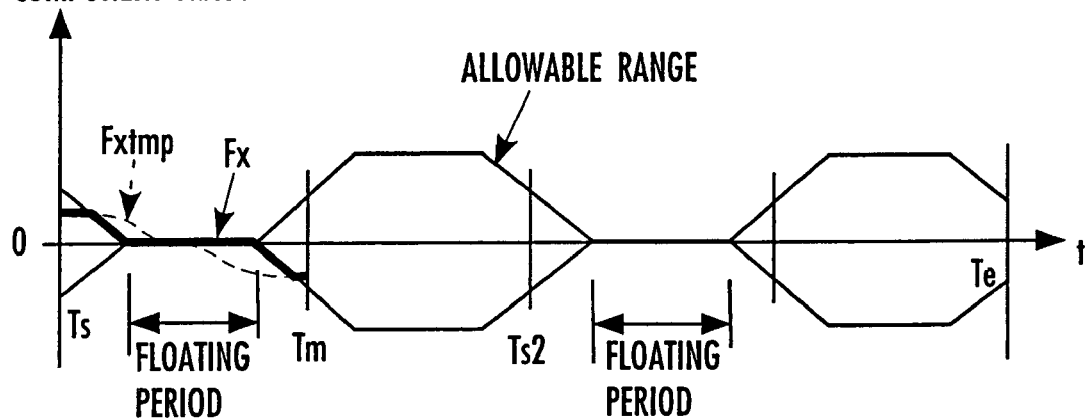

Fx thus determined is shown in FIG. 24. This Fx is Fxtmp that is limited (saturated) not to exceed the floor reaction force's horizontal component allowable range [Fxmin, Fxmax]. More specifically, if Fxtmp associated with the body horizontal acceleration αtmp of the body translation mode falls within the allowable range [Fxmin, Fxmax], Fxtmp is adopted as Fx as it is. On the other hand, if Fxtmp associated with the body horizontal acceleration αtmp of the body translation mode is larger than the upper limit of the allowable range [Fxmin, Fxmax] or is smaller than the lower limit thereof, Fx is forcedly limited to Fxmax or Fxmin, respectively. In particular, during the floating period in the running gait, since Fxmax and Fxmin are always 0 (Fxmax=Fxmin=0), Fx is also 0 (Fx=0).

Figure 25:
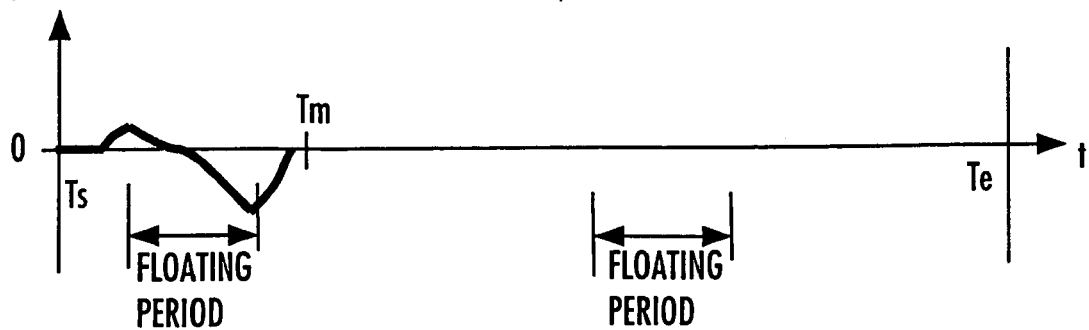

In addition, the body posture angular acceleration β thus determined is also shown in FIG. 25. An insufficient floor reaction force moment due to limitation of the acceleration for the body translation mode intended for preventing Fx caused in the body translation mode from exceeding the allowable range [Fxmin, Fxmax] is compensated for by the body rotation mode (specifically, the insufficient floor reaction force moment is the inertial force moment required for providing a horizontal component of the floor reaction force moment about the desired ZMP of 0 minus a moment component due to the limited body horizontal movement and the movements of the legs 2, 2). During the floating period of the running gait, the body horizontal acceleration α of the body translation mode is always limited to 0, and therefore, the insufficient floor reaction force moment described above is compensated for only by the body posture angular acceleration β of the body rotation mode.

Described above is the processings performed in the case where the time k lies between the time Ts and the time Tm or between the time Ts2 and the time Tm2.

If the result of the determination in step S502 is NO, the following processings are performed. First, the process proceeds to step S518, where there is set a pattern of a ZMP-converted value of the floor reaction force moment which produces a body posture angular acceleration for returning the body posture angular velocity to the initial value (which is the value at the time Ts if the present time k is ahead of the time Ts2, or otherwise, the value at the time Ts2) by the time Ts2 if the present time k is ahead of the time Ts2, or otherwise, by the time Te (the ZMP-converted value of the floor reaction force moment is referred to as a body posture restoring moment ZMP-converted value and abbreviated as ZMPrec, hereinafter).

This will be described in detail below. The processings performed if the present time k is subsequent to the time Tm2 are the same as those performed if the present time k is ahead of the time Ts2, and therefore, only the processings performed if the present time k is ahead of the time Ts2 will be described.

It is to be considered to return the body posture angular velocity to the initial value (value at the time Ts) by producing the body posture angular acceleration using the body rotation mode in a period from the time Tm to the time Ts2. A body posture angular acceleration pattern for this is denoted by β(k).

In the body rotation mode, when trying to produce the body posture angular acceleration β(k), a floor reaction force moment β(k)*ΔMr is produced. As a result, assuming that the floor reaction force's vertical component at that instant is Fz(k), the ZMP(k) calculated from the movement (rather than the desired ZMP) is shifted by ΔZMP determined by the following formula.

$$\Delta ZMP(k) = -\beta(k) * \Delta Mr / Fz(k) \qquad \text{formula 23}$$

Therefore, if the patterns of ΔMr and Fz(k) are determined (known), the body posture angular acceleration pattern that satisfies the formula 23 can be produced by appropriately setting the pattern of ΔZMP(k), and thus, the body posture angular velocity can be returned to the initial value (value at the time Ts), that is, to the body posture angular velocity in the initial state of the reference body posture trajectory (at the time Ts).

The "body posture restoring moment ZMP-converted value (ZMPrec)" means ΔZMP(k) that is appropriately set in this way. Strictly speaking, when the body posture restoring moment ZMP-converted value is set using the formula 23, ΔMr varies. However, it may be set to an approximate constant value. The reason for this is that the normal gait doesn't require a quite high dynamical precision because the normal gait generated is a provisional one and the actual robot doesn't follow the gait.

Figure 26:
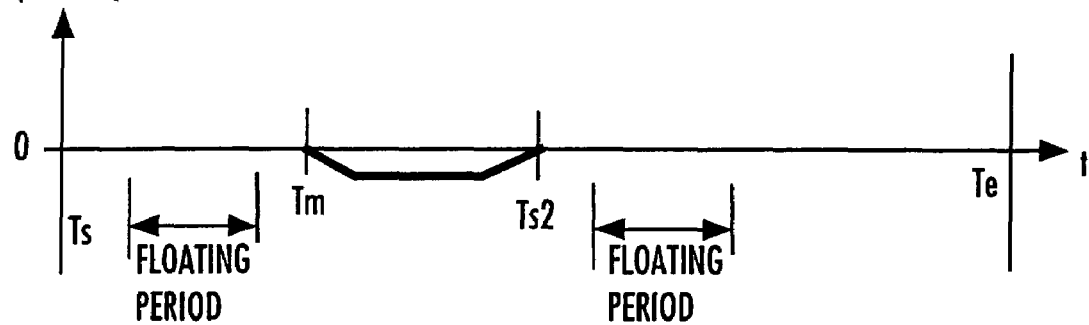

FIG. 26 shows an example of ZMPrec. In FIG. 26, ZMPrec has a trapezoidal pattern. The times of the apexes of the trapezoidal pattern agree with the times of the apexes of the desired ZMP pattern in the period from the time Tm to the time Ts2 (see FIG. 18). This is intended for simplifying modification of the desired ZMP pattern of the current time gait, as described later. If ZMPrec is substituted for ΔZMP(k) in the formula 23, the following formula results.

$$\beta(k) = -ZMPrec * Fz(k) / \Delta Mr \qquad \text{formula 24}$$

Figure 27:
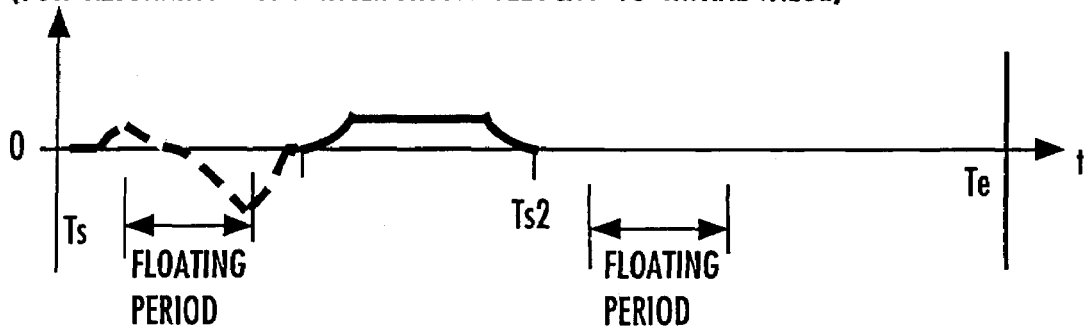

Therefore, β(k) determined by the formula 24 is as shown by the solid line in FIG. 27. The dotted line in FIG. 27 shows the body posture angular velocity from the time Ts to the time Tm (shown by the solid line in FIG. 25).

For the normal gait, the body posture angular velocity at the time Ts2 preferably agrees with the body posture angular velocity at the time Ts. This is because such agreement provides reduced variation of the body posture angle.

Thus, in order to make the body posture angular velocity at the time Ts2 agree with the body posture angular velocity at the time Ts, the body posture angular acceleration pattern is set in such a manner that the integral of the body posture angular acceleration β for the period from the time Ts to the time Ts2 is 0. That is, the body posture angular acceleration pattern is set in such a manner that the integral of β(k) for the period from the time Tm to the time Ts2 (i.e., integral for the solid line section in FIG. 27) equals to the integral of the body posture angular acceleration for the period from the time Ts to the time Tm (determined in steps S504 to S516 shown in FIG. 22) (i.e., integral for the dotted line section in FIG. 27, in other words, the difference between the body posture angular velocity at the time Tm and the body posture angular velocity at the time Ts) multiplied by −1.

More specifically, in this embodiment, in the trapezoidal pattern of ZMPrec shown in FIG. 26, by assuming that the times of the apexes of the trapezoid (determined based on the desired ZMP trajectory for the normal gait as described above) are known, and the height of the trapezoid is unknown, the height of the trapezoid of ZMPrec that satisfies the above-described relationship (parameter that defines the ZMPrec pattern) can be determined.

The height of the trapezoid of ZMPrec for the first turning gait is referred to as a first turning gait's body posture restoring moment's ZMP-converted value's trapezoid height acyc1. The height of the trapezoid of ZMPrec for the second turning gait is referred to as a second turning gait's body posture restoring moment's ZMP-converted value's trapezoid height acyc2. ZMPrec for the second turning gait is a trapezoidal pattern set in the period from the time Tm2 to the time Te.

Furthermore, as far as the gait parameters are not changed in the process of generation of one step of the current time gait, the ZMPrec patterns for the period between the time Tm and the time Ts2 and the period between the time Tm2 and the time Te determined in step S518 are the same (i.e., the same parameter values are calculated), and therefore, the processing of step S518 may be performed only at the times Tm and Tm2.

Then, the process proceeds to step S520, where the instantaneous value (current time value) of the body posture restoring moment's ZMP-converted value ZMPrec at the time k is calculated based on the parameter (trapezoid height) determined as described above.

Then, the process proceeds to step S522, where the instantaneous value (current time value) $\beta$ of the body posture angular acceleration pattern at the time k is calculated using the formula 24.

Then, the process proceeds to step S524, where the body horizontal acceleration αtmp required for satisfying the current time (time k) desired ZMP in the case where the robot moves only in the body translation mode without the movement in the body rotation mode from the last time instantaneous desired gait state (desired gait state at the time k−1) is determined using the dynamics model of the robot 1. This calculation is performed in the same manner as in step S504.

Then, the process proceeds to step S526, where the body horizontal acceleration a for the body translation mode is calculated using the following formula.

$$\alpha = \alpha tmp - (\Delta Mr/\Delta Mp)*\beta \qquad \text{formula 25}$$

Then, the process proceeds to step S528, where the floor reaction force's horizontal component Fx at the time k for the body horizontal acceleration of α is determined using the following formula 26 similar to the formula 17.

$$Fx = mb*\alpha + msup*d2Xsup/dt2 + mswg*d2Xswg/dt2 \qquad \text{formula 26}$$

Incidentally, for a higher precision of the dynamical calculation, after the body angular acceleration β is determined as described above, instead of calculating the body horizontal acceleration α using the formula 25 in step S526, the body horizontal acceleration α for the body translation mode is preferably determined in an analytic or searching manner using a more precise dynamics model so that a composite movement of the body translation mode and the body rotation mode having the body angular acceleration β satisfies the desired ZMP, as supplementaly described concerning step S516.

Described above is the processings performed in the case where the time k is not included in any of the periods between the time Ts and the time Tm and between the time Ts2 and the time Tm2.

Figure 28:
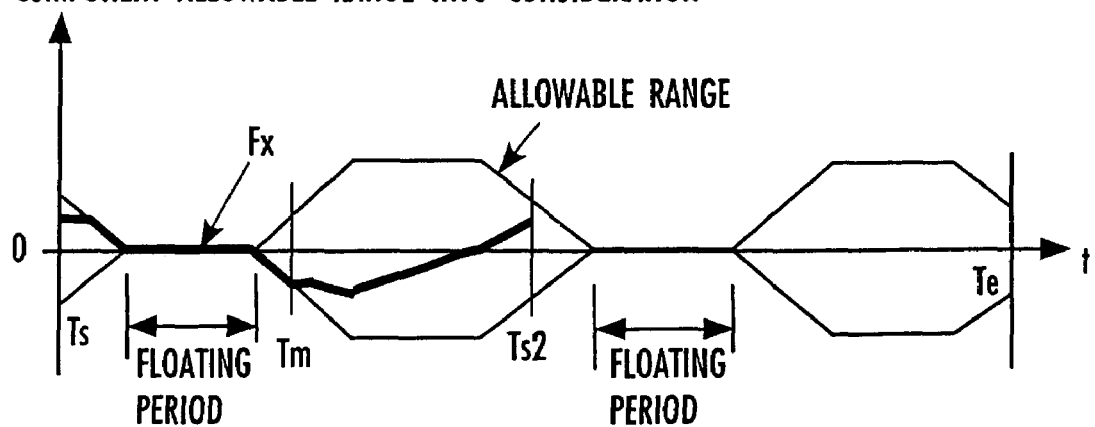
Figure 29:
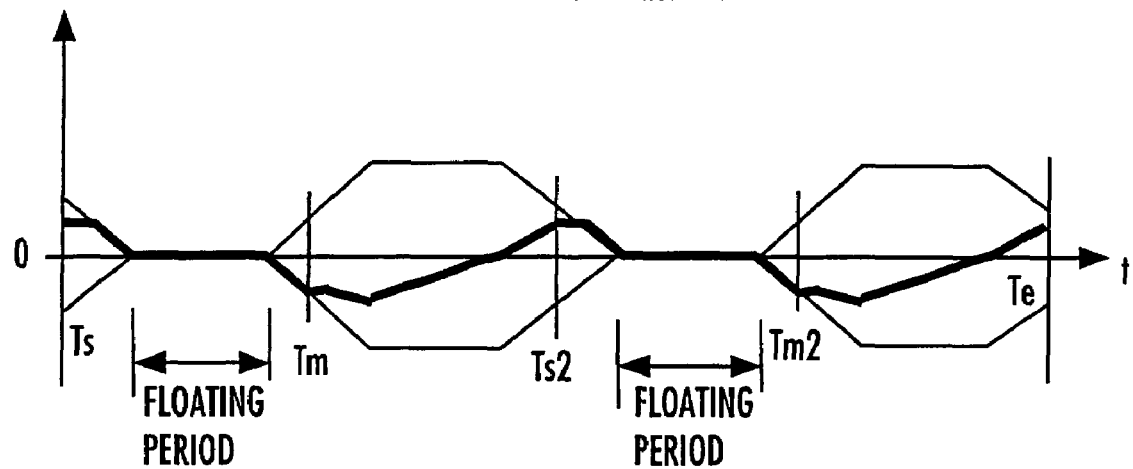
Figure 30:
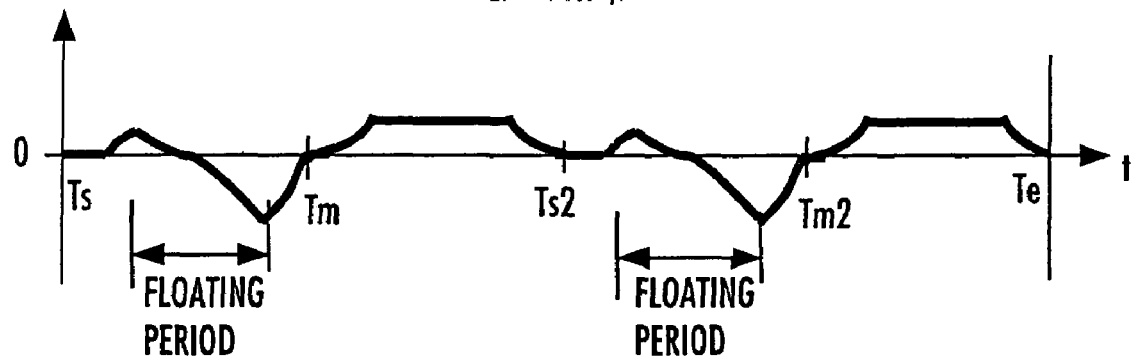
Figure 31:
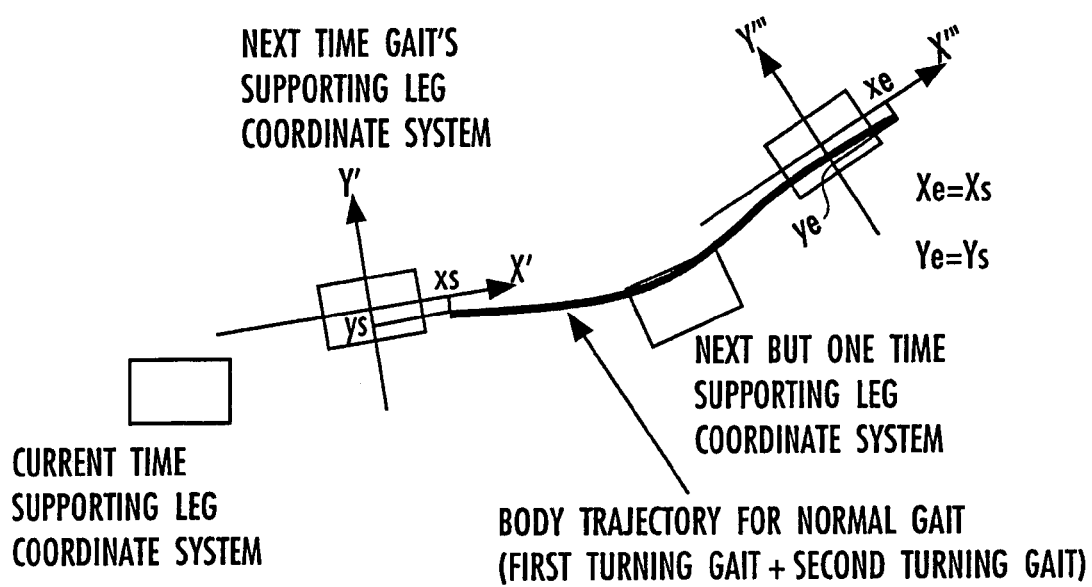
FIG. 31 is a diagram showing an example of a trajectory of the body position for the normal gait.

The floor reaction force's horizontal component Fx provided when the above-described processings to the time Ts2 are completed is shown in FIG. 28. In addition, the floor reaction force's horizontal component Fx and the body posture angular acceleration β provided when the above-described processings to the time Te are completed are shown in FIGS. 29 and 30, respectively. The processing of step S412 described above (subroutine for determining the body horizontal acceleration and the body posture angular acceleration) is to determine the instantaneous values of the body horizontal acceleration and the body posture angular acceleration at the time k, rather than to collectively generate the time series values thereof to the time Te.

In this embodiment, since the reference body posture is the vertical posture, and the body posture angular acceleration depending on the reference body posture is 0, the angular acceleration β for the body rotation mode determined as described above is regarded as the body posture angular acceleration determined in the processing of step S412. However, if the reference body posture trajectory parameters are set in such a manner that the reference body posture varies, the sum of the angular acceleration β for the body rotation mode determined as described above and the reference body posture angular acceleration should be regarded as the body posture angular acceleration determined in the processing of step S412.

The times Ts, Tm, Ts2 and Tm2 are set as described above to prevent the floor reaction force's horizontal component Fx from exceeding the allowable range [Fxmin, Fxmax] even if the body posture angular acceleration β is produced so as to return the body posture angular velocity to the initial angular velocity of the reference body posture trajectory in the periods between the time Tm to the time Ts2 and between the time Tm2 and the time Te. In other words, during the periods from the time Tm to the time Ts2 and from the time Tm2 to the time Te, the floor reaction force's horizontal component allowable range is sufficiently wide, and therefore, even if the body posture angular acceleration β is produced to return the body posture angular velocity to the initial value while satisfying the desired ZMP, the floor reaction force's horizontal component Fx doesn't exceed the allowable range.

Alternatively, rather than making the body posture angular velocity at the time Ts agree with the body posture angular velocity at the time Ts, assuming that acyc1 and acyc2 have an equal value (assuming that acyc1=acyc2), the value of acyc1 and acyc2 may be determined so as to make the body posture angular velocity at the time Te agree with the body posture angular velocity at the time Ts.

Then, the process proceeds to step S414 in FIG. 21, where the body horizontal velocity is determined by integrating the body horizontal acceleration determined in step S412 (cumulatively summing the body horizontal acceleration values from the time Ts to the present time k), and the body horizontal position (current time value) is determined by integrating the body horizontal velocity (cumulatively summing the body horizontal velocity values from the time Ts to the present time k). In addition, the body posture angular velocity is determined by integrating the body posture angular acceleration determined in step S412 (cumulatively summing the body posture angular acceleration values from the time Ts to the present time k), and the body posture angle (current time value) is determined by integrating the body posture angular velocity (cumulatively summing the body posture angular velocity values from the time Ts to the present time k).

After the normal gait's instantaneous value determination subroutine of step S306 in FIG. 20 is conducted as described above, the process proceeds to step S308, where the value of the gait generation time k is incremented by the gait generation interval Δk. Then, the process returns to step S304, and as far as the condition shown in step S304 is satisfied, the processings of steps S306 and S608 are repeated. If the condition shown in step S304 is not satisfied, that is, if the generation of the provisional normal gait to the end thereof (to the time Te=Ts+Tcyc) is completed, the process proceeds to step S310. In step S310, the initial (time Ts) body posture angle and the initial (time Ts) body posture angular velocity are modified in accordance with the following formulas based on the final (time Te) body posture angle of the provisional gait determined as described above or the like. This modification is intended for satisfying the boundary requirements of the normal gait concerning the body posture angle and the angular velocity thereof (that is, both the body posture angle and the angular velocity thereof are the same at the start and the end of the normal gait). In this description, it is assumed that the gait of the robot 1 is one with which the robot 1 moves straight.

In this case, renewed values in the following formulas are the modified values.

renewed initial body posture angular velocity = initial body posture angular velocity for the provisional gait − (final body posture angle for the provisional gait − initial body posture angle for the provisional gait)/Tcyc   formula 30 renewed initial body posture angle=initial (time Ts) reference body posture angle   formula 31

Now, a reason why the initial state posture angular velocity is modified using the formula 30 will be described below. For the normal gait, the initial state posture angle and the angular velocity thereof have to be determined to avoid the movement of the robot 1 from being discontinuous at the boundaries between the gaits when the gait is repeated (to satisfy the boundary requirements). In this case, the final body posture angular velocity for the provisional normal gait thus determined agrees with the initial body posture angular velocity's initial value (reference body posture angular velocity's initial value) since the body posture angular acceleration pattern associated with the body posture restoring moment ZMP-converted value ZMPrec is set. Therefore, if the following formula, which is the remaining requirement, is satisfied, the above-described requirements concerning the body posture angle and the angular velocity thereof are satisfied.

final body posture angle=initial body posture angle   formula 32

In addition, there is a relationship expressed by the following formula.

second order differential of the body posture angle=body posture angular acceleration   formula 33

Therefore, second-order integrating the both sides of the formula 33 for the period from the start to the end of the normal gait provides the following relationship.

final body posture angle = initial body posture angle + initial body posture angular velocity ∗ Tcyc + second order integral of the body posture angular acceleration   formula 34

On the other hand, in normal gait generation, the horizontal acceleration (horizontal acceleration/deceleration) of the body 24 is adjusted using primarily the body translation mode for satisfying the desired ZMP as described above. However, if the horizontal acceleration of the body 24 that satisfies the desired ZMP cannot produced adequately (if a sufficient friction force cannot be produced), the insufficient body horizontal acceleration for the body translation mode is compensated for by adjusting the angular acceleration of the body posture angle while keeping constant the total center-of-gravity acceleration using the body rotation mode.

The adjustment of the body posture angular acceleration using the body rotational movement mode is approximately equivalent to adjustment of the angular acceleration of the flywheel FH of the robot 1 shown in FIG. 10. If the rotational velocity of the flywheel FH is close to 0, no gyro effect occurs, and the force caused by the flywheel FH is determined only by the angular acceleration of the flywheel FH. Therefore, in the robot 1 having the flywheel FH in the body 24, even if the initial angle and the initial angular velocity of the flywheel FH vary slightly, substantially constant force is produced as far as the flywheel FH moves with an angular acceleration of a same pattern. Therefore, in the formulas 01, 02 and 03, which are robot dynamics equations, the gyro effect is neglected. Therefore, for the robot 1 according to this embodiment, according to any of the formulas 01, 02 and 03 and a more general and precise dynamics model, even when the initial body posture angle and the initial angular velocity vary slightly, substantially the same resultant force of the inertial force and the gravity is produced as far as the body posture angle is changed with an angular acceleration of a same pattern while maintaining a constant total center-of-gravity acceleration (that is, as far as the body posture angle is changed with an angular acceleration of a same pattern in the body rotational movement mode). In other words, even if the initial body posture angle and the initial angular velocity vary slightly, the body posture angular acceleration for the gait generated according to the flowchart described above is not changed.

That is, the second order integral of the body posture angular acceleration in the formula 34 is independent of the initial body posture angle and the initial angular velocity. That is, the second order integral of the body posture angular acceleration in the formula 34 can be treated as a constant value regardless of the values of the initial body posture angle and the initial angular velocity.

Since the final body posture angle is the final body posture angle for the provisional gait when the value of the initial body posture angle is the initial body posture angle for the provisional gait, and the value of the initial body posture angular velocity is the initial body posture angular velocity for the provisional gait, applying this relationship to the formula 34 results in the following formula.

final body posture angle for the provisional gait = initial body posture angle for the provisional gait + second order integral of the body posture angular acceleration + initial body posture angular velocity for the provisional gait ∗ Tcyc   formula 35

Thus, the following formula results.

second order integral of the body posture angular acceleration = (final body posture angle for the provisional gait − initial body posture angle for the provisional gait) − initial body posture angular velocity for the provisional gait ∗ Tcyc   formula 36

Since, from the above discussion, it is seen that the second order integral of the body posture angular acceleration can be treated as a constant (the second order integral of the body posture angular acceleration is independent of the initial body posture angle and the initial angular velocity), substituting the above formula into the formula 34 results in the following formula.

final body posture angle = initial body posture angle + (final body posture angle for the provisional gait − initial body posture angle for the provisional gait) − − initial body posture angular velocity for the provisional gait ∗ Tcyc + initial body posture angular velocity ∗ Tcyc      formula 37

From the formulas 37 and 32, the above-described formula 30 is provided.

In this embodiment, the initial body posture angle the initial body posture angle agrees with the initial value of the reference body posture angle as expressed by the formula 31. However, the initial body posture angle may be set so that the average value of the body posture angles for the normal gait agrees with the initial value of the reference body posture angle. Alternatively, the initial body posture angle may be set so that the average value of the maximum and the minimum of the body posture angle for the normal gait agrees with the initial value of the reference body angle.

Furthermore, while a case where the robot 1 moves only straight is described above, when determining a normal gait including a turning movement, the robot 1 travels in different directions at the start and the end of the normal gait. Therefore, the initial body posture angular velocity depends on the initial body posture angle. Therefore, the initial body posture angle and the initial angular velocity have to be determined considering this fact. In this case, for example, the initial body posture angle and the initial body posture angular velocity may be updated so that the following formulas 37a and 37b are satisfied.

final body posture angle − initial body posture angle = second order integral of the body posture angular acceleration determined so as to satisfy the floor reaction force's horizontal component allowable range + second order integral of the body posture angular acceleration caused by ZMPrec + initial body posture angular velocity ∗ period of the normal gait      formula 37a final body posture angular velocity − initial body posture angular velocity = first order integral of the body posture angular acceleration determined so as to satisfy the floor reaction force's horizontal component allowable range + first order integral of the body posture angular acceleration caused by ZMPrec      formula 37b For the formulas 37a and 37b, the integral time for the first term in the right side thereof is a sum of the period from the time Ts to the time Tm and the period from the time Ts2 to the time Tm2, and the integral time for the second term in the right side thereof is a sum of the period from the time Tm to the time Ts2 and the period from the time Tm2 to the time Te.

Figure 22:
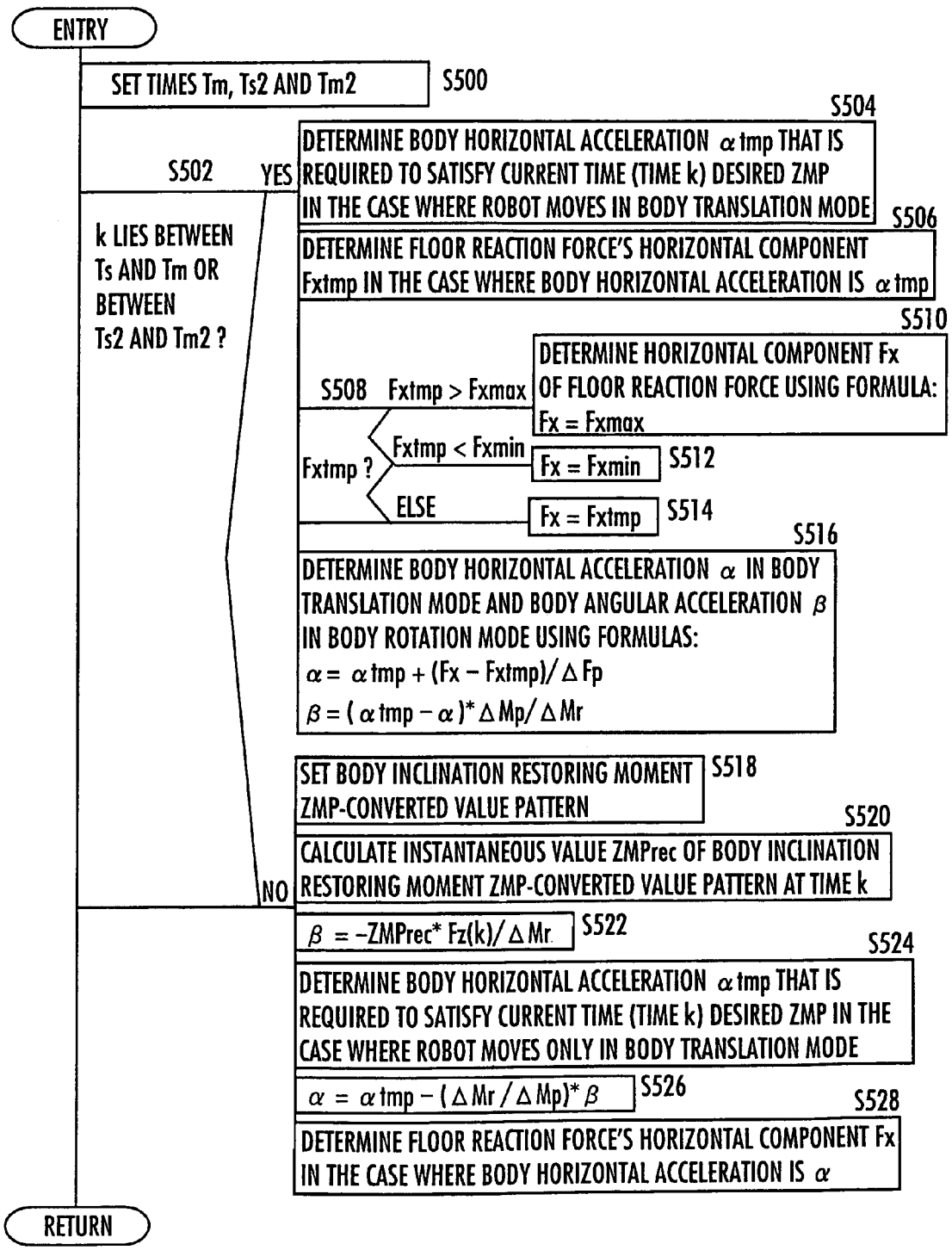
FIG. 22 is a flowchart showing subroutine process in the flowchart shown in FIG. 21.

More specifically, in the normal gait, the initial state posture angle and the initial state angular velocity seen from the first turning gait's supporting leg coordinate system (next time gait's supporting leg coordinate system) have to agree with the final body posture angle and the final angular velocity seen from the next first turning gait's supporting leg coordinate system (next but two gait's supporting leg coordinate system), respectively. Thus, in this embodiment, the renewed initial body posture angle is determined by the formula 31, and the renewed initial body posture angle and a value seen from the next turning gait's supporting leg coordinate system derived from the renewed initial body posture angle by coordinate transformation thereof using a matrix corresponding to the total turning angle of the robot 1 in the normal gait (turning angle about the vertical axis) (rotating coordinate transformation matrix) are substituted for the initial body posture angle and the final body posture angle in the left side of the formula 37a, respectively. Besides, as the body posture angular acceleration concerning the integration in the first term of the right side of each of the formulas 37a and 37b, the one determined successively in step S516 in FIG. 22 is used.

Then, assuming that the initial body posture angular velocity in the formulas 37a and 37b and the trapezoid height of ZMPrec (the trapezoidal pattern shown in FIG. 26) concerning the integration in the second term of the right side of the formulas 37a and 37b are unknown quantities (where the times of the apexes of the ZMPrec trapezoidal pattern are previously determined, and the trapezoid height acyc1 of ZMPrec for the first turning gait equals to the trapezoid height acyc2 of ZMPrec for the second turning gait), the simultaneous equations 37a and 37b including these unknown quantities are solved to determine the initial body posture angular velocity as the renewed initial body posture angular velocity. In this case, the final body posture angular velocity in the formula 37b is a value seen from the next time gait's supporting leg coordinate system derived from the unknown initial body posture angular velocity by coordinate transformation using the matrix corresponding to the total turning angle in the normal gait.

In the case where the robot 1 makes a movement including turning, the renewed initial body posture angle and the renewed initial angular velocity may be determined as described above.

The initial body posture angular velocity that satisfies the boundary requirements of the normal gait may be determined in a searching manner.

After the processing of step S310 in FIG. 20 is completed, the process proceeds to step S210 in FIG. 19, where the final body horizontal position/velocity for the gait generated (provisional normal gait) are converted into values seen from a supporting leg coordinate system associated with the supporting leg at that instant (that is, X''', Y''', Z''' coordinate system in FIG. 31), and the values are denoted by (Xe, Vxe) where Xe denotes a final body horizontal position and Vxe denotes a final body horizontal velocity.

Then, the process proceeds to step S212, where the difference between the initial body horizontal position/velocity (Xs, Vxs) and the final body horizontal position/velocity (Xe, Vxe) is calculated as shown in the drawing. The difference (Xs−Xe, Vxs−Vxe) is referred to as a body horizontal position/velocity boundary requirement error (errx, errvx). Since the boundary requirements have to be satisfied in the normal gait, (xs, Vxs) has to agree with (Xe, Vxe). Therefore, the body horizontal position/velocity boundary requirement error (errx, errvx) has to be 0 or approximately 0. In this embodiment, (Xs, Vxs) that provides a body horizontal position/velocity boundary requirement error (errx, errvx) of approximately 0 is determined in a searching manner as described below.

Then, the process proceeds to step S214, where it is determined whether the calculated body horizontal position/velocity boundary requirement error (errx, errvx) falls within an allowable range previously appropriately set. Instead of setting the allowable range for the body horizontal position/velocity boundary requirement error as described above, it may be determined whether the difference between the initial divergence component (Xs+Vxs/ω0) and the final divergence component (Xe+Vxe/ω0) and the difference between the initial convergence component (Xs−Vxs/ω0) and the final convergence component (Xe−Vxe/ω0) fall within respective allowable ranges. As described earlier, ω0 is a predetermined value.

If the result of the determination in step S214 is NO, the process proceeds to step S216. In step S216, a plurality of (two, in this embodiment) initial value candidates (Xs+ΔXs, Vxs), (Xs, Vxs+ΔVxs) are determined in the vicinity of (Xs, Vxs) Here, ΔXs and ΔVxs mean a predetermined small variations of Xs and Vxs, respectively. Assuming that each of these initial value candidates is an initial state of the body horizontal position/velocity, a normal gait is generated using gait parameters in the same manner as in the processing of step S208. Furthermore, values (Xe+ΔXe1, Vxe+ΔVxe1) and (Xe+ΔXe2, Vxe+ΔVxe2) seen from the supporting leg coordinate system (X''', Y''', z''' coordinate system in FIG. 31) associated with the supporting leg at that instant converted from the final body position/velocity of the generated normal gait are determined. Here, (Xe+ΔXe1, Vxe+ΔVxe1) indicates the final body position/velocity corresponding to (Xs+ΔXs, Vxs), and (Xe+ΔXe2, Vxe+ΔVxe2) indicates the final body position/velocity corresponding to (Xs, Vxs+ΔVxs). In this processing of normal gait (provisional gait) generation, the initial states (states at the time Ts) of the variables other than the body horizontal position/velocity may be set the same as in the case where the initial value candidate of the body horizontal position/velocity is (Xs, Vxs), for example. In step S216, in addition, the difference between each initial value candidate and the final body position/velocity corresponding thereto, that is, the body horizontal position/velocity boundary requirement error for each of the initial value candidates (Xs+ΔXs, Vxs) and (Xs, Vxs+ΔVxs) is determined in the same processing as that of step S210.

Then, the process proceeds to step S218, where based on the body horizontal position/velocity boundary requirement error for each of (Xs, Vxs) and the initial value candidates in the vicinity thereof (Xs+ΔXs, Vxs) and (Xs, Vxs+ΔVxs), an initial value candidate following (Xs, Vxs) is determined by a searching method (for example, the simplex method or a method of determining an affine Jacobian (sensitivity matrix) and determining a next candidate by the steepest descent method). That is, from the body horizontal position/velocity boundary requirement error for each of (Xs, Vxs) and the initial value candidates in the vicinity thereof (Xs+ΔXs, Vxs) and (Xs, Vxs+ΔVxs), a sensitivity matrix that indicates the degree of change of the body horizontal position/velocity boundary requirement error caused when the body horizontal position and the body horizontal velocity are each slightly changed from the initial value candidates Xs and Vxs, respectively, and based on the sensitivity matrix, an initial value candidate (Xs, Vxs) that provides further reduced body horizontal position/velocity boundary requirement error is newly determined. Then, once the new initial value candidate (Xs, Vxs) for the body horizontal position/velocity is determined, the process returns to step S206.

As far as the result of the determination in step S214 is NO, the processings described above (steps S206 to S218) are repeated. In this case, in step S300 (see FIG. 20) in the process of normal gait generation (step S208) for the new initial value candidate (Xs, Vxs) of the body horizontal position/velocity, the initial value of the body posture angular velocity is set to the value determined in step S310 (see FIG. 20) in the processing of step S208 for the last-time's initial value candidate (Xs, Vxs) of the body horizontal position/velocity, rather than the initial value of the reference body posture angular velocity. Then, if the result of the determination in step S214 is YES, the repetition loop (step S204) is exited, and the process proceeds to step S220. The provisional normal gait generated immediately before exiting the repetition loop of step S204 is adopted as the normal gait that satisfies the boundary requirements.

In step S220, the initial body horizontal position/velocity (X0, V0) at the original initial time 0 (end time of the current time gait), the initial body vertical position/velocity (Z0, Vz0) at the initial time 0, and the initial body posture angle and the initial angular velocity at the initial time 0 are determined.

Specifically, (X0, V0) and (Z0, Vz0) are set to values seen from the supporting leg coordinate system (X''', Y''', Z''' coordinate system in FIG. 31) for the supporting leg for a step starting at the time Tcyc (that is, the second-time first turning gait) which are converted from the body horizontal position/velocity and the body vertical position/velocity determined at the instant when switching from the second turning gait to the second turning gait occurs in steps S408 and S414 in the normal gait instantaneous value determination subroutine shown in FIG. 21, that is, at the time k=Tcyc (time Te−Ts). Similarly, the initial state posture angle and the initial state angular velocity are set to values seen from the supporting leg coordinate system (X''', Y''', Z''' coordinate system in FIG. 31) for the supporting leg for a step starting at the time Tcyc (that is, the second-time first turning gait) which are converted from the body posture angle and the angular velocity determined at the time k=Tcyc (time Te−Ts).

Then, the process proceeds to step S222, where the normal gait's initial divergence component q[0] is determined by the following formula.

$$q[0] = X0 + V0/\omega 0 \qquad \text{formula 40}$$

As described in the explanation about divergence, ω0 is a predetermined value.

Then, the process proceeds to step S224, where the normal gait's initial divergence component q[0] is converted into a value seen from the current time gait's supporting leg coordinate system, and the resulting value is determined as q"[0]. The initial body vertical position/velocity (Z0, Vz0) is converted into a value seen from the current time gait's supporting leg coordinate system, and the resulting value is determined as (Z0", Vz0").

Specifically, (Z0", Vz0") agrees with the body vertical position/velocity at the end of the second turning gait seen from the second turning gait's supporting leg coordinate system (X", Y", Z" coordinate system in FIG. 15). Besides, q"[0] also agrees with the final divergence component of the second turning gait seen from the second turning gait's supporting leg coordinate system (X", Y", Z" coordinate system in FIG. 15). Therefore, (Z0", Vz0") and q"[0] maybe calculated using these characteristics.

Then, the processing of step S024 in FIG. 12, that is, the subroutine processing for determining the initial states of the normal gait, is completed.

Then, the process proceeds to step S026 in FIG. 12, where the gait parameters for the current time gait are determined (some of them are provisionally determined). In step S026, a process described below is conducted in accordance with the flowchart shown in FIG. 32.

First, in step S600, the foot trajectory parameters for the current time gait are set in such a manner that the foot position/posture trajectory for the current time gait connects to the foot position/posture trajectory for the normal gait.

Specifically, the current time gait's free leg's foot position/posture (initial value of the current time gait's free leg's foot position/posture) is set to the current free leg position/posture seen from the current time gait's supporting leg coordinate system (free leg position/posture at the end of the last time gait). The supporting leg's foot position/posture at the start of the current time gait (initial value of the current time gait's supporting leg's foot position/posture) is set to the current supporting leg's foot position/posture seen from the current time gait's supporting leg coordinate system (supporting leg's foot position/posture at the end of the last time gait). In addition, the free leg's foot position/posture at the end of the current time gait is determined in accordance with the next time gait's supporting leg coordinate system seen from the current time gait's supporting leg coordinate system (that, is, in accordance with the required value of the free leg landing position/posture for the first step of the current time gait). That is, the free leg's foot position/posture at the end of the current time gait is determined in such a manner that, when the free leg's foot 22 is rotated from the free leg's foot position/posture at the end of the current time gait until substantially the whole surface of the sole of the foot 22 comes into contact with the floor while keeping the foot in contact with the floor without slipping, the representative point of the foot 22 agrees with the origin of the next time gait's supporting leg coordinate system seen from the current time gait's supporting leg coordinate system.

At the end of the current time gait, the supporting leg's foot 22 is away from the floor and floats in the air. To determine the trajectory after the supporting leg's foot 22 takes off the floor, the expected landing position/posture of the supporting leg's foot is set. The expected landing position/posture of the supporting leg's foot is set in accordance with the next but one time gait's supporting leg coordinate system seen from the current time gait's supporting leg coordinate system (that is, in accordance with the required value of the free leg's foot position/posture for the second step of the current time gait). More specifically, the expected landing position/posture of the supporting leg's foot is set in such a manner that, when the foot 22 is rotated from the position/posture until substantially the whole surface of the sole of the foot 22 comes into contact with the floor while keeping the foot 22 in contact with the floor without slipping, the representative point of the foot 22 agrees with the origin of the next but one time gait's supporting leg coordinate system seen from the current time gait's supporting leg coordinate system.

The supporting leg's foot position/posture at the end of the current time gait is determined using the finite duration settling filter to generate, until the end of the current time gait, the foot position/posture trajectory that leads from the current supporting leg position/posture (supporting leg's foot position/posture at the start of the current time gait) to the expected foot landing position/posture associated with the next time gait's supporting leg coordinate system (required value of the free leg's foot landing position/posture for the second step of the required parameters).

Then, the process proceeds to step S602, where the reference body posture trajectory parameters for the current time gait are determined in the same manner as the first and second turning gaits of the normal gait. However, the parameters are set in such a manner that the reference body posture trajectory for the current time gait is seamlessly connected to the reference body posture trajectory for the normal gait (that is, the reference body posture angle and the angular velocity at the end of the current time gait agree with the reference body posture angle and the angular velocity at the start of the normal gait, respectively). In this embodiment, both for the current time gait and the normal gait, the reference body posture is constantly the vertical posture.

Then, the process proceeds to step S604, where the arm posture trajectory parameters for the current time gait are determined in the same manner as the first and second turning gaits of the normal gait. The parameters are set in such a manner that the arm posture trajectory for the current time gait is continuously connected to the arm posture trajectory for the normal gait. The arm posture trajectory parameters determined in this step are movement parameters other than the parameter concerning a change of the angular momentum of the arms about the vertical axis (or body trunk axis), which define the trajectory of the position of the center of gravity of the arms, as with the normal gait parameters determined in step S104 in FIG. 14.

Then, the process proceeds to step S606, where the floor reaction force's vertical component trajectory parameters for the current time gait are set in such a manner that the floor reaction force s vertical component trajectory defined by the parameters is substantially continuous (i.e., has no step-wise discrete values) as shown in FIG. 6, as with the first and second turning gaits of the normal gait.

The floor reaction force's vertical component trajectory parameters are set in such a manner that both the total center-of-gravity vertical position/posture and the floor reaction force's vertical component trajectory are continuously connected to those of the normal gait.

Specifically, based on the value (Z0", Vz0") seen from the current time gait's supporting leg coordinate system converted from the initial body vertical position/velocity for the normal gait finally determined in the processing of step S024 in FIG. 12 (processing for determining the initial state of the normal gait), that is, the value (Z0", Vz0") determined in step S224 in FIG. 19 or the like, the initial total center-of-gravity position/velocity for the normal gait seen from the current time gait's supporting leg coordinate system is determined using the formula 04 (or kinematics model of the robot 1), for example. Specifically, the initial total center-of-gravity vertical position for the normal gait seen from the current time gait's supporting leg coordinate system is determined by substituting, into the formula 04, the body material particle vertical position in the model in FIG. 10 corresponding to the body vertical position Z0" for the normal gait determined in step S224 and the leg material particle vertical positions for the supporting leg and the free leg corresponding to the values seen in the current time gait's supporting leg coordinate system converted from the foot positions thereof at the start of the normal gait. Besides, the initial total center-of-gravity vertical velocity for the normal gait seen from the current time gait's supporting leg coordinate system is determined by substituting, into a formula obtained by differentiating the both sides of the formula 04, the body material particle vertical velocity in the model in FIG. 10 corresponding to the body vertical velocity Vz0" for the normal gait determined in step S224 and the leg material particle vertical velocities for the supporting leg and the free leg corresponding to the values seen in the current time gait's supporting leg coordinate system converted from the foot vertical velocities thereof at the start of the normal gait. The calculation of the initial total center-of-gravity vertical position/velocity may be performed using a more precise model.

Then, the initial total center-of-gravity vertical position/velocity for the normal gait thus determined is substituted for the final total center-of-gravity vertical position/velocity in the formula 13 and the following formula 41, and the last-time desired gait instantaneous values (more specifically, values in the current time supporting leg coordinate system converted from the final states of the last time desired gait) of the total center-of-gravity vertical position and velocity are substituted for the initial total center-of-gravity vertical position and velocity in the formulas 13 and 41, thereby determining the floor reaction force's vertical component pattern (more specifically, parameter values) for the current time gait so that the formulas 13 and 41 are satisfied. Here, the integral values in the formulas 13 and 41 are the integral values for the period from the start to the end of the current time gait.

final total center-of-gravity vertical velocity −    formula 41 initial total center-of-gravity vertical velocity = first order integral of (floor reaction force's vertical component/mass of the robot) + first order integral of the gravitational acceleration

Here, the gravitational acceleration is a negative value.

More specifically, first, assuming that at least two parameters of the floor reaction force's vertical component parameters (times of apexes or the like) that define the floor reaction force's vertical component pattern as shown in FIG. 6 are unknown variables, the value of the unknown variables are determined by solving the simultaneous equations comprising the formulas 13 and 41.

As the floor reaction force's vertical component parameters assumed to be unknown variables, the height (peak value of the floor reaction force's vertical component) and the width (duration of the one leg supporting period) of the trapezoid in FIG. 6 may be adopted. In this case, the gradients of the sides of the trapezoid in FIG. 6 are set to values predetermined in accordance with the period of the current time gait or the like, or the times of the apexes of the floor reaction force's vertical component pattern excluding the time of shifting from the one leg supporting period to the floating period occurs are set to values predetermined in accordance with the period of the current time gait or the like. Incidentally, if there is only one unknown variable, in general, there is no solution that satisfies the formulas 13 and 41.

Figure 33:
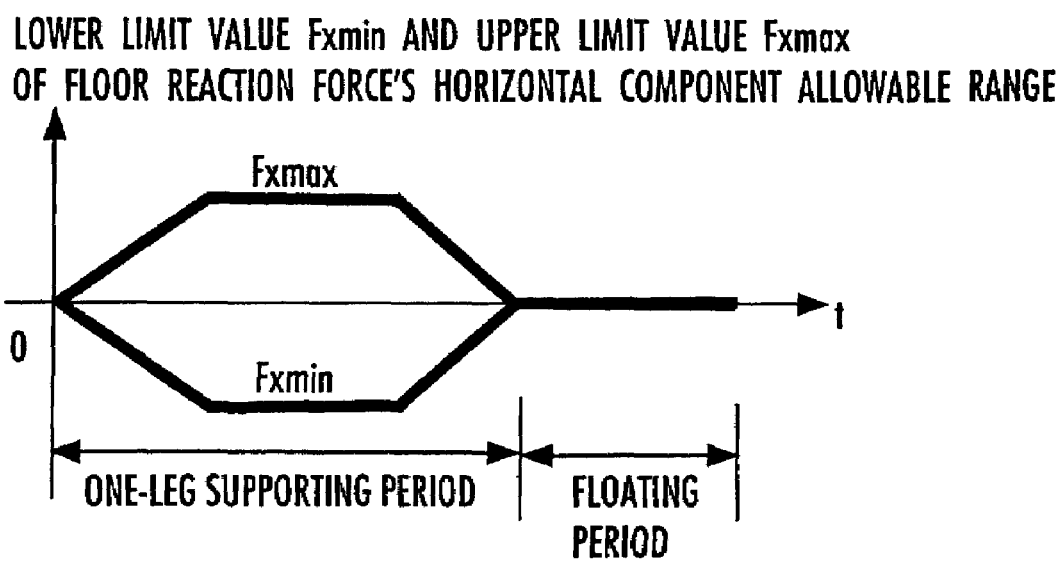
FIG. 33 is a graph showing an example of setting of the floor reaction force's horizontal component allowable range for a current time gait.

Then, the process proceeds to step S608, where the floor reaction force's horizontal component allowable range [Fxmin, Fxmax] (specifically, parameters for defining the pattern of the floor reaction force's horizontal component allowable range) is determined in the same manner as the first and second turning gaits of the normal gait. For example, the floor reaction force's horizontal component allowable range having a pattern shown in FIG. 33 is set. In this embodiment, the floor reaction force's horizontal component allowable range is set based on the formula 12 in accordance with the floor reaction force's vertical component pattern previously determined in step S606.

Then, the process proceeds to step S610, where the ZMP trajectory for the current time gait (specifically, parameters defining the ZMP trajectory, such as times or positions of the apexes of the trajectory) is set as shown in FIG. 7 to have a high stability margin and not to change abruptly, as with the first and second turning gaits of the normal gait. The parameters are set in such a manner that the ZMP trajectory for the current time gait is seamlessly connected to the ZMP trajectory for the normal gait. That is, the ZMP trajectory parameters are determined in such a manner that the position of the ZMP at the end of the current time gait agrees with the ZMP position at the start of the normal gait. In this case, for the running gait, the times or positions of the apexes of the ZMP trajectory in the one leg supporting period may be set in the same manner as the ZMP trajectory parameters for the normal gait described above. And, the ZMP trajectory parameters are set in such a manner that the desired ZMP trajectory in the floating period linearly continuously change from the start of the floating period to the ZMP position at the start of the normal gait.

Here, the ZMP trajectory parameters for the current time gait determined in step S610 are provisional ones and to be corrected as described later. Thus, the ZMP trajectory for the current time gait thus set is referred to as a provisional desired ZMP trajectory for the current time gait hereinafter.

Finally, the process proceeds to step S612, where a body posture angle restoring period [Ta, Tb] is set. The body posture angle restoring start time Ta corresponds to the time Tm in the second turning gait of the normal gait, and the body posture angle restoring end time Tb corresponds to the time Ts2 in the second turning gait of the normal gait. These times Ta and Tb are set in the same manner as the times Tm and Ts2, respectively.

Returning to FIG. 12, after the processing of step S026 (processing of determining the gait parameters for the current time gait) is performed as described above, the process proceeds to step S028, where the gait parameters for the current time gait (ZMP trajectory parameters) are corrected. In this processing, the ZMP trajectory parameters are corrected to make the body position/posture trajectory continuous with the normal gait or bring the same close to the normal gait.

Figure 34:
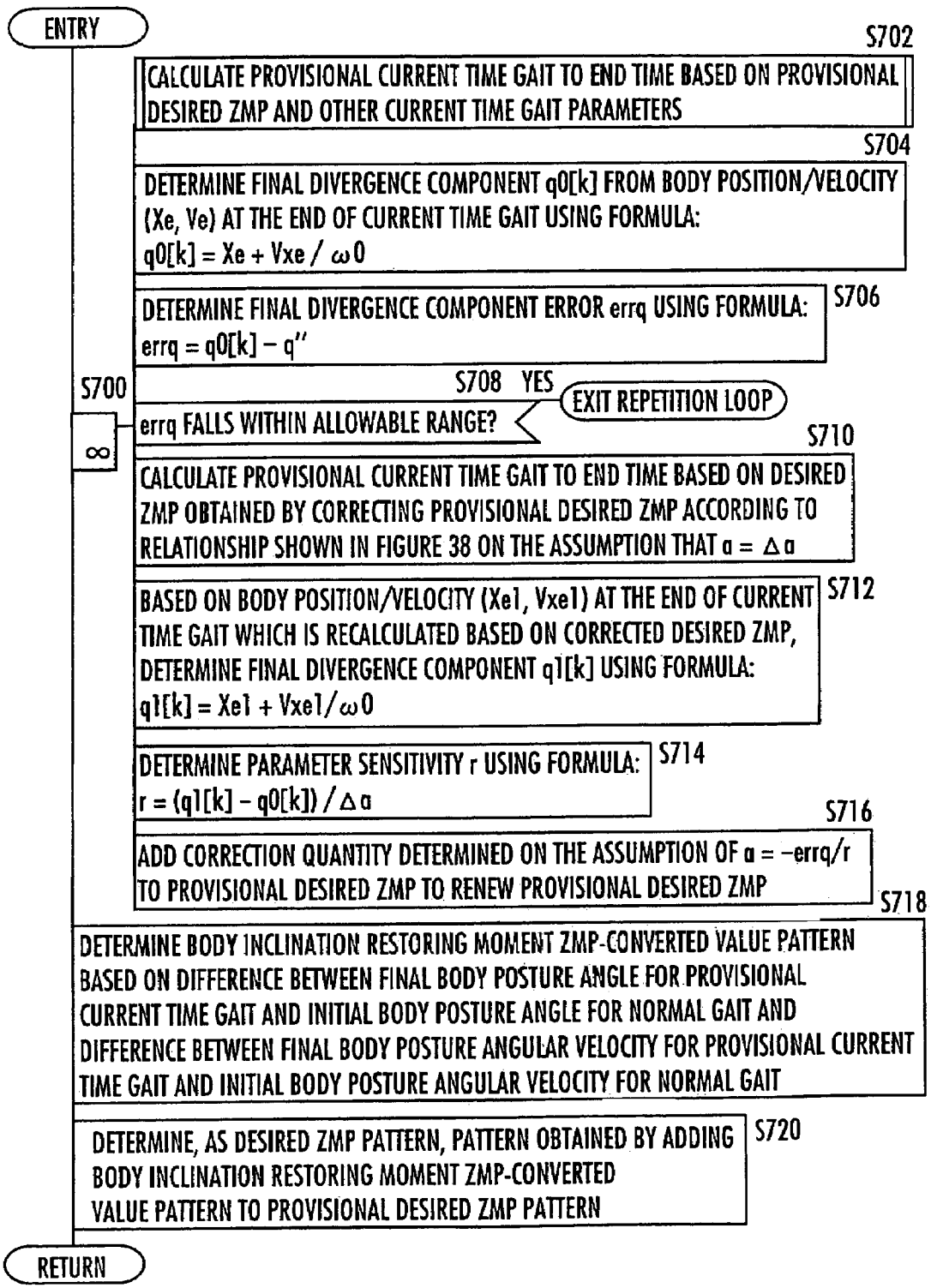
FIG. 34 is a flowchart showing subroutine process in the flowchart shown in FIG. 12.

FIG. 34 is a subroutine flowchart showing the processing. First, the process proceeds to step S702 via step S700, where based on the provisional desired ZMP pattern and the other current time gait parameters, a provisional current time gait to the end time of the current time gait is provisionally generated.

In step S702, a process described below is conducted in accordance with the flowchart shown in FIG. 35.

In step S800, various initializations are performed. Specifically, 0 is substituted for the provisional gait generation time k. In addition, values in the current time supporting leg coordinate system converted from the final states of the last time desired gait (more specifically, final values of the gait states including the body horizontal position/velocity, the body vertical position/velocity, the body posture angle and the angular velocity, and the desired foot position/posture and the arm desired posture) are used as the current time gait's initial states.

Then, in step S804 after step S802, it is determined whether the provisional gait generation time k precedes the end time Tcurr of the current time gait or not (whether k≦Tcurr). If the result of the determination is YES, the process proceeds to a current time gait instantaneous value determination subroutine of step S806, where instantaneous values for the current gait at the time k are determined. Then, the process proceeds to step S808, where the provisional gait generation time k is incremented by Δk, and then, the process returns to step S804.

Figure 35:
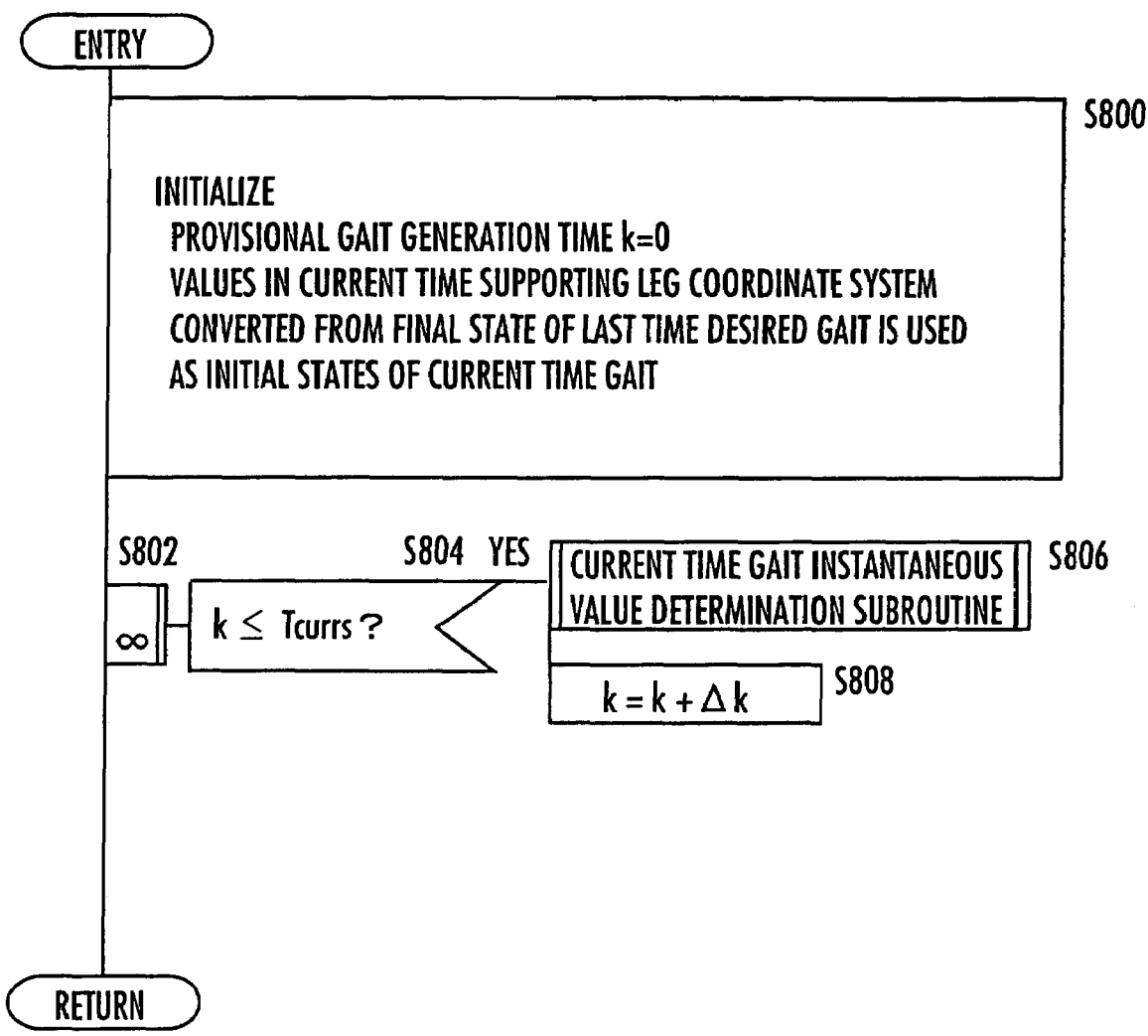
FIG. 35 is a flowchart showing subroutine process in the flowchart shown in FIG. 34.

If the result of the determination in step S804 is NO, the process shown in the flowchart in FIG. 35 is completed.

By the process described above, the provisional current gait is generated from the start to the end thereof.

Figure 36:
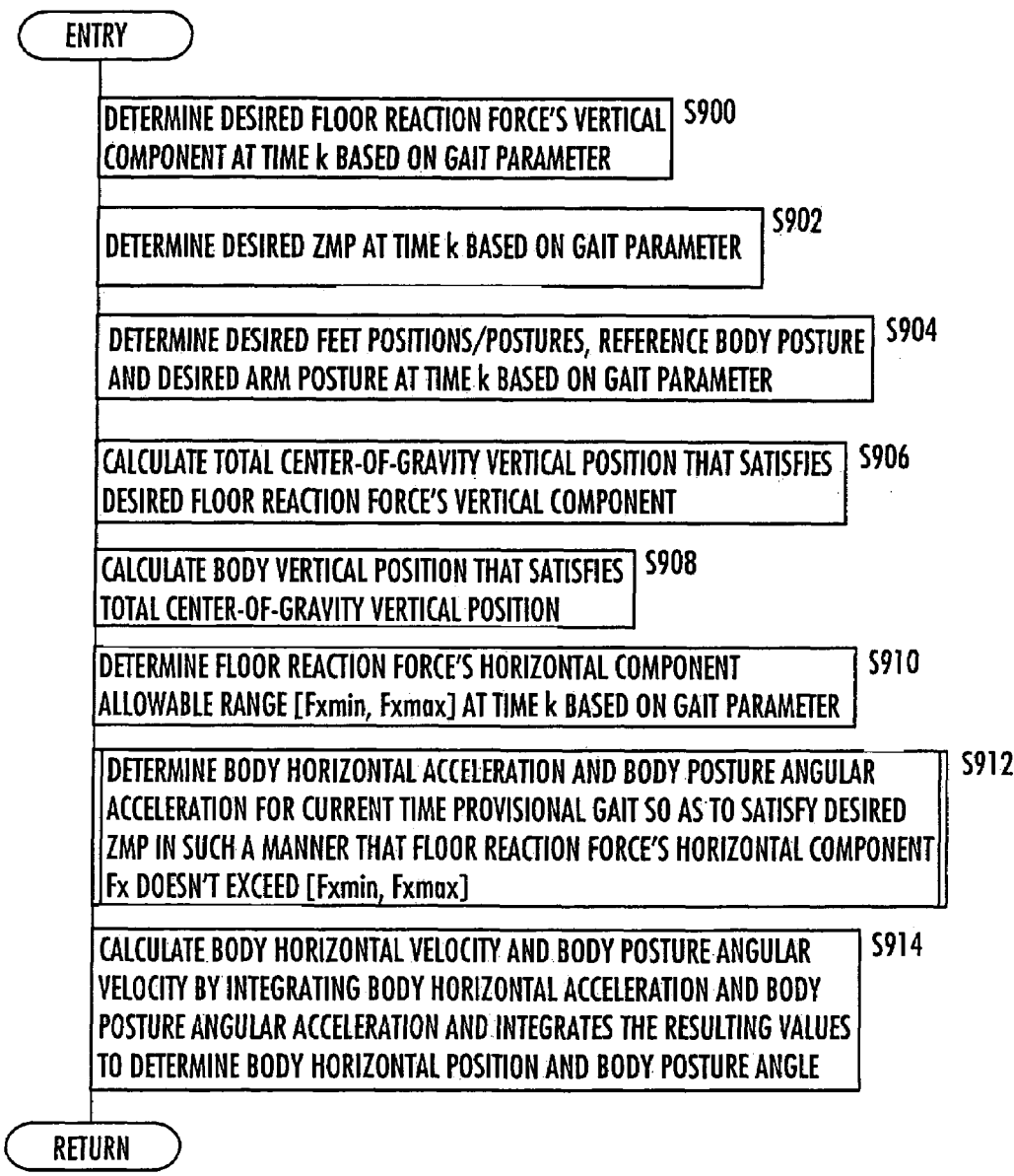
FIG. 36 is a flowchart showing subroutine process in the flowchart shown in FIG. 35.

In the gait instantaneous value determination subroutine in step S806, the process shown in FIG. 36 is performed. This process will be described below.

First, in step S900, based on the floor reaction force's vertical component trajectory parameters of the current time gait parameters, the value (current time value) of the desired floor reaction force's vertical component at the time k shown in FIG. 6 is determined. Then, in step S902, based on the ZMP trajectory parameters of the current time gait parameters, the value (current time value) of the desired ZMP trajectory (provisional desired ZMP trajectory) at the time k shown in FIG. 7 is determined.

Then, the process proceeds to step S904, where based on the current time gait parameters (the foot trajectory parameters, the reference body posture trajectory parameters and the arm posture trajectory parameters), the values (current time values) of the desired feet positions/postures, the reference body posture and the desired arm posture at the time k are determined. However, as for the desired arm posture, while the total arm center-of-gravity position is determined, the degree of freedom of the movement that involves a change of angular momentum about the vertical axis (or the body trunk axis) is not determined yet. As in the normal gait, the desired foot position/posture trajectory and the floor reaction force's vertical component trajectory for the current time gait are independently determined in accordance with the foot trajectory parameters and the floor reaction force's vertical component trajectory parameters determined in the flowchart in FIG. 32, respectively.

Then, the process proceeds to step S906, where the total center-of-gravity vertical position at the time k that provides the current time value of the desired floor reaction force's vertical component determined in step S900 (i.e., brings the sum of the vertical inertial force of the robot 1 and gravity into balance with the desired floor reaction force's vertical component) is calculated. Specifically, this calculation is performed in the same manner as the processing in step S406 in FIG. 21.

Then, the process proceeds to step S908, where the current time value of the body vertical position that provides the total center-of-gravity vertical position thus determined is calculated. Specifically, this calculation is performed in the same manner as the processing in step S408 in FIG. 21.

Figure 32:
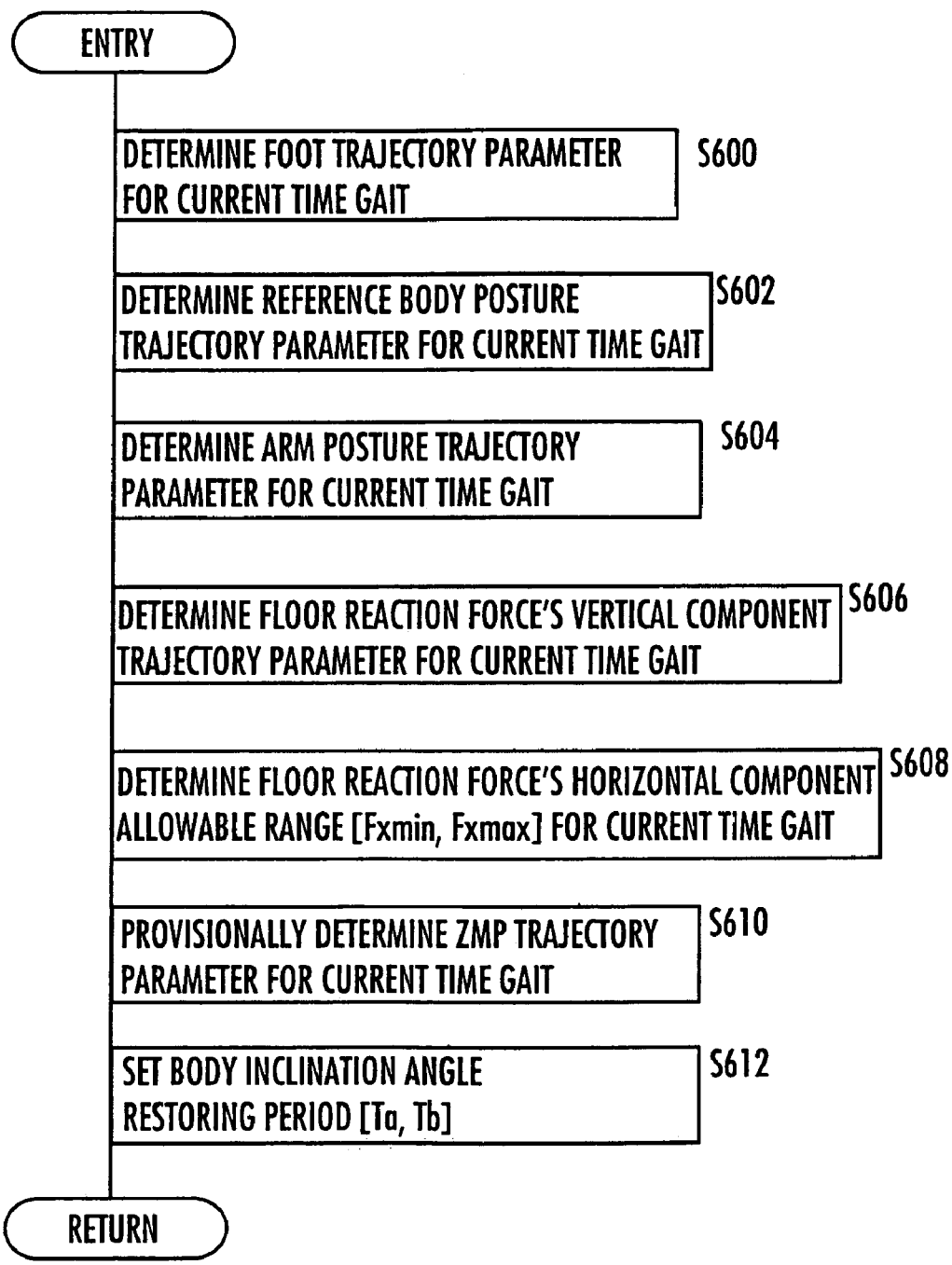
FIG. 32 is a flowchart showing subroutine process in the flowchart shown in FIG. 12.

Then, the process proceeds to step S910, where based on the parameters of the floor reaction force's horizontal component allowable range determined in step S608 in FIG. 32, the value (current time value) of the floor reaction force's horizontal component allowable range [Fxmin, Fxmax] at the time k shown in FIG. 33 is determined.

Then, the process proceeds to step S912, where the body horizontal acceleration and the body posture angular acceleration for the current time provisional gait are determined so as to satisfy the desired ZMP (that is, the horizontal component of the moment about the desired ZMP is 0). However, these acceleration are determined in such a manner that the floor reaction force's horizontal component Fx doesn't exceed the range [Fxmin, Fxmax]. This process is slightly different from the process shown in the flowchart in FIG. 22, which illustrates the processing in step S412 in FIG. 21 in detail.

Figure 37:
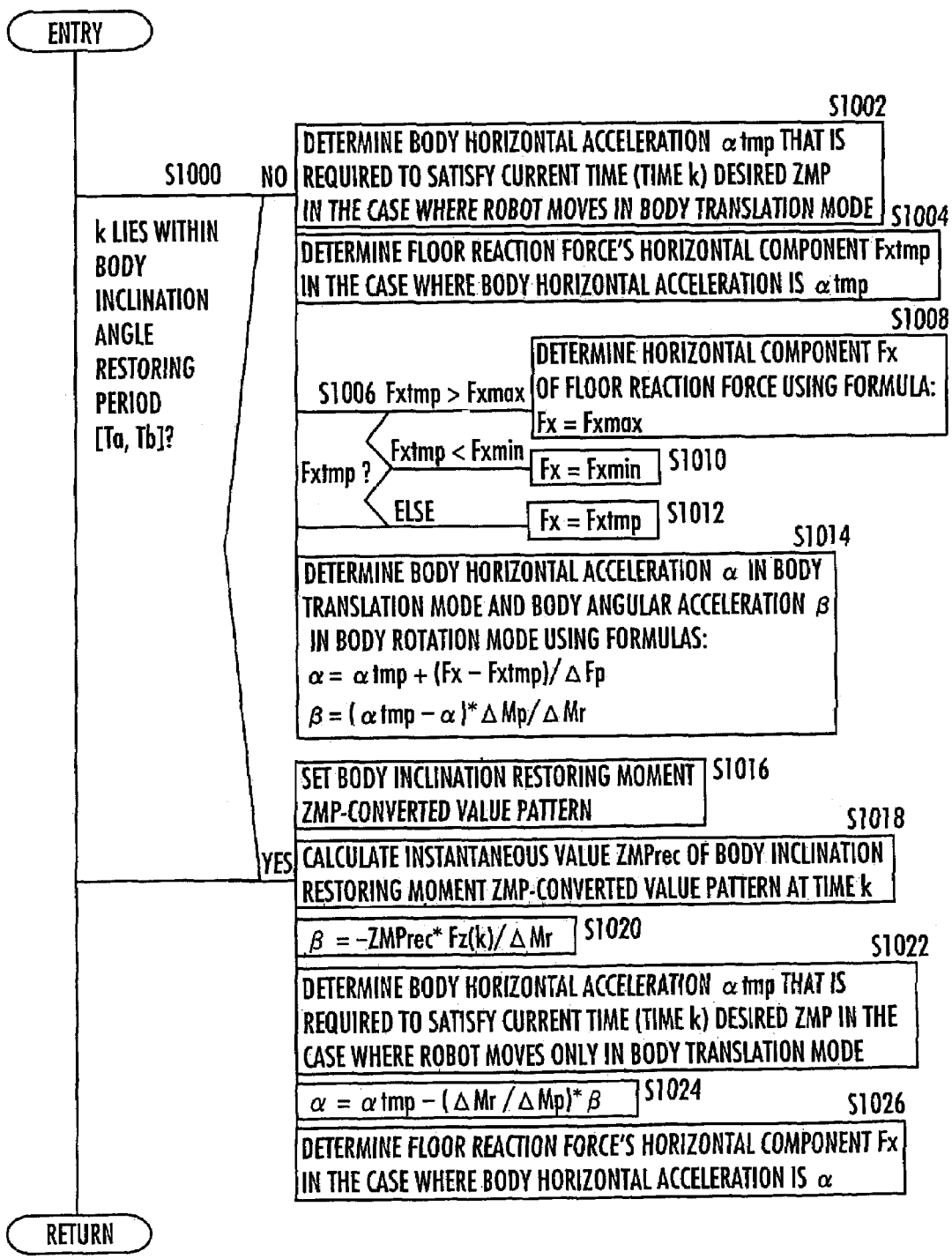
FIG. 37 is a flowchart showing subroutine process in the flowchart shown in FIG. 36.

Specifically, in step S912, the process shown in FIG. 37 is performed. In the flowchart shown in FIG. 37, first in step S1000, it is determined whether or not the time k lies within the body posture angle restoring period [Ta, Tb] determined in step S612 in FIG. 32.

If the result of the determination is NO (the floor reaction force's horizontal component allowable range is 0 or narrow), the processings from step S1002 to step S1014 are performed. The processings from step S1002 to step S1014 are the same as the processings from step S504 to step S516 in FIG. 22 described above, and thus, description thereof is omitted.

If the result of the determination in step S1000 is YES, the process proceeds to step S1016, where the body posture restoring moment ZMP-converted value pattern ZMPrec is set. In this case, unlike step S518 in FIG. 22 concerning the normal gait generation, ZMPrec is set to a pattern of a constant value of 0 (that is, the height of the trapezoidal pattern shown in FIG. 26 is 0). Then, the processings from step S1018 to step S1026 are performed. The processings from step S1018 to step S1026 are the same as the processings from step S520 to step S528 in FIG. 22 described above, and thus, description thereof is omitted. In the processings from step S1016 to step S1026, the instantaneous value of the body posture restoring moment ZMP-converted value ZMPrec is always 0, and therefore, the body posture angular acceleration β for the body rotation mode determined in step S1020 is also 0. Therefore, assuming that β=0, only the processings in steps S1022, S1024 and S1026 may be performed. If the result of the determination in step S1000 is YES, that is, during the body posture angle restoring period [Ta, Tb], β is 0 (β=0) as described above. Therefore, in step S912, in the body posture angle restoring period [Ta, Tb] (that is, a period in which the floor reaction force's horizontal component allowable range is wide enough), a movement trajectory for body posture change in the direction for restoring the body posture angular velocity is not generated, unlike the case of normal gait generation.

In this embodiment, since the reference body posture is the vertical posture, and the body posture angular acceleration depending on the reference body posture is 0, the angular acceleration β for the body rotation mode determined as described above is regarded as the body posture angular acceleration determined in the processing in step S912. However, if the reference body posture trajectory parameters are set in such a manner that the reference body posture varies, the sum of the angular acceleration β for the body rotation mode determined as described above and the reference body posture angular acceleration should be regarded as the body posture angular acceleration determined in the processing of step S912.

Once the processing in step S912 in FIG. 36 is completed as described above, the process proceeds to step S914, where the body horizontal velocity is determined by integrating the body horizontal acceleration determined in step S912 (cumulatively summing the body horizontal acceleration values from the start of the current time gait (time k=0) to the present time k), and the body horizontal position (current time value) is determined by integrating the body horizontal velocity (cumulatively summing the body horizontal velocity values from the start of the current time gait (time k=0) to the present time k). In addition, the body posture angular velocity is determined by integrating the body posture angular acceleration determined in step S912 (cumulatively summing the body posture angular acceleration values from the start of the current time gait (time k=0) to the present time k), and the current time value of the body posture angle is determined by integrating the body posture angular velocity (cumulatively summing the body posture angular velocity values from the start of the current time gait (time k=0) to the present time k) The processing in step S914 is the same as the processing in step S414 in FIG. 21.

After the current time gait instantaneous value determination subroutine of step S806 in FIG. 35 is conducted as described above, the process proceeds to step S808, where the value of the gait generation time k is incremented by the gait generation interval Δk. Then, the process returns to step S804, and as far as the condition shown in step S804 is satisfied, the processings of steps S806 and S808 are repeated. Then, if the condition shown in step S804 is not satisfied, that is, if the provisional current time gait is generated to the end thereof, the process proceeds to step S704 in FIG. 34.

In step S704, from the body horizontal position/velocity (Xe, Vxe) at the end of the current time gait determined in step S702 as described above, the final divergence component q0[k] (k=Tcurr) is determined using the formula shown in the drawing (formula 10).

Then, the process proceeds to step S706, where a final divergence component error errq, which is the difference between the current time gait's final divergence component q0[k] and the normal gait's initial divergence component q" (determined in step S224 in FIG. 19), is determined using the formula shown in the drawing. Then, the process proceeds to step 708, where it is determined whether the final divergence component error errq thus determined falls within an allowable range (a range in the vicinity of 0) or not.

Figure 38:
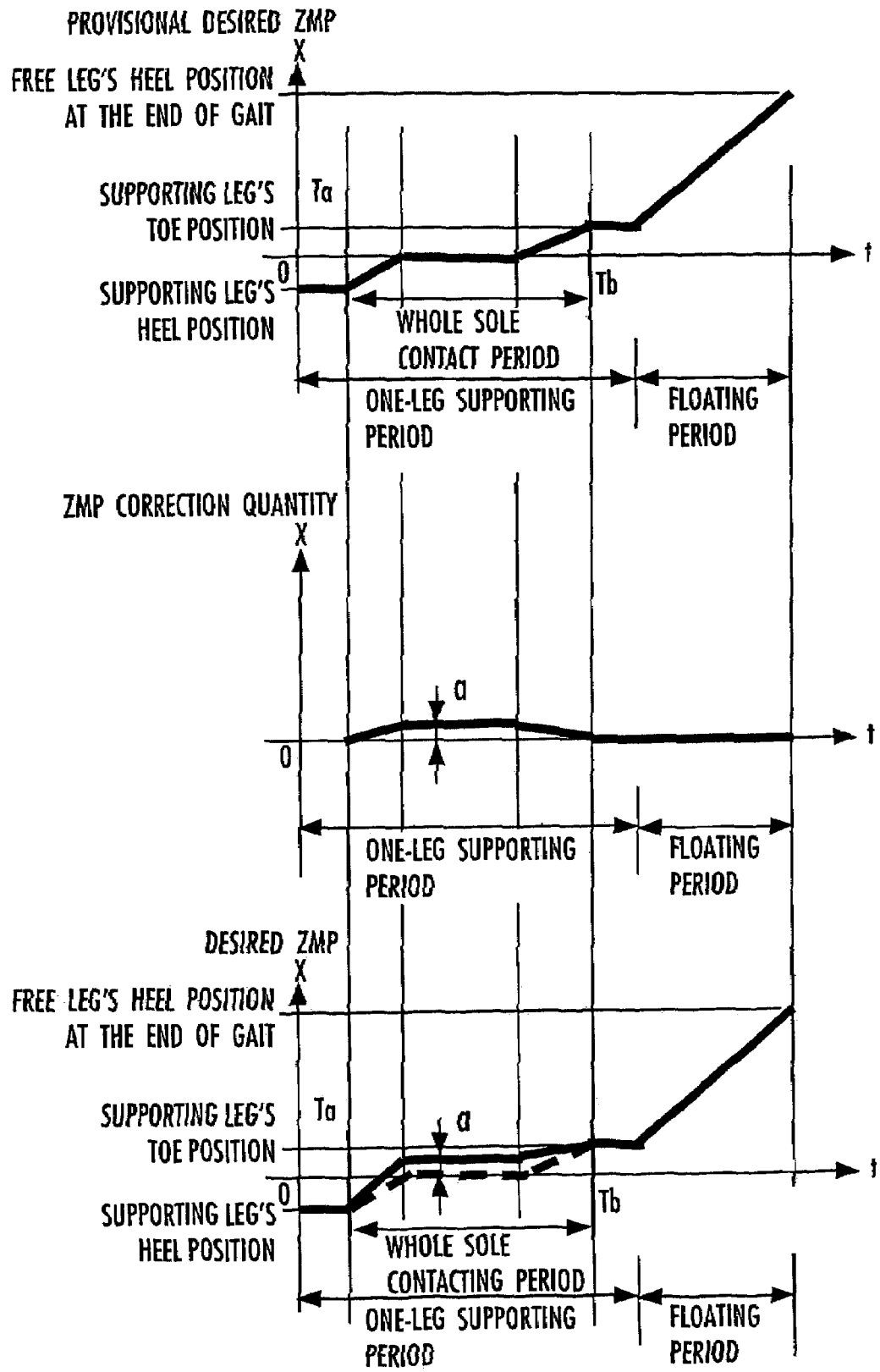
FIG. 38 is a graph for illustrating essential process in the flowchart shown in FIG. 37.

If the result of the determination in step S708 is NO, the process proceeds to step S710, where, assuming that a=Δa (Δa is a predetermined small amount), based on a desired ZMP obtained by correcting the current provisional desired ZMP pattern to be trapezoidal in accordance with the relationship shown in FIG. 38, the provisional current time gait to the end thereof is calculated in the same manner as in step S702. Here, with reference to FIG. 38, "a" denotes the height of the trapezoidal pattern for correcting the provisional desired ZMP to make the current time gait's final divergence component agree with the normal gait's initial divergence component as closely as possible (bring the body horizontal position/posture trajectory for the current time gait close to the body horizontal position/posture trajectory for the normal gait). In this case, in this embodiment, the correction of the provisional desired ZMP is performed during a period in which substantially the whole surface of the sole of the supporting leg's foot 22 (whole sole contact period), that is, during a period in which the floor reaction force's horizontal component allowable range is sufficiently wide, and the times of the apexes of the trapezoidal pattern are set to the times of the apexes of the provisional desired ZMP pattern in the whole sole contact period. The assumption that a=Δa in step S710 is intended for observing a change of the final divergence component error errq occurring when the current provisional desired ZMP trajectory is corrected by a small amount using the trapezoidal pattern.

After the provisional current time gait obtained when the provisional desired ZMP trajectory is corrected on the assumption that a=Δa is generated to the end thereof in step S710, the process proceeds to step S712, where based on the body horizontal position/velocity (Xe1, Vxe1) at the end of the provisional current time gait, the final divergence component q1[k] for the provisional current time gait is determined using the formula shown in the drawing (formula 10).

In this embodiment, Δa is assumed to be an appropriately set small constant in step S710. However, Δa may be set to decrease as the final divergence component error errq decreases through repeated calculations described below. However, if Δa is a constant, the final divergence component error errq can be made to fall within the allowable range by several repeated calculations.

Then, the process proceeds to step S714, where a parameter sensitivity r (rate of change of the final divergence component error with respect to Δa) is determined using the formula shown in the drawing. Then, the process proceeds to step S716, where a correction quantity in a trapezoidal pattern having a height of a (=−errq/r, which is a value obtained by dividing the final divergence component error errq determined in step S706 by the parameter sensitivity r determined in step S714) is added to the provisional desired ZMP pattern in accordance with the relationship shown in FIG. 38, thereby correcting the provisional desired ZMP pattern (determining a new provisional desired ZMP pattern).

Then, the process returns to step S702. Then, as far as the result of the determination in step S708 is NO, the processings from steps S702 to S716 are repeated, and if the result of the determination in step S708 is YES, the repetition loop (step S700) is exited, and the process proceeds to step S718.

In step S718, based on the difference between the final body posture angle for the provisional current time gait and the initial body posture angle for the normal gait, the difference between the final body posture angular velocity for the current time gait and the initial body posture angular velocity for the normal gait or the like, a pattern of the body posture restoring moment ZMP-converted value (ZMPrec) for the current time gait is determined in such a manner that the body posture angle for the current time gait is brought close to the body posture angle for the normal gait. ZMPrec determined in this step is used for correcting the provisional desired ZMP to maintain the agreement between the current time gait's final divergence component and the normal gait's initial divergence component (condition in step S708) even if a body posture angular acceleration is produced so as to connect the body posture angle trajectory to the normal gait (bring the body posture angle trajectory close to the normal gait) during a period in which the floor reaction force's horizontal component allowable range is sufficiently wide (a period in the one leg supporting period) in the processing of generating the current time gait instantaneous values described later.

ZMPrec has a trapezoidal pattern as with that described concerning the normal gait generation process and, specifically, is determined in the following manner. That is, assuming that, in the trapezoidal pattern of ZMPrec shown in FIG. 26, the times of the apexes (folds) of the trapezoid are known (specifically, the times of the apexes of the trapezoid are adjusted to the times of apexes of the desired ZMP) and the height of the trapezoid is unknown, the height (parameter) of trapezoid of ZMPrec is determined as described below. However, concerning step S718, the times Tm and Ts2 in FIG. 26 are replaced with the times Ta and Tb, respectively.

If the body posture restoring moment ZMP-converted pattern has only one unknown parameter as described above, in general, both of the body posture angle and the body posture angular velocity of the current time gait cannot be seamlessly connected to those of the normal gait at the end of the current time gait. Thus, in this embodiment, the unknown parameter is determined in such a manner that the state of the generated gait is gradually brought close to the state of the normal gait through plural steps.

Incidentally, both of the body posture angle and the body posture angular velocity of the current time gait may be connected to those of the normal gait at the end of the current time gait under the conditions that the ZMPrec pattern for one gait is more complicated and two or more unknown parameters are used. However, in such a case, there is a possibility that the ZMPrec pattern varies too largely in a zigzag.

In the following, a calculation principle will be described, and then, a calculation procedure will be described.

The difference between the final body posture angle for the provisional current time gait determined as described above on the assumption that the height of the trapezoidal ZMPrec pattern is 0 in step S702 and the initial body posture angle for the normal gait, and the difference is denoted by θerr. In addition, the difference between the final body posture angular velocity for the provisional current time gait and the initial body posture angular velocity for the normal gait is determined, and the difference is denoted by vθerr.

Here, it is assumed that the current time gait is generated on the assumption that the height of the trapezoidal ZMPrec pattern is a certain value bcurr, and subsequently, the first turning gait is generated by the same algorithm as the current time gait. Here, it is assumed that the pattern of the body posture restoring moment ZMP-converted value ZMPrec for the first turning gait is expressed by a sum of the ZMPrec pattern for the first turning gait determined in step S518 in FIG. 22 (trapezoidal pattern having a height of acyc1 shown in FIG. 26) and a certain value b1.

The gait thus generated is referred to as a ZMPrec-corrected gait, and the final body posture angle and the final angular velocity (at the end of the first turning gait) are denoted by θ1 and vθ1, respectively.

The body posture angle and the angular velocity at the end of the first turning gait of the original normal gait determined when the subroutine for determining the initial states of the normal gait in step S024 are denoted by θ1org and vθ1org, respectively (the original normal gait is one determined on the assumption that the initial body posture angle and the initial angular velocity for the normal gait determined by the formulas 30 and 31 in step S310 are used as initial values, and the pattern determined in step S518 (trapezoidal pattern having a height of acyc1 in FIG. 26) is used as the ZMPrec pattern).

Here, Δθ1 and Δvθ1 are defined as follows.

$$\Delta\theta1 = \theta1 - \theta1org \quad \text{formula 50}$$

$$\Delta v\theta1 = v\theta1 - v\theta1org \quad \text{formula 51}$$

Δθ1 and Δvθ1 represent differences in body posture angle and angular velocity, respectively, between the ZMPrec-corrected gait and the original normal gait at the time when the first turning gait is generated to the end thereof. If Δθ1 and Δvθ1 are 0, when the second turning gait is generated subsequently to the ZMPrec-corrected gait by the same algorithm as the current time gait on the assumption that the height of the trapezoidal ZMPrec pattern is acyc2, the generated gait agrees with the original normal gait.

Therefore, a current time gait's trapezoidal pattern height bcurr and a first turning gait's trapezoidal pattern height b1 are determined so that Δθ1 and Δvθ1 are 0, and the determined value bcurr is used finally as the trapezoidal pattern height for the current time gait.

Since the dynamics model concerning the body posture angle of the robot 1 has a linearity similar to that of the flywheel FH as shown in FIG. 10, Δθ1 and Δvθ1 are related as follows with the current time gait's trapezoidal pattern height bcurr, the first turning gait's trapezoidal pattern height b1, the difference θerr between the final body posture angle for the provisional current time gait and the initial body posture angle for the normal gait, and the difference vθerr between the final body posture angular velocity for the provisional current time gait and the initial body posture angular velocity for the normal gait.

$$\Delta\theta1 = c11*bcurr + c12*b1 + \theta err + e1*v\theta err \quad \text{formula 52}$$

$$\Delta v\theta1 = c21*bcurr + c22*b1 + e2*v\theta err \quad \text{formula 53}$$

Here, c11, c12, c21, c22, e1 and e2 are coefficients that are uniquely determined by the gait periods of the current time gait and the first turning gait, parameters of the pattern of the body posture restoring moment ZMP-converted value ZMPrec (in particular, parameters concerning time), or the like.

Based on the principle described above, in the calculation procedure, the body posture angle difference θerr and the angular velocity difference Vθerr at the boundary between the provisional current time gait and the normal gait are first determined.

Then, the coefficients c11, c12, c21, c22, e1 and e2 of the formulas 52 and 53 are determined based on the gait periods of the current time gait and the first turning gait, parameters of the pattern of the body posture restoring moment ZMP-converted value ZMPrec (in particular, parameters concerning time), or the like.

Then, the current time gait's trapezoidal pattern height bcurr and the first turning gait's trapezoidal pattern height b1 are determined in such a manner that the right sides of the formulas 52 and 53 are 0. That is, the simultaneous equations of the formulas 52 and 53 with the right sides being 0 are solved to determined the values bcurr and b1.

Finally, the height of the trapezoidal pattern of the body posture restoring moment ZMP-converted value (ZMPrec) for the current time gait is set to the determined current time gait's trapezoidal pattern height bcurr.

Then, the process proceeds to step S720, where as a desired ZMP pattern for the current time gait, a pattern is determined which is a sum of the current provisional desired ZMP pattern (provisional desired ZMP pattern when the repetition loop in step S700 is exited) and the body posture restoring moment ZMP-converted value pattern determined as described above in step S718. This processing is the same as the processing of adding the trapezoidal pattern having a height of Δa to the provisional desired ZMP pattern in step S710.

A reason why the body posture restoring moment ZMP-converted value pattern is added to the provisional desired ZMP pattern will be described below.

The provisional current time gait generated in the loop in step S700 is generated on the assumption that the body posture restoring moment ZMP-converted value ZMPrec is 0 (the height parameter of the trapezoidal ZMPrec pattern is 0) as described above. For the provisional current time gait thus finally generated in the loop in step S700, while the body position/velocity is continuous to or close to that for the normal gait, the body posture angle is shifted from the body posture angle for the normal gait or possibly diverges.

The body posture restoring moment ZMP-converted value pattern determined in step S718 is one that produces such a body posture angular acceleration that brings the shift of the body posture angle from that for the normal gait close to 0.

However, if the body posture angular acceleration according to the body posture restoring moment ZMP-converted value pattern determined in step S718 is produced without correcting the provisional desired ZMP pattern resulting from the loop instep S700, the body horizontal position trajectory has to be shifted from the body horizontal position trajectory for the provisional current time gait in order to satisfy the dynamical equilibrium condition (that the moments applied to the desired ZMP by the resultant force of gravity and the inertial force of the robot, except for the vertical moment, are 0). Thus, in this embodiment, the provisional desired ZMP pattern is corrected so that there is no need to shift the body horizontal position trajectory from that resulting from the loop in step S700

If, besides the movement according to the provisional current time gait, the body posture angular acceleration according to the body posture restoring moment ZMP-converted value pattern determined in step S718 is produced, the ZMP (a point where the moments caused by gravity and the inertial force caused by a movement, except for the vertical moment, are 0) is shifted by the body posture restoring moment ZMP-converted value. Therefore, if a pattern which is a sum of the provisional desired ZMP pattern and the body posture restoring moment ZMP-converted pattern is used as a desired ZMP pattern, and a current time gait that satisfies the desired ZMP pattern is generated while producing a body posture angular acceleration for the body rotation mode associated with the body posture restoring moment ZMP-converted value pattern determined in step S718, a body translation movement similar to the provisional current time gait is provided.

Above described is a reason why the sum of the body posture restoring moment ZMP-converted value pattern and the provisional desired ZMP pattern is used as the desired ZMP pattern.

Returning to FIG. 12, after correcting the current time gait parameters in step S028 as described above, or if the result of the determination in S016 is NO, the process proceeds to step S030, where current time gait's instantaneous values are determined.

In step S030, the same processings as those in steps S900 to S910 in FIG. 36 are performed, and then, the processings in steps S1000 to S1026 in FIG. 37, which is the subroutine of step S912, are performed. In this case, however, in step S1016 in FIG. 37, the body posture restoring moment ZMP-converted value (ZMPrec) pattern is not set to 0 but to be the body posture restoring moment ZMP-converted value (ZMPrec) pattern set in step S718 in FIG. 34. Then, the same processing as that in step S914 in FIG. 36 is performed, and the process in step S030 in FIG. 12 is completed.

Then, the process proceeds to step S032, where an arm movement that cancels the spinning force (that allows the floor reaction force's vertical moment caused about the desired ZMP by movements of parts, other than the arms, of the robot 1 to be substantially 0) is determined. Specifically, the floor reaction force moment's vertical component trajectory in the desired ZMP in the case where the arms don't swing is determined. (More strictly, values obtained by inverting the signs of the instantaneous values of the vertical component trajectory of the moment applied to the desired ZMP by the resultant force of gravity and the inertial force of the robot in the case where the gait is generated without the arms swinging are determined.) That is, an instantaneous value is determined for the floor reaction force moment vertical component about the desired ZMP (instantaneous value) in balance with the instantaneous value of the movement according to the gait generated in the processing in step S030 (excluding the arm swing movement). Then, the instantaneous value is divided by the equivalent moment of inertia the arm swing movement, thereby determining the angular acceleration of the arm swing movement required for canceling the spinning force. Incidentally, a too wide arm swing can be addressed by dividing the instantaneous value by a value larger than the equivalent moment of inertia.

Then, the angular acceleration is integrated two times, the resulting value is passed through a low cut filter for preventing the integral value from being too large, and the resulting angle is regarded as an arm swing movement angle. However, in the arm swing movement, the left and right arms are swung oppositely in the back-and-forth direction to prevent the center of gravity of the arms from varying. An arm swing movement for canceling the spinning force may be generated for the normal gait, and the arm swing movement for the current time gait be determined so as to connect to the arm swing movement.

Then, the process proceeds to step S034, where the gait generation time t is incremented by Δt. Then, the process returns to step S014, and the gait generation continues as described above.

Described above is the desired gait generation process conducted in the gait generation device 100.

The operation of the device according to this embodiment will be further described with reference to FIG. 4. The gait generation device 100 generates the desired gait as described above. The desired body position/posture (trajectory) and the desired arm posture (trajectory) of the generated desired gait are transmitted to a robot geometrical model (inverse kinematics calculator) 102.

Besides, the desired foot position/posture (trajectory), the desired ZMP trajectory (that is, the desired total floor reaction force central point trajectory) and the desired total floor reaction force (trajectories) (specifically, the desired floor reaction force's vertical component and the desired floor reaction force's vertical component) are transmitted to a composite-compliance operation determinator 104 and to a desired floor reaction force distributor 106. Then, the desired floor reaction force distributor 106 distributes the floor reaction force among the feet 22R and 22L and determines the desired each-foot floor reaction force central point and the desired each-foot floor reaction force. The desired each-foot floor reaction force central point and the desired each-foot floor reaction force thus determined are transmitted to the composite-compliance operation determinator 104.

The composite-compliance operation determinator 104 transmits a corrected desired foot position/posture (trajectory) with deformation compensation to the robot geometrical model 102. Upon receiving the desired body position/posture (trajectory) and the corrected desired foot position/posture (trajectory) with deformation compensation, the robot geometrical model 102 calculates joint displacement commands (values) for the twelve joint (such as 10R (L)) of the legs 2,2 and transmits the commands to a displacement controller 108. The displacement controller 108 controls the twelve joints of the robot 1 by following the joint displacement commands (values) calculated by the robot geometrical model 102 as desired values. Besides, the robot geometrical model 102 calculates displacement commands (values) for the arm joints that satisfy the desired arm posture and transmits the commands to the displacement controller 108. The displacement controller 108 controls the twelve joints of the arms of the robot 1 by following the joint displacement commands (values) calculated by the robot geometrical model 102 as desired values.

The floor reaction force (specifically, actual each-foot floor reaction force) produced in the robot 1 is detected by the six-axis force sensor 34. The detection value is transmitted to the composite-compliance operation determinator 104. In addition, the posture inclination deviations θerrx and θerry produced in the robot 1 are detected by the inclination sensor 36, and the detection values are transmitted to a posture stabilizing control calculator 112 (specifically, the deviation of the actual posture angle with respect to the desired body posture angle in the roll direction (about the X axis) is denoted by θerrx, and the deviation of the actual posture angle with respect to the desired body posture angle in the pitch direction (about the Y axis) is denoted by θerry). Then, the posture stabilizing control calculator 112 calculates the compensating total floor reaction force's moment about the desired total floor reaction force central point (desired ZMP) for restoring the body posture angle of the robot 1 to the desired body posture angle and transmits the calculation result to the composite-compliance operation determinator 104. Based on the input value, the composite-compliance operation determinator 104 corrects the desired floor reaction force. Specifically, the desired floor reaction force is corrected so that the compensating total floor reaction force's moment is applied about the desired total floor reaction force central point (desired ZMP).

The composite-compliance operation determinator 104 determines the corrected desired foot position/posture (trajectory) with deformation compensation in order for the states and floor reaction force of the actual robot calculated from the sensor detection values or the like to agree with the corrected desired floor reaction force. However, it is actually impossible that all the states agree with their respective desired values, and therefore, various trade-offs are made among these states so that each of them agrees with its desired value as closely as possible. That is, a control deviation for each desired value is weighted, and the weighted average of the control deviation (or the square of the control deviation) is controlled to be minimum. Thus, the actual foot position/posture and the actual total floor reaction force are controlled so as to generally agree with the desired foot position/posture and the desired total floor reaction force, respectively.

Since the present invention essentially concerns the gait generation for the robot 1 using the gait generation device 100, and the configuration and operation of the composite-compliance operation determinator 104 or the like are described in detail in Japanese Patent Laid-Open No. 10-277969 previously filled by the applicants or the like, further details thereof will not be described herein.

In step S028, the current time gait is corrected in such a manner that the final divergence component of the current time gait agrees with a value q", which is the normal gait's initial divergence component q[0] seen from the current time gait's supporting leg coordinate system, as described above.

Actually, the divergence component serves as an indicator for evaluating whether the body horizontal position for a current time gait converges to that for a normal turning gait when the current time gait is generated using a dynamics model in accordance with current time gait parameters, and successively, the normal turning gait is generated in accordance with normal turning gait parameters. Essentially, the divergence component has to be defined so that the final divergence component of the current time gait agrees with a value q", which is the normal gait's initial divergence component q[0] seen from the current time gait's supporting leg coordinate system when the convergence described above occurs.

Actually, the divergence component defined by the formula 10 approximately satisfies this condition.

Therefore, it can be said that, in this embodiment, the current time gait parameters are corrected so that the body horizontal position for the current time gait converges to (comes close to) that for the normal turning gait when the current time gait is generated using a dynamics model in accordance with the current time gait parameters, and successively, the normal turning gait is generated in accordance with normal turning gait parameters.

The same is described in Japanese Patent Application No. 2000-352011.

Figure 39:
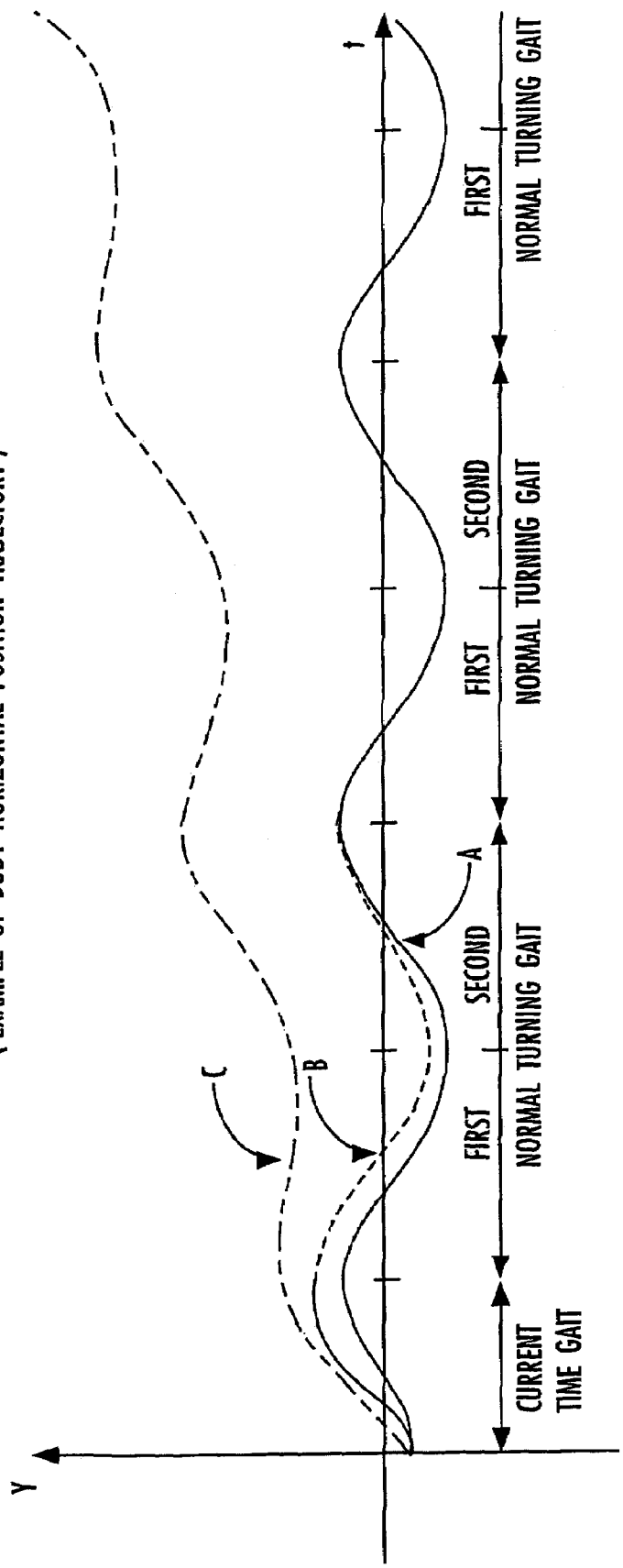
FIG. 39 is a graph showing a relationship between body horizontal position trajectories in the current time gait and the normal gait.

In this embodiment, of the current time gait parameters, the desired ZMP pattern is particularly corrected to satisfy the condition (that the current time gait comes close to the normal gait). Referring to FIG. 39, a trajectory denoted by symbol B indicates a body horizontal position trajectory generated in such a manner that the divergence components of two gaits agree with each other at the boundary of the gaits as described above.

A trajectory denoted by symbol A indicates a body horizontal position trajectory resulting from generating a current time gait in such a manner that the body horizontal position/velocity agrees with that for the normal turning gait at the boundary therebetween and then generating normal gaits repeatedly.

As shown in this drawing, the trajectory B generally doesn't agree with the trajectory A at the boundary between the current time gait and the first normal turning gait. Then, however, the trajectory B gradually converges to (comes close to) the trajectory A and substantially agrees with the trajectory A in the next normal turning gait cycle. As described above, as with the gait generation method involving agreements about both the position and velocity at the gait boundary, the gait generation method involving only agreement about the divergence component at the gait boundary can prevent a gait from diverging. A trajectory denoted by symbol C indicates a trajectory generated without consideration for these conditions. In this case, the generated trajectory diverges with time. Of course, both the agreements about both the position and velocity may be achieved by using more complicated desired ZMP pattern and adjusting a plurality of parameters. However, in such a case, there is a possibility that a zigzag desired ZMP pattern results. Since agreements about both the position and velocity result in agreement about the divergence component, it can be said that the method involving agreements about both the position and velocity is a special example of the method involving agreement about the divergence component.

Furthermore, it can be said that, in this embodiment, the current time gait parameters are corrected so that the body posture angle for the current time gait converges to (comes close to) or agree with the body posture angle for the normal turning gait when the current time gait is generated using a dynamics model in accordance with the current time gait parameters, and successively, the normal turning gait is generated in accordance with normal turning gait parameters.

Figure 41:
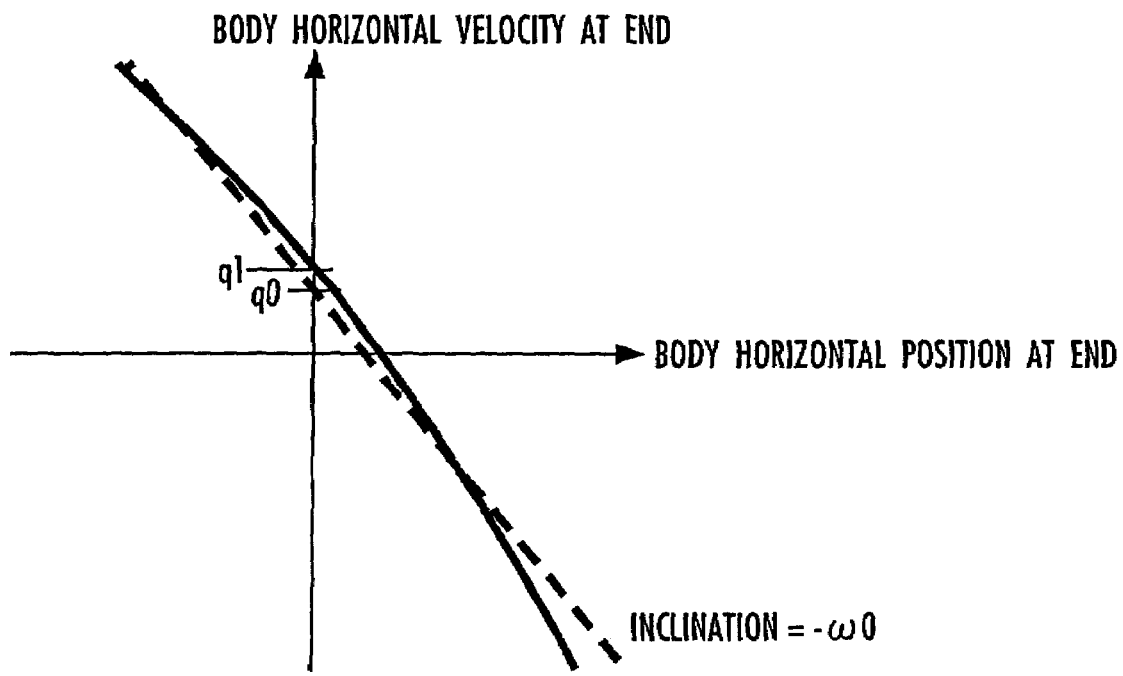
FIG. 41 is a graph showing a relationship between a body horizontal position and a body horizontal velocity at an end of the current time gait converging to the normal gait.

Since the gait generation device for the legged mobile robot according to this embodiment is configured as described above, strictly, the curved relationship shown by the solid line in FIG. 41 is a relationship between the final body horizontal position and final body horizontal velocity for the current time gait which satisfies the condition that the body horizontal position for the current time gait converges to that for the normal turning gait when the current time gait is generated using a dynamics model in accordance with the current time gait parameters, and successively, the normal turning gait is generated in accordance with normal turning gait parameters. According to the essential definition of the divergence component, the value of the divergence component has to be constant for any combination of the final body horizontal position and the final body horizontal velocity which satisfies the relationship represented by the solid line in FIG. 41. In addition, for making the divergence component a physically comprehensive indicator, it is desirable that the final body horizontal position and the divergence component have the same value when the final body horizontal velocity is 0.

That is, it is desirable that the relationship shown by the solid line in FIG. 41 is represented by the following formula 60, and the following formula 61 is satisfied, where f denotes a function for determining the divergence component.

$$f \text{ (final body horizontal position,} \qquad \text{formula 60}$$
$$\text{final body horizontal velocity)} = C$$
(C denotes a constant)

$$f \text{ (final body horizontal position, 0)=final body horizontal position} \qquad \text{formula 61}$$

The value of the function f (final body horizontal position, final body horizontal velocity) is the value of the divergence component.

The above-described formula 10, which defines the divergence component, is an approximate expression of the function f. In the case where the divergence component defined by the formula 10 is a constant, the final body horizontal position and the final body horizontal velocity are related to each other as shown by the dotted line in FIG. 41, which is an approximate line of the solid line.

The function f representing the divergence component may be approximated to a curve using a polynomial, rather than to a straight line. Alternatively, the function f may be converted into a map for storage.

For a higher approximation precision, the function f should be varied with the normal gait parameters.

In the formula 10 defining the divergence component, the body position and velocity may be replaced with the robot total center-of-gravity position and velocity, respectively.

In this embodiment, to be readily understood, it is assumed that the floor reaction force's horizontal component allowable range can be set separately for the back-and-forth direction (X-axis direction) and the sideward direction (Y-axis direction). However, if the floor reaction force's horizontal component allowable range is represented by relational formulas for the back-and-forth direction and the sideward direction, a gait that avoids slipping can be generated.

For example, the allowable range may be a so-called friction circle as described by the following formula.

$$(X \text{ component of floor reaction force's} \qquad \text{formula 59}$$
$$\text{horizontal component)} *$$
$$(X \text{ component of floor reaction force's}$$
$$\text{horizontal component} +$$
$$(Y \text{ component of floor reaction force's}$$
$$\text{horizontal component)} *$$
$$(Y \text{ component of floor reaction force's}$$
$$\text{horizontal component)} \le (ka * \mu * Fz) * (ka * \mu * Fz)$$

Here, Fz denotes the desired floor reaction force's vertical component, μ denotes a friction coefficient, and ka denotes a positive constant equal to or smaller than 1.

However, in the case where the floor reaction force's horizontal component allowable range is represented by the relational formulas for the back-and-forth direction and the sideward direction as described above, the movement on the sagittal plane and the movement on the lateral plane have to be determined simultaneously or alternately so as to satisfy the allowable ranges for the directions simultaneously or alternately.

Since the sum of the total center-of-gravity vertical acceleration and the gravitational acceleration of the robot is proportional to the floor reaction force's vertical component, a parameter prescribing the total center-of-gravity vertical acceleration trajectory of the robot may be explicitly set as a gait parameter, instead of the floor reaction force's vertical component trajectory. The two are substantially the same. Furthermore, a parameter prescribing the vertical acceleration trajectory of a part whose behavior resembles that of the total center-of-gravity trajectory of the robot may be set explicitly. For example, in the case where the mass of the legs is sufficiently smaller than the mass of the body, the body vertical acceleration trajectory and the total center-of-gravity vertical acceleration trajectory of robot are substantially the same or proportional to each other. Therefore, the body vertical acceleration trajectory may be used instead of the floor reaction force's vertical component trajectory. Similarly, since floor reaction force's horizontal component and the total center-of-gravity horizontal acceleration of the robot are proportional to each other, the total center-of-gravity horizontal acceleration of the robot and the allowable range thereof may be used instead of the floor reaction force's horizontal component and the allowable range thereof in this embodiment. Furthermore, a parameter concerning the horizontal acceleration trajectory of a part whose behavior resembles that of the total center-of-gravity horizontal trajectory of the robot may be set explicitly. For example, in the case where the mass of the legs is sufficiently smaller than the mass of the body, the body horizontal acceleration trajectory and the total center-of-gravity horizontal acceleration trajectory of the robot are substantially the same or proportional to each other. Therefore, the body horizontal acceleration and the allowable range thereof may be used instead of the floor reaction force's horizontal component and the allowable range thereof.

In order for the floor reaction force's horizontal component and the floor reaction force's moment about the desired ZMP to have adequate values, two movement modes, that is, the body rotation mode and the body translation mode are used in the embodiments described above. However, another movement mode may be used.

Figure 40:
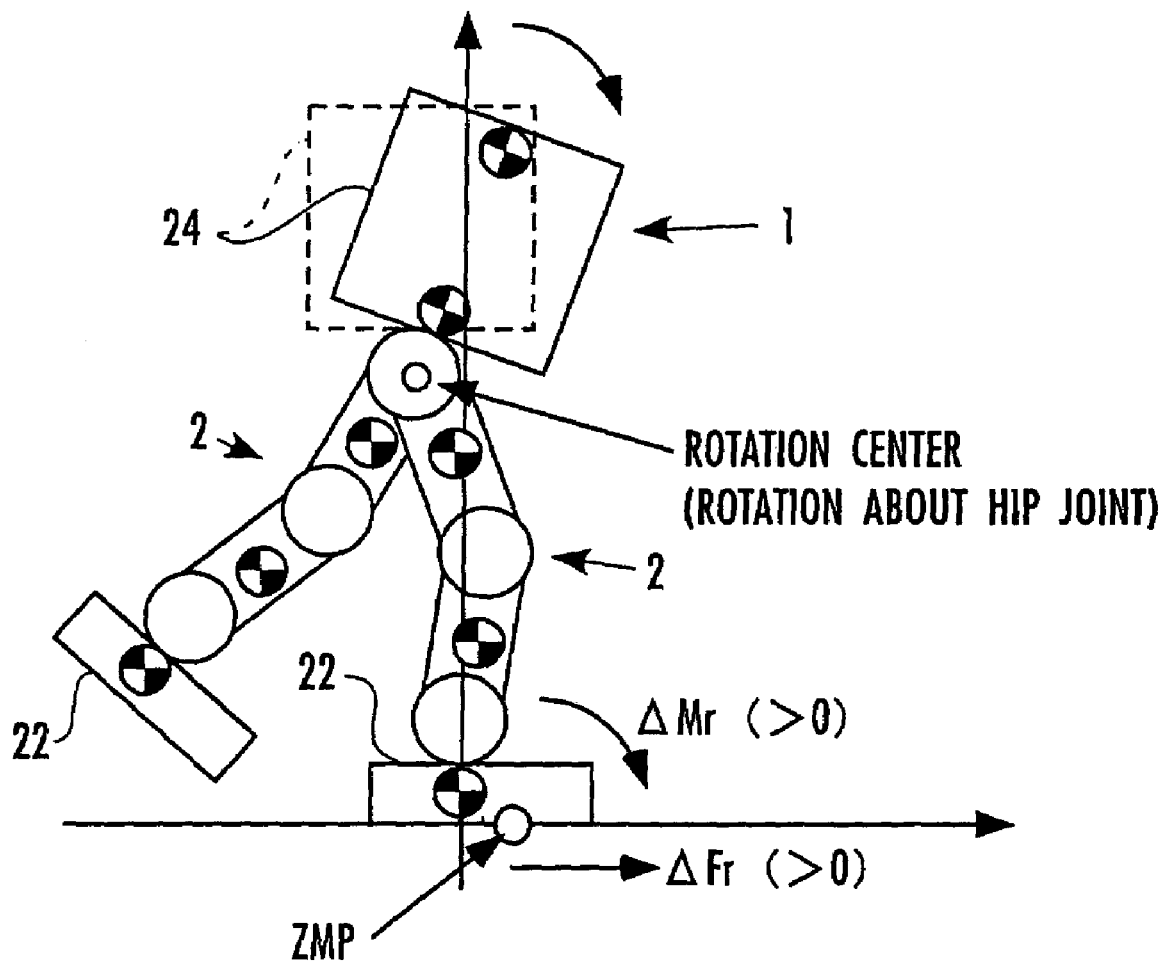
FIG. 40 is a diagram showing another example of modes of movements of the robot.

For example, as shown in FIG. 40, if the body posture is rotated about the hip joint, the total center of gravity, as well as the angular momentum about the total center of gravity, varies. Combining (synthesizing) this movement with the movement in the body translation mode by a predetermined ratio results in substantially the same movement in the body rotation mode, and no floor reaction force's horizontal component occurs. Therefore, if this mode is regarded as the body rotation mode, a gait similar to those in the embodiments described above can be generated according to the algorithm in this embodiment.

Therefore, there is no need to have at least one movement mode that produces no floor reaction force's horizontal component. This is because any floor reaction force's horizontal component and floor reaction force's moment about the desired ZMP can be produced for any combination of movement modes as in the example described above, as far as the two movement modes produce the floor reaction force's horizontal component and the floor reaction force's moment about the desired ZMP in different ratios.

Alternatively, a movement mode other than those involving varying the body posture may be used. However, it is preferable that a movement mode is chosen in which a minimum displacement produces a large floor reaction force's horizontal component or floor reaction force's moment about the desired ZMP.

For example, a movement mode in which the left and right arms are swung in the same rotational direction, or a movement mode in which the position of a foot not in contact with the floor (floating in the air) is brought into perturbation may be used. However, in the case where the free leg trajectory is brought into perturbation, the amount of perturbation should be reduced to approximately 0 by the time immediately before landing to avoid varying the landing position.

Alternatively, three or more movement modes may be used.

In this case, at least two of the chosen movement modes have to be ones that produce the floor reaction force's horizontal component and the floor reaction force's moment about the desired ZMP in different ratios. Otherwise, in general, the simultaneous equations would have no solutions (the behavior for each movement mode cannot be determined uniquely).

Furthermore, preferably, a movement mode that varies the floor reaction force's moment about the desired ZMP significantly and doesn't vary so largely the floor reaction force's horizontal component is combined with a movement mode that varies the floor reaction force's horizontal component significantly and doesn't vary so largely the floor reaction force's moment about the desired ZMP.

In other words, preferably, a movement mode that varies the angular momentum adequately and doesn't vary so largely the total center of gravity is combined with a movement mode that varies the total center of gravity adequately and doesn't vary so largely the angular momentum. This is because such combination allows the displacements of the movement modes to be reduced.

Models other than the dynamics models used in the embodiments, such as those described below, may be used.
1) A nonlinear model in which material particles are provided for a plurality of links as shown in FIG. 11 (multi-mass model).
2) A three-material-particle model disclosed in Japanese Patent Application No. 2000-352011 filed by the applicants.
3) A one-material-particle model in which only the body has a mass.
4) A model which neglects the moment of the inertial force caused by an angular momentum variation about the total center of gravity.
5) A separate-type model which has a partial model representing a relationship between the resultant force of gravity and the inertial force (or the floor reaction force in balance therewith) and the body translation movement and a partial model representing a relationship between the resultant force and the body rotation movement. For example, the material particles shown in FIG. 10 constitute the partial model representing a relationship between the resultant force and the body translation movement, and the flywheel shown in FIG. 10 constitutes the partial model representing a relationship between the resultant force and the body rotation movement.

In addition, the processings may be performed using only one model, or different models may be used for the different processings. For example, since the normal gait is generated only to determine the final state of the current time gait, the required dynamics precision of the normal gait is lower than that of the current time gait. Therefore, for example, while the dynamics model (model consisting of three material particles and a flywheel) shown in FIG. 10 is used in generation of the current time gait, in generation of the normal gait (in particular, steps S408 and S412 in FIG. 21), a dynamics model which consists of the body material particle 24m corresponding to the body 24 and the flywheel FH, neglecting the masses of the legs 2, 2 (that is, a model consisting of one material particle and a flywheel, which results from eliminating the leg material particles 2m, 2m from the model in FIG. 10) may be used. In generation of the normal gait in this case, in the embodiments described above, the processings in steps S408 and S412 in FIG. 21 are performed assuming that the mass of the leg material particles 2m, 2m is 0. This allows calculation amount involved in the normal gait generation to be significantly reduced.

In the embodiments described above, the block diagrams, the flowcharts and the algorithms may be altered into equivalent ones by changing the sequence of calculations. In addition, a low-pass filter may be inserted appropriately.

While the embodiments of the present invention has been described concerning a two-legged mobile robot, the present invention can be applied to a legged robot having three or more legs.

Here, the process of determining the initial (time Ts) body vertical position Zs in step S206 in FIG. 19 will be described supplementally. According to the process of determining the body height proposed by the applicants in Japanese Patent Laid-Open No. 10-86080, the body vertical position is determined in such a manner that the bending angle of the knees of the legs satisfies a certain relationship. However, as for the body vertical position at the time 0 (that is, at the instant of landing), it may be determined in such a manner that the bending angle of the knee of the leg just landing is a predetermined angle or falls within a predetermined angle range. This is because the capacity to absorb the impact of landing primarily depends on the bending angle of the knee of the landing leg. Incidentally, if the bending angle of the knee is close to 0 (that is, the leg is almost fully stretched), the capacity to absorb the impact of landing tends to be reduced. On the other hand, an excessive knee bending may results in an excessive torque of the knee joint actuator.

Furthermore, in this embodiment, in step S206 in FIG. 19, the body vertical position at the instant of landing is determined in a kinematical (geometrical) manner, and the body vertical position at any time except for the instant of landing is determined based on the desired vertical floor reaction force so as to satisfy the dynamical condition. However, more generally, the body vertical position at the time when the leg is stretched to a maximum extent (in other words, the knee bending angle becomes closest to 0, or the distance between the hip joint and the ankle joint is the largest), such as immediately before and after landing or taking off the floor, may be determine in a kinematical (geometrical) manner, and the body vertical position at any other time may be determined based on the desired vertical floor reaction force so as to satisfy the dynamical condition.

Instead of determining the initial states of the normal gait (including, primarily, initial body horizontal position/velocity and initial body vertical position/velocity) using a searching approach or using partially an analytic approach as in this embodiment, the initial states of the normal gait may be previously calculated for various normal gait parameters using these approaches, a relationship between the normal gait parameters and the initial states of the normal gait may be stored in the form of a map or approximate expression, and the initial values for the normal gait may be determined based on the map or approximate expression when the robot actually moves.

Furthermore, a function resulting from combination of the relationship represented in a map or approximate expression and the function f may be stored in the form of a map or approximate expression. That is, a function that determines the divergence component of the normal gait directly from the normal gait parameters comprising the foot trajectory parameters, the floor reaction force vertical trajectory parameters and the like may be stored in the form of a map or approximate expression. For example, a normal gait is previously generated for each of sets of a plurality of representative normal gait parameters, initial states of the normal gait for each set of normal gait parameters (which are determined in step S024 in FIG. 12) are determined, and a map representing a relationship between the normal gait parameters of each set and the initial states of the normal gait is created. Then, when generating a desired gait, the initial states of the normal gait may be determined from the set of normal gait parameters which are selected from the map or determined by interpolating the map. This eliminates the need of generating a normal gait each time a current time gait is generated and allows calculation amount involved in the desired gait generation to be significantly reduced.

In this embodiment, the desired ZMP parameter of the current time gait is corrected to correct the current time gait to connect the current time gait to the normal gait (or to bring the current time gait close to the normal gait). However, another parameter may be corrected.

For example, the trajectory of the floating free leg of the current time gait may be modified. In addition, for example, if the body horizontal position is to be displaced rearward from that of the normal gait, the free leg is moved forward quickly after taking off the floor to shift the free leg's center of gravity forward. This causes the body horizontal position that satisfies the desired ZMP to move forward acceleratedly. As a result, the body horizontal position is further moved forward at the end of the current time gait and thus is made to agree with that of the normal gait.

Alternatively, instead of correcting the desired ZMP parameter, the period of the current time gait may be corrected. For example, if the body horizontal position is to be displaced rearward from that of the normal gait, the period of the current time gait may be elongated. This is because, if the period of the current time gait is elongated, the duration of the movement of the body horizontal position is also elongated, and the body horizontal position can move forward further proportionately.

If the desired ZMP parameter is corrected when determining an appropriate value of the body horizontal position or the like in a searching manner, the body horizontal position at the end of the current time gait varies in appropriate proportion to the correction of the desired ZMP. Thus, the appropriate value can be determined with a reduced number of searches. On the other hand, if the free leg's center of gravity or the period of the gait is corrected, the body horizontal position at the end of the current time gait varies significantly nonlinearly with respect to the correction. Thus, the determination of the appropriate value requires more searches.

In this embodiment, the desired ZMP parameter of the current time gait is corrected to correct the current time gait to connect the current time gait to the normal gait (or to bring the current time gait close to the normal gait). According to this method, the correction amount of the desired ZMP parameter (correction amount a in FIG. 38) may probably be excessive. For example, in the case where a request to move at a high velocity starting from a gait of hopping at one spot (that is, a running request) is given, the desired ZMP parameter has to be significantly displaced rearward in the direction of travel in order to connect the hopping gait to the high-velocity normal gait (running normal gait) (or bring the hopping gait close to the high-velocity normal gait). In this case, a gait parameter other than the desired ZMP parameter is also preferably corrected as described above. However, in this case, the request for such rapid acceleration is in itself unreasonable, and therefore, the required value may be corrected.

When correcting the required value, for example, the normal gait that satisfied the request (that is, required parameters) is determined according to the procedure described with reference to this embodiment, and the current time gait parameters are determined so as to connect the current time gait to the normal gait. Then, it is determined whether the stability margin of the desired ZMP trajectory of the current time gait is too small or not. If the stability margin is to small (that is, the desired ZMP lies outside the supporting polygon or near the edge of the supporting polygon), the request may be corrected.

Alternatively, an allowable range of the acceleration/deceleration ((initial velocity of the next time gait−initial velocity of the current time gait)/(period of the current time gait)) of the gait may be previously set. In this case, when a request (that is, a required parameter concerning the gait period) is received, the acceleration/deceleration suitable for the request is determined, and if the determined acceleration/deceleration exceeds the allowable range, the request is corrected to make the acceleration/deceleration to fall within the allowable range.

If the floor reaction force's vertical component parameter for making the body vertical position/velocity at the end of the current time gait agree with the body vertical position/velocity at the start of the normal gait exceeds the capacity of the robot, the floor reaction force's vertical component parameter may be determined in such a manner that agreement about at least the body vertical position, rather than both the position and velocity, is achieved.

Alternatively, the floor reaction force's vertical component parameter may be determined in such a manner that the body vertical position at the end of the current time gait is lower than the body vertical position at the start of the normal gait and the body vertical velocity at the end of the current time gait has a larger magnitude in the upward direction than the body vertical velocity at the start of the normal gait.

Alternatively, the weighted averages of the body vertical position and body vertical velocity at the end of the current time gait may be determined using a predetermined weight, and the floor reaction force's vertical component parameter may be determined in such a manner that the determined weighted averages agree with the weighted averages of the body vertical position and body vertical velocity at the start of the normal gait.

Alternatively, the floor reaction force's vertical component parameter may be determined in such a manner that the sum of the potential energy and kinetic energy of the robot at the end of the current time gait agree with that at the start of the normal gait.

Alternatively, the process of determining the pattern of the body posture restoring moment ZMP-converted value (ZMPrec) in such a manner that the body posture angle of the current time gait comes close to the body posture angle of the normal gait performed in step S718 in FIG. 34 may be used. That is, the floor reaction force's vertical component parameter may be determined using the process of step S718 or another process of determining the body posture restoring moment ZMP-converted value (ZMPrec) described later with the body posture angle and the body posture restoring moment ZMP-converted value being replaced with the body vertical position and the floor reaction force's vertical component, respectively.

The floor reaction force horizontal component allowable range [Fxmin, Fxmax] may be set so as to satisfy the following formulas 62 and 63.

$$Fxmax = kmax \cdot \mu \cdot Fz + kc \cdot (XG - ZMPx)/(ZG - ZMPz) \cdot Fz$$

$$Fxmin = kmin \cdot \mu \cdot Fz + kc \cdot (XG - ZMPx)/(ZG - ZMPz) \cdot Fz$$

$$(kmax \geq 0, kmin \leq 0) \qquad \text{formula 62}$$

However, the upper limit Fxmax is set not to be larger than the value of Fxmax determined by the formula 12 on the assumption that Ka=1, and the lower limit Fxmin is set not to be smaller than the value of Fxmin determined by the formula 12 on the assumption that Ka=1.

Here, "ZMPx" denotes the horizontal position of the desired ZMP, and "ZMPz" denotes the vertical position of the desired ZMP.

In addition, it is assumed that "XG" and "ZG" denote the horizontal position and vertical position, respectively, of a material particle which produces an approximate resultant force of the gravities and inertial forces applied on a group of material particles including at least the body material particle. In other words, (XG, ZG) indicates the position of a material particle which is representative of a group of material particles including at least the body material particle. For example, (XG, ZG) is the total center of gravity or the center of gravity of the whole body excluding a part of a leg. Alternatively, (XG, ZG) may be the position (Xb, Xz) of the body material particle 24m in the dynamics model used in the above-described embodiment and shown in FIG. 10.

If it is assumed that kc=0 in the formula 62, the formula 62 is the same as in the above-described embodiment (see the formula 12).

If the value kc is set to 1 (kc=1), and the values Fxmax and Fxmin are set to approximately 0, the vector of the desired floor reaction force (Fx, Fz) acting on the desired ZMP (ZMPx, ZMPz) points approximately to the position (XG, ZG). Thus, the variation of the direction of the desired floor reaction force (in particular, the variation with a high frequency) can be reduced.

As a result, the variation of the desired floor reaction force horizontal component Fx is moderated, and thus, the foot is contact with the floor more intimately and prevented from slipping.

Since the acceleration of the body horizontal position trajectory is proportional to the value Fx, the variation of the acceleration of the body horizontal position trajectory is also moderated, the variation of the body horizontal position at the end of the gait occurring when the desired ZMP is corrected becomes linear, the convergence in searching for the normal gait or current time gait becomes more quick, and thus, the number of searches can be reduced.

In addition, in the case where kc=1 and kmax=kmin=0, the same behavior as that of a one-material-particle model results (in particular, if the position (XG, ZG) is the total center of gravity). In this case, the body horizontal position trajectory of the normal gait can be readily searched for.

Besides, in the formula 62, the term (ZG−ZMPz) may be substituted with a predetermined constant. This is because the value (ZG−ZMPz) doesn't vary significantly during walking or running (specifically, it varies by, at most, about 10%).

In the case where kc=1, kmax=kxmin=0, the value (ZG−ZMPz) in the formula 62 is substituted with a predetermined constant and the position (XG, ZG) is the total center of gravity, the same behavior as that of a linear inverted pendulum with one material particle results. The behavior can be solved in an analytic manner, so that the normal gait and the current time gait can be determined without any searching method. However, the angular acceleration of the body rotation mode varies more largely.

The values ΔMp, ΔFp, ΔMr and ΔFr may be determined in an analytic manner by dynamical calculation if such a simple dynamics model as described above is used. However, in the case where a more general and more complicated dynamics model is used, these values may be determined by determining the floor reaction force in the case where the body is accelerated by a small amount in the body translation mode or in the body rotation mode, calculating the difference between this determined floor reaction force and the floor reaction force in the case where the body is not accelerated, and dividing this difference by the small amount.

Alternatively, average values for ΔMp, ΔFp, ΔMr, ΔFr and ΔMp/ΔMr for a standard gait may be previously determined and used. In this case, since the values ΔMp, ΔFp, ΔMr, ΔFr and ΔMp/ΔMr vary with the state of the robot (specifically, the posture and the rate of variation thereof), the precision is slightly reduced compared to methods in which the values are determined for each instantaneous state. However, when a more complicated model than the above-described model is used, the amount of calculation can be reduced significantly.

In the process from step S504 to step S516 in FIG. 22 and the process from step S1002 to step S1014 in FIG. 37, if the floor reaction force horizontal component Fx falls within the allowable range with a sufficient margin, this margin may be used to gradually bring the integral value of the body posture angular acceleration β, that is, the body posture angular velocity up to that point in time back to the original value (initial state).

Specifically, in step S506 or S1004, the value (denoted by βrec) of the body posture angular acceleration β for gradually bringing the integral value of the body posture angular acceleration β back to the original value is determined from the integral value of the body posture angular acceleration β up to that point in time. For example, the value βrec may be a value obtained by multiplying the integral value of the body posture angular acceleration β by the negative gain.

Then, the value Fxtmp is determined by the following formula 70, instead of the formula 17.

$$Fxtmp = \Delta Fp \cdot \alpha tmp - \beta rec \cdot \Delta Fp \cdot \Delta Mr/\Delta Mp + msup \cdot d2Xsup/dt2 + mswg \cdot d2Xswg/dt2 \qquad \text{formula 70}$$

The second term in the right side of the formula 70 represents the floor reaction force's horizontal component caused by the acceleration ($-\beta rec*\Delta Mr/\Delta Mp$) in the body translation mode which is required to cancel the moment ($\beta rec*\Delta Mr$) produced about the desired ZMP when the robot moves in the body rotation mode with the body posture angular acceleration being $\beta rec$.

The value Fxtmp determined by the formula 70 represents the body horizontal acceleration in the body translation mode which is required to satisfy the current time (time k) desired ZMP in the case where the robot moves in the body translation mode while moving in the body rotation mode with the body posture angular acceleration being $\beta rec$ starting from the last time instantaneous desired gait state (desired gait state at the time k−1).

The following processings are the same as those in the embodiment described above. Since the margin of the floor reaction force horizontal component Fx can be used to restore the body posture angular velocity to some extent in the above-described process, the variation of the body posture angular velocity can be further reduced.

If the body posture angle at the end of the provisional current time gait differs significantly from the body posture angle at the start of the normal gait when the ZMPrec pattern set in step S1016 in FIG. 37 has a constant value of 0, the height of the trapezoidal pattern shown in FIG. 26 may be set to a value other than 0 to reduce the difference. In this case, however, in the subsequent step S718 shown in FIG. 34, the body posture restoring moment ZMP-converted value pattern set in step S1016 has to be added to the body posture restoring moment ZMP-converted value pattern determined in step S718. This allows the finally resulting gait to be exactly or substantially the same as the gait resulting when a pattern having a constant value of 0 is set in step S1016.

However, it is preferable that, during the period from the start to the end of the process of the search loop of step S700 in FIG. 34, the body posture restoring moment ZMP-converted value pattern set in step S1016 in FIG. 37 (specifically, the height of the ZMPrec pattern shown in FIG. 26) is not changed. If it is changed during the process, there is a possibility that the final divergence component errq doesn't converge, and thus, the loop cannot be exited.

As a method of determining the height bcurr of the trapezoid of the body posture restoring moment ZMP-converted value (ZMPrec) for the current time gait, the following method may be used.

The body posture angle and angular velocity at the end of the current time gait of the ZMPrec corrected gait (see the description about step S718 in FIG. 34) are denoted by θcurr and vθcurr, respectively, and the differences between the body posture angle and angular velocity at the end of the current time gait and the body posture angle and angular velocity at the start of the normal gait are denoted by Δθcerr and Δvθcerr, respectively.

Assuming that the gait period is an interval, the differences θerr and vθerr between the body posture angle and angular velocity at the end of the provisional current time gait and the body posture angle and angular velocity at the start of the normal gait are the last time states, the value bcuur is an input, and the values Δθcerr and Δvθcerr are the current time states, a characteristic equation in a discrete system is established. Then, a feedback rule may be established using the modern control theory or the like in such a manner that the values Δθcerr and Δvθcerr converge to 0, and the value bcurr may be determined based on the feedback rule.

The ZMPrec for the current time gait and/or the normal gait may not have a trapezoidal pattern. The ZMPrec value for each instant may be determined using a state feedback rule or the like, based on the difference between the desired body posture angle and angular velocity and the reference body posture angle and angular velocity or the like, in such a manner that the difference converges to 0.

The ZMPrec for the current time gait may not have a trapezoidal pattern. The ZMPrec value for each instant may be determined using a state feedback rule or the like, based on the desired body posture angle and angular velocity of the current time gait, in such a manner that the body posture angle and the angular velocity come close to the body posture angle and angular velocity at the start of the first turning gait.

Now, generation of a walking gait of the robot 1 and a gait shifts between walking and running will be described. The walking gait is a gait including no floating period in which one-leg supporting periods and two-leg supporting periods are repeated alternately.

In this embodiment, in the case where a walking gait is generated, using the body height determination method proposed by the applicant previously (Japanese Patent Application Laid-Open No. 10-86080) or the like, a body vertical position is determined on the basis of at least the geometrical limitation conditions and, in the case where a running gait is generated, the body vertical position is determined from the floor reaction force's vertical component as described in steps S906, S908 in FIG. 36. In this case, it is preferable that a final body vertical position in a gait at the time when the gait shifts from walking to running or from running to walking is determined by synthesizing a body vertical position Zg for walking, which is determined on the basis of the geometrical limitation condition, and a body vertical position Zf for running, which is determined dynamically from the floor reaction force's vertical component. More specifically, for example, as indicted by the following formula 71, a final body vertical position Z is determined according to a weighted average of those body vertical positions Zg and Zf. In this case, a weight w is gradually changed from 1 to 0 or from 0 to 1.

Consequently, the body vertical position trajectory during the time when the gait shifts from walking to running can be changed smoothly.

$$\text{body vertical position } Z=(1-w)*Zg+w*Zf \qquad \text{formula 71}$$

A specific processing will be described below with reference to FIG. 42 and other drawings. Since the processing can be derived, by modification, from the processing concerning the running gait described above with reference to FIGS. 12 to 38, the following description will be primarily focused on the modified part.

Figure 42:
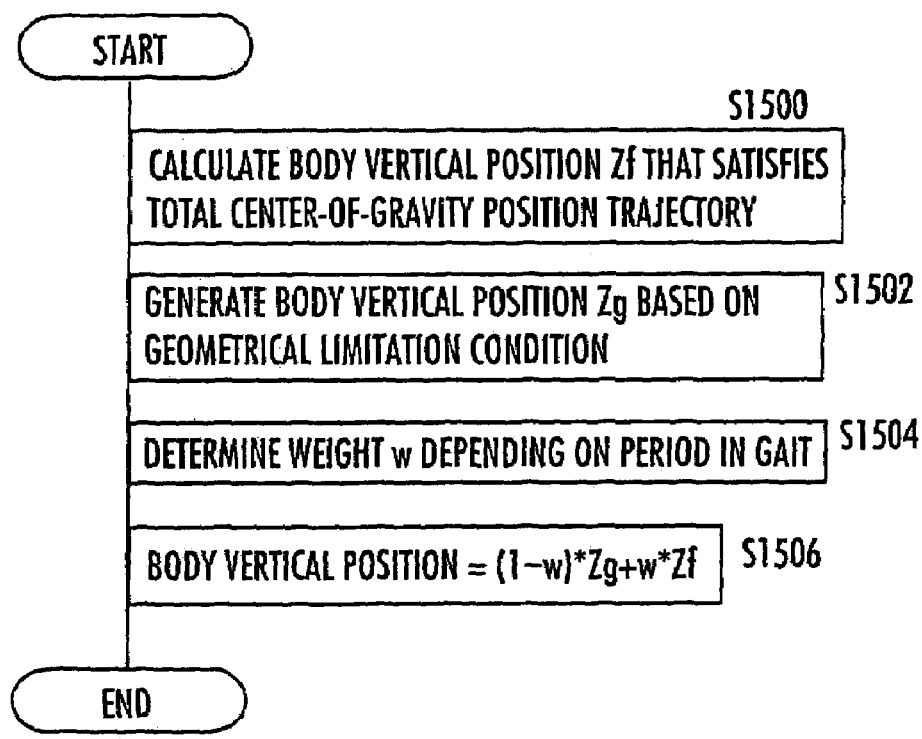
FIG. 42 is a flowchart showing a process concerning switching between a walking gait and a running gait.

The processing shown in FIG. 42 is intended to replace the step S408 involved in the normal gait generation shown in FIG. 21 and the step S908 involved in the current-time gait generation shown in FIG. 36. Specifically, first, in step S1500, there is calculated the body vertical position Zf that satisfies the total center-of-gravity vertical position trajectory that depends on the desired floor reaction force's vertical component trajectory. This step may be the same as the step S408 in FIG. 21 or step S908 in FIG. 36. Then, the process proceeds to step S1502, where, using the body height determination method previously proposed by the applicants (see Japanese Patent Laid-Open No. 10-86080) or the like, there is determined the body vertical position Zg which is determined based on at least a geometrical limitation condition concerning displacement of a joint (knee joint) of each leg 2. For example, the body vertical position Zg is determined by the processing shown in FIG. 6 of Japanese Patent Laid-Open No. 10-86080 conducted using the current time value (value at the time k) of the desired feet position/posture, the current time value of the reference body posture and the last time value (value at the time k−1) of the desired body horizontal position. In this case, as in step S206 in FIG. 19 concerning the running gait described above, the geometrical condition is one that the sum of the inverse numbers of the sines of the bending angles θsup and θswg of the knees of the supporting and free legs 2,2 is a predetermined value (finite value), the sum being a continuous monotone function of the displacement of the knee joint (or a particular joint) of each leg 2 in the stretching direction of the leg 2. As a result of determining the body vertical position Zg in this way, the total center-of-gravity vertical position is also determined based on the geometrical limitation condition concerning the displacement of the joint (knee joint) of each leg 2.

Then, the process proceeds to step S1504, where the weight w is determined according to a time of a gait. For example, the weight w of the formula 71 is determined so as to change gradually from 0 to 1 or from 1 to 0 from the start to the end of the gait. In this case, the weight w is determined in such a manner that w is changed from 0 to 1 at the time of shift from walking to running and is changed from 1 to 0 at the time of shift from running to walking. Note that it is advisable to also set a variation rate of the weight w (a first order time differential of a weight) so as to change continuously. Moreover, it is advisable to also set a variation rate of the variation rate of the weight w (a second order time differential of a weight) so as to change continuously. Consequently, a body vertical position trajectory to be finally generated becomes smooth. During continuous walking, the weight w may be set to 0, and during continuous running, the weight w may be set to 1. When the weight is set to 0 (i.e., w=0), the body vertical position determined based on the geometrical condition is chosen as the final body vertical position. Similarly, when the weight is set to 1 (i.e., w=1), the body vertical position associated with the desired floor reaction force's vertical component is chosen as the final body vertical position.

Finally, the process proceeds to step S1506, where a final body vertical position is determined according to the formula 71.

Note that the weight w may take an intermediate value between 0 and 1 not only at the time when a gait shifts from walking to running or from running to walking but also at other times. In addition, the shift from walking to running or from running to walking is not required to be performed in one gait but may be performed in plural gaits.

Figure 43:
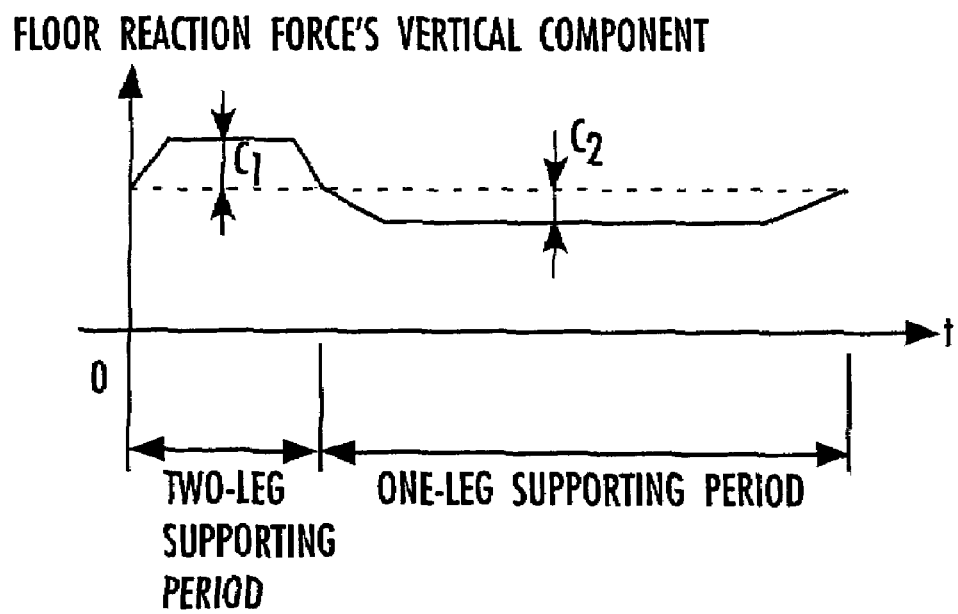
FIG. 43 is a diagram showing an example of setting of a desired floor reaction force's vertical component in a walking gait.

In addition, during continuous walking, in step S106 in FIG. 14 and step S606 in FIG. 32, the desired floor reaction force's vertical component trajectory parameters are set so that the desired floor reaction force's vertical component defined by the parameters is precisely or substantially a constant value (=the weight of the robot 1) for a period of one cycle of the gait. In this case, for example, the desired floor reaction force's vertical component trajectory may be set to have a pattern shown in FIG. 43. According to this pattern, the desired floor reaction force's vertical component is slightly higher in the two-leg supporting period than in the one-leg supporting period. Thus, the allowable range for the desired floor reaction force horizontal component is slightly wider in the two-leg supporting period than in the one-leg supporting period.

The parts of the processing other than that described above may be the same as the processing concerning the running gait described earlier.

Since the body vertical position is determined based on the geometrical condition (geometrical limitation condition) during continuous walking, steps which are not essential for determining the body vertical position during walking, such as step S406 in FIG. 21 and step S906 in FIG. 36, may be omitted.

In gait generation at the time of movement on a slope (when the robot 1 is moved on an inclined floor surface), instead of the allowable range of the floor reaction force's horizontal component and the allowable range of the total center-of-gravity acceleration's horizontal component, the allowable range of a floor-surface-parallel component (component parallel to the floor surface) of the translation floor reaction force, that is, the allowable range of the friction force, or the allowable range of a component parallel to the floor surface of the total center-of-gravity acceleration (which is proportional to the friction force) maybe set. For example, as for a case of setting the allowable range of the floor-surface-parallel component of the translation floor reaction force (friction force) (the same holds true for a case of setting the allowable range of the floor-surface-parallel component of the total center-of-gravity acceleration), assuming that the inclination angle of the floor surface with respect to the horizontal surface is denoted by θf (where θf is positive when the surface is inclined downwardly in the travel direction of the robot 1), the friction force is represented by the following formula 72. Thus, in the case where a gait is generated according to the same algorithm as that in the embodiments described above, it is advisable to convert the friction force allowable range in to the floor reaction force's horizontal component allowable range using the formula 72 to thereby set the floor reaction force's horizontal component allowable range. Note that, in this case, as the floor reaction force's vertical component in a formula 72, the desired floor reaction force's vertical component only has to be used.

$$\text{friction force} = \text{floor reaction force's horizontal component} * \cos(\theta f) - \text{floor reaction force's vertical component} * \sin(\theta f) \quad \text{formula 72}$$

Determination of parameters of the current time gait may be performed again in the processing of generating the current time gait as described in Japanese Patent Application No. 2000-352011 filed by the applicant other than being performed at the point when the last time gait is completed as in the above-described embodiments. This is because this process increases the amount of calculation but, when there is a change in a request for a gait, can instantaneously cope with the change.

In addition, it is also possible that, in the case where the current time control cycle is not enough for correction of a gait (which means current time gait parameters are determined again), a gait not corrected or provisionally corrected (a gait that is in the course of search and does not satisfy a search completion condition (deviation from gait boundary requirements falls within an allowable value) completely) is outputted for the time being, and the gait is changed to an appropriate corrected gait (not provisional) by the next time control cycle or by the completion of plural control cycles. Since the corrected desired ZMP and desired floor reaction force's vertical component trajectory are continuous, and these never change suddenly after a short time, there is almost no problem except that only the desired ZMP trajectory and the desired floor reaction force's vertical component trajectory are zigzagged slightly.

Instead of the arm swing movement that cancels the spinning force in step S032 in FIG. 12, a movement for rotating (twisting) the body 24 about a trunk axis (or a vertical axis) thereof may be performed. Alternatively, the arm swing movement and the movement for rotating (twisting) the body 24 about the trunk axis (or the vertical axis) thereof may be combined.

When the body vertical position satisfying the total center-of-gravity vertical position velocity is determined in step S408 in FIG. 21 and step S908 in FIG. 36 as well as step S1500 in FIG. 42, which concern generation of a gait, instead of determining the body vertical position in an analytical manner using the formula 04 or the like as described above, the body vertical position may be determined according to another method 1 or 2 described below.

Figure 44:
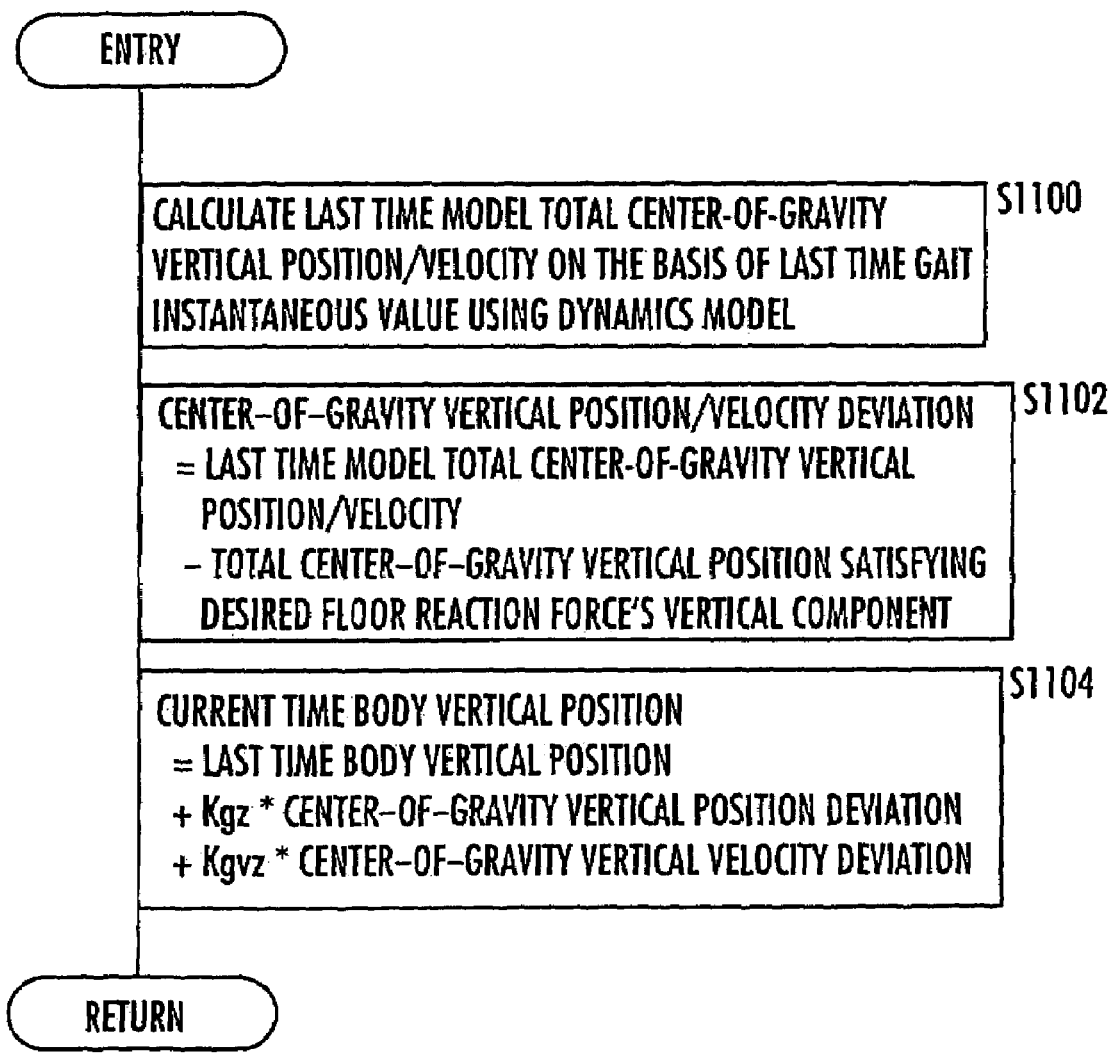
FIGS. 44 and 45 are flowcharts illustrating methods for determining a desired body vertical position.

Another Method 1:

FIG. 44 shows a calculation process flowchart of another method 1.

First, in step S1100, a total center-of-gravity vertical position/velocity is calculated using the dynamics model on the basis of a last time instantaneous desired gait state (the desired gait state determined at the time k−1) or the like. The total center-of-gravity vertical position/velocity calculated using the dynamics model is hereinafter referred to as a model total center-or-gravity vertical position/velocity. That is, in step S1100, the last time model total center-of-gravity vertical position/velocity is calculated. Note that, as the dynamics model, for example, a multi-mass model or the like as shown in FIG. 11 only has to be used.

Subsequently, the process proceeds to step S1102, where a difference between the last time model total center-of-gravity vertical position/velocity determined as described above and the total center-of-gravity vertical position/velocity calculated in step S406 in FIG. 21 or step S906 in FIG. 36, that is, the total center-of-gravity vertical position/velocity satisfying the current time value (value at the time k) of the desired floor reaction force's vertical component (both a difference of a position and a difference of a velocity; this difference will be hereinafter referred to as a center-of-gravity vertical position/velocity deviation) is determined. That is, the center-of-gravity position/velocity deviation is determined according to the following formula 80.

$$\text{center-of-gravity vertical position and velocity deviation} = \quad \text{formula 80}$$

last time model total center-of-gravity vertical position and velocity − total center-of-gravity direction position/velocity satisfying the desired floor reaction force's vertical component Subsequently, the process proceeds to step S1104, where a current time body vertical position (a current time value of the body vertical position) is determined on the basis of at least the center-of-gravity vertical direction deviation and the last time body vertical position (the body vertical position determined at the time k−1) in such a manner that the model total center-of-gravity vertical position/velocity follows the total center-of-gravity vertical position/velocity satisfying the desired floor reaction force's vertical component. For example, the current time body vertical position is determined according to the following formula.

$$\text{current time body vertical position} = \quad \text{formula 81}$$

last time body vertical position +

Kgz ∗ center-of-gravity vertical position deviation +

Kgvz ∗ center-of-gravity vertical velocity deviation

Here, "Kgz" and "Kgvz" denote gains.

Kgvz may be 0. In this case, it is unnecessary to calculate a total center-of-gravity vertical velocity and a center-of-gravity vertical direction velocity deviation that satisfy the model total center-of-gravity vertical velocity and the desired floor reaction force's vertical component.

The current time body vertical position is calculated as described above. In this case, when the formula 81 is used, the current time vertical position is calculated according to the center-of-gravity vertical position deviation and the center-of-gravity vertical velocity deviation.

In addition, it is also possible that, in order to determined the current time body vertical position, the current time body vertical position is determined by adding a component (feed-forward component) corresponding to the body vertical position determined using the model of the robot 1 (e.g., a three-material-particle model obtained by excluding the flywheel FH from the model of FIG. 10) to the last time body vertical position other than the component corresponding to the center-of-gravity vertical position deviation and the component corresponding to the center-of-gravity vertical velocity deviation. In this case, a provisional body vertical position (which is referred to as an FF body vertical position here) is determined using, for example, the three-material-particle model from the total center-of-gravity vertical position velocity calculated in step S406 in FIG. 21 or step S906 in FIG. 36, that is, the total center-of-gravity vertical position velocity satisfying the current time value (the value at the time k) of the desired floor reaction force's vertical component and the current time value (the value at the time k) of the desired feet positions/postures calculated in step S404 in FIG. 21 or step S904 in FIG. 36. Note that, in the case the body vertical position is determined using the model of FIG. 10 in step S408 in FIG. 21 or step S908 in FIG. 36 as described above, the body vertical position only has to be used directly as the FF body vertical position. Then, with a value, which obtained by multiplying the FF body vertical position determined as described above with an appropriate gain, is further added to the right side of the formula 81 as a feed-forward component, whereby the current time body vertical position is determined. That is, the current time body vertical position is determined by correcting the last time body vertical position according to the center-of-gravity vertical position deviation and the center-of-gravity vertical velocity deviation (the center-of-gravity vertical velocity deviation may be omitted) and the FF body vertical position. This allows fluctuation of the current time body vertical position, which is determined finally, to be controlled. Note that it is preferable that the model of the robot 1, which is used for determining the last time body vertical position with this method, is a more precise model.

Another Method 2:

In addition, the current time body vertical position may be determined according to another method 2 using a repetitious searching method as described below.

Figure 45:
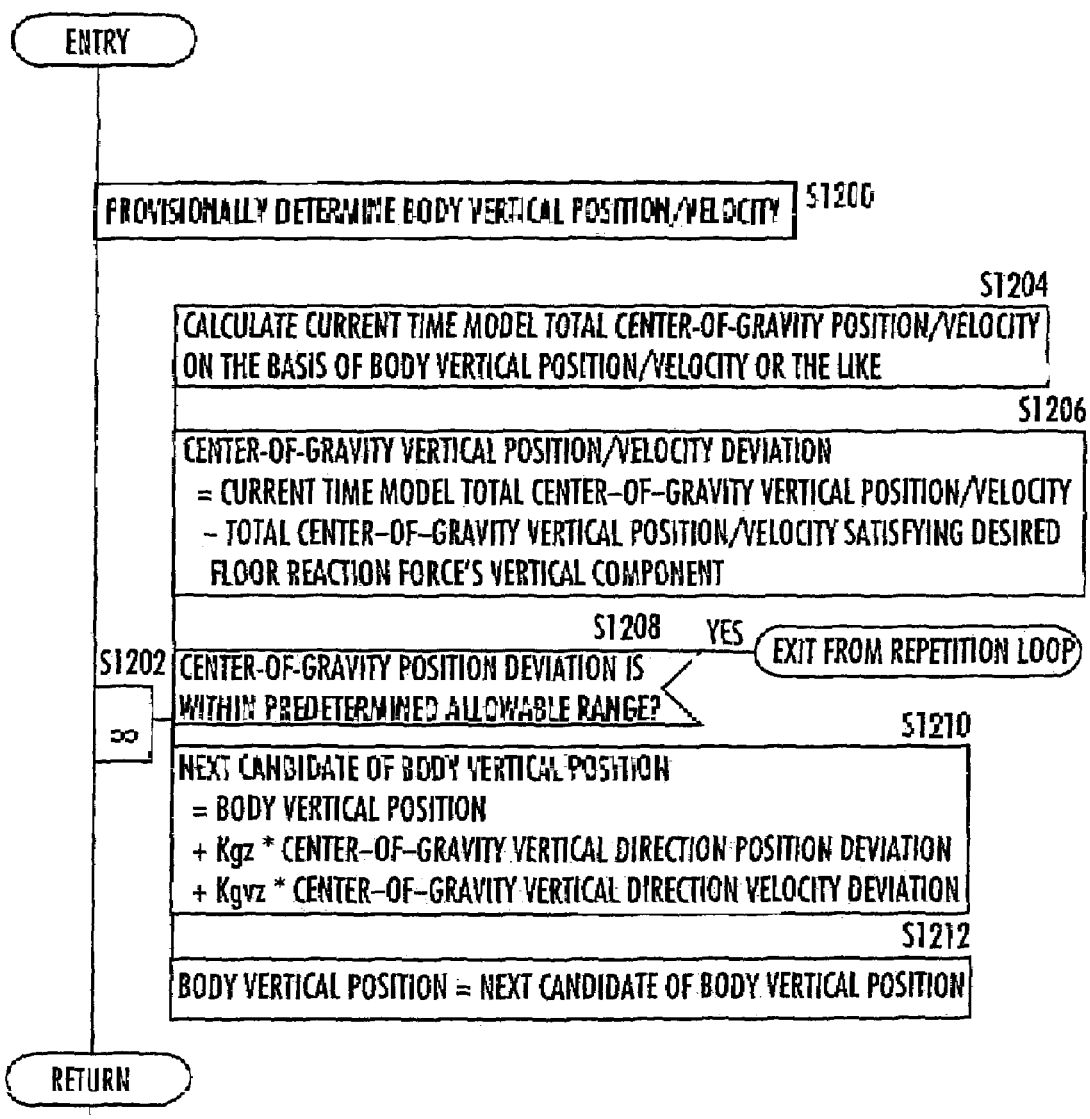
Figure 46:
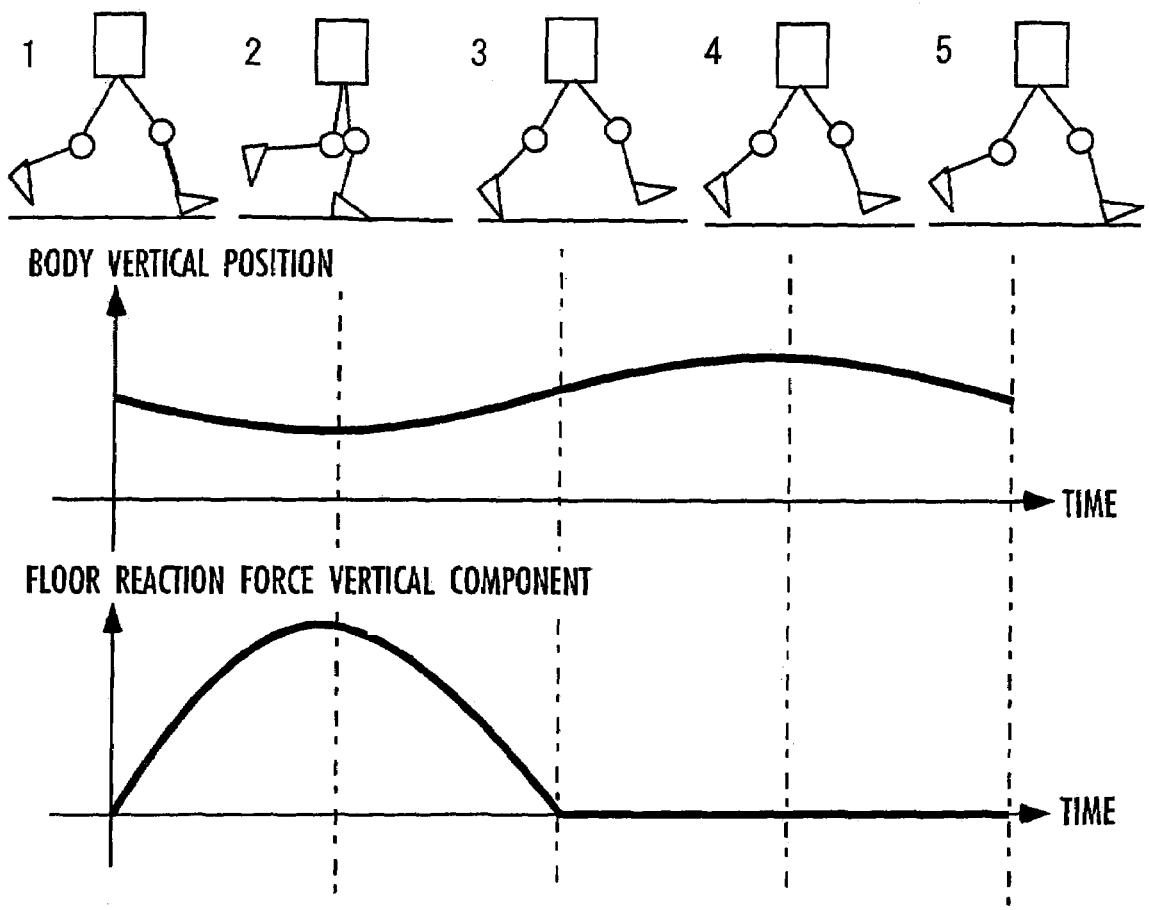
FIG. 46 is a diagram showing a relationship between a body vertical position and a floor reaction force's vertical component in a running gait.

FIG. 45 shows a calculation process flowchart of the method.

First, in step S1200, a body vertical position/velocity (more precisely, a candidate of a current time value of the body vertical position/velocity) is determined provisionally. For example, a body vertical position/velocity (last time value) of a last time desired gait instantaneous value is determined provisionally as a candidate value of the body vertical position/velocity. Alternatively, a value, which is found by adding a product of the body vertical velocity of the last time desired gait instantaneous value and a control cycle Δt to the last time value of the body vertical position, may be determined provisionally as the candidate value of the body vertical position.

Subsequently, through step S1202, the process proceeds to step S1204, where a current time model total center-of-gravity vertical position/velocity is calculated from the present value (present provisionally determined value) of the body vertical position velocity (candidate), the current time value of the desired feet positions/postures determined as described above, the desired body posture at the time (k−Δk) (or current time value of the reference body posture determined as described above), the current time value of the desired arm posture determined as described above, the body horizontal position at the time (k−Δk), and a posture state of the robot 1 determined from change rates of these values. Note that the last time value is used for a part of variables used in the calculation of the current time mode total center-of-gravity vertical position/velocity.

Subsequently, the process proceeds to step S1206, where a center-of-gravity vertical direction position/velocity deviation is calculated according to the following formula 82.

center-of-gravity vertical position and velocity deviation =    formula 82 current time model total center-ofgravity vertical position and velocity − total center-of-gravity vertical position satisfying the desired floor reaction force's vertical component Subsequently, the process proceeds to step S1208, where, if the center-of-gravity vertical position deviation determined according to the formula 82 is within a predetermined allowable range, the finally determined body vertical position (present value) is determined as the current time value of the body vertical position (current time body vertical position), and the processing for determining the current time body vertical position is completed. In addition, if the center-of-gravity vertical position deviation is not within the predetermined allowable range in the judgment of step S1208, the process proceeds to step S1210, where a next candidate of the body vertical position is determined according to the following formula.

next candidate of body vertical position =    formula 83 body vertical position +

Kgz ∗ center-of-gravity vertical position deviation +

Kgvz ∗ center-of-gravity vertical velocity deviation

Subsequently, the process proceeds to step S1212, where the next candidate of the body vertical position is set as the body vertical position again (the candidate of the body vertical position is updated). Then, the process proceeds to step S1204 again. Then, a current time model total center-of-gravity vertical position/velocity is determined on the basis of the new candidate of the body vertical position. Thereafter, the above-described process is repeated until the center-of-gravity vertical direction position/velocity deviation falls within the predetermined allowable range.

These methods 1 and 2 determine the body vertical position such that the model total center-of-gravity vertical position follows or substantially agrees with the total center-of-gravity vertical position calculated in step S406 in FIG. 21 or in step S908 in FIG. 36, that is, a total center-of-gravity vertical position that is obtained by second order integration of a value found by dividing the current time value of the desired floor reaction force's vertical component by a total mass.

Instead of the above, it is also possible that a body vertical velocity is determined according to the same method as the method 1 or the method 2 in such a manner that the model total center-of-gravity vertical velocity follows or substantially agrees with a total center-of-gravity vertical velocity that is obtained by first order integration of a value found by dividing the current time value of the desired floor reaction force's vertical component by a total mass, a body vertical position is determined by first order integration of the body vertical velocity.

Alternatively, it is also possible that a body vertical acceleration is determined according to the same method as the method 1 or the method 2 in such a manner that a model total center-of-gravity vertical acceleration follows or substantially agrees with a value that is found by dividing the current time value of the desired floor reaction force's vertical component by a total mass, the body vertical position is determined by second order integration of the body vertical acceleration.

However, although an instantaneous dynamic error is small compared with the methods 1 and 2, even if the model total center-of-gravity vertical position is deviated from the total center-of-gravity vertical position, which is obtained by second order integration of the value found by dividing the current time value of the desired floor reaction force's vertical component by the total mass, due to an integration error, since an action for making the deviation to converge to 0 does not work, a dynamic accuracy of a gait tends to fall in a long term.

In other words, in the methods 1 and 2, since an instantaneous dynamic error is slightly large but a long-term dynamic error is small, stability of a posture of a robot is improved.

In the embodiments described above, the desired floor reaction force's vertical component is determined before determining the body vertical position in the generation of the walking gait, as in the generation of the running gait. However, in the generation of the walking gait, the desired floor reaction force's vertical component may not necessarily be determined in an explicit manner, and the body vertical position may be determined based on the geometrical condition (geometrical limitation condition) concerning a joint of each leg using the body height determination method proposed by the applicants in Japanese Patent Laid-Open No. 10-86080, for example.

INDUSTRIAL APPLICABILITY

As described above, the present invention is effective in generating a gait with which a legged mobile robot, such as a two-legged mobile robot, can move smoothly in a variety of gait modes.

The invention claimed is:

1. A gait generation device for generating a desired gait for a legged mobile robot that moves by operating a plurality of legs extending from a body, comprising:

desired vertical component trajectory determining means for determining a desired trajectory of a vertical component of a translation floor reaction force applied to said robot, a vertical component of a total center-of-gravity acceleration of the robot or a vertical component of a body acceleration of the robot;

first desired vertical position determining means for determining a desired vertical position of the total center-of-gravity of said robot or the body thereof in such a manner that the vertical component of the translation floor reaction force, the vertical component of the total center-of-gravity acceleration or the vertical component of the body acceleration agrees with the desired trajectory set by the desired vertical component trajectory determining means; and second desired vertical position determining means for determining the desired vertical position of the total center-of-gravity of said robot or the body thereof based on a geometrical condition concerning displacement of a joint of a leg, wherein a final desired vertical position of the center-of-gravity of the robot or the body thereof is determined by selecting one of the desired vertical positions determined by said first and second desired vertical position determining means depending on the mode of the desired gait generated or combining the desired vertical positions.

2. The gait generation device according to claim 1, wherein the desired vertical position determined by said first desired vertical position determining means is selected as the final desired vertical position of the total center-of-gravity of the robot or the body thereof if said desired gait is of a first gait mode which alternately repeats a landing period, when at least one leg of the robot is in contact with the floor, and a floating period, when all the legs float in the air, and the desired vertical position determined by said second desired vertical position determining means is selected as the final desired vertical position of the total center-of-gravity of the robot or the body thereof if said desired gait is of a second gait mode in which the legs of the robot each alternately land and take off the floor while assuring that at least one of the legs is in contact with the floor at any time.

3. The gait generation device according to claim 2, wherein said desired vertical component trajectory determining means determines the desired trajectory in such a manner that the vertical component of the translation floor reaction force for said desired trajectory varies in a convex pattern within the positive value region during said landing period of said first gait mode and is kept at 0 during said floating period of said first gait mode.

4. The gait generation device according to claim 2, wherein, when generating said desired gait for a period in which shifting between said first gait mode and said second gait mode, the final desired vertical position of the total center-of-gravity of the robot or the body thereof is determined by taking a weighted average of the desired vertical position determined by said first desired vertical position determining means and the desired vertical position determined by said second desired vertical position determining means.

5. The gait generation device according to claim 2, wherein said first gait mode is a gait mode of a running operation of the robot, and said second gait mode is a gait mode of a walking operation of the robot.

6. The gait generation device according to claim 1, wherein said geometrical condition concerns displacement of a particular joint of each leg of said legged mobile robot which is provided between an end portion of the leg and a joint of the leg which connects the leg to the body.

7. The gait generation device according to claim 6, wherein said geometrical condition is a condition which involves the displacements of all the particular joints as variables and is defined so that a value of a continuous monotone function of displacement of the particular joint in the stretching direction of each leg is approximately kept at a predetermined value.

* * * * *